(12) United States Patent
Mohamed et al.

(10) Patent No.: US 10,147,017 B2
(45) Date of Patent: *Dec. 4, 2018

(54) SYSTEMS AND METHODS FOR OBTAINING STRUCTURAL INFORMATION FROM A DIGITAL IMAGE

(71) Applicant: QUALCOMM Incorporated, San Diego, CA (US)

(72) Inventors: Magdi Abuelgasim Mohamed, San Diego, CA (US); Xin Zhong, San Diego, CA (US); Yang Yang, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/585,759

(22) Filed: Dec. 30, 2014

(65) Prior Publication Data

US 2015/0371111 A1 Dec. 24, 2015

Related U.S. Application Data

(60) Provisional application No. 62/015,043, filed on Jun. 20, 2014, provisional application No. 62/015,060, filed on Jun. 20, 2014.

(51) Int. Cl.
*G06K 9/00* (2006.01)
*G06K 9/62* (2006.01)
(Continued)

(52) U.S. Cl.
CPC ......... *G06K 9/6212* (2013.01); *G06K 9/0061* (2013.01); *G06K 9/4633* (2013.01);
(Continued)

(58) Field of Classification Search
CPC .............................................. G06K 9/00–9/82
See application file for complete search history.

(56) References Cited

U.S. PATENT DOCUMENTS 3,069,654 A 12/1962 Hough
7,406,212 B2 7/2008 Mohamed et al.
(Continued)

FOREIGN PATENT DOCUMENTS

CN 102194114 A 9/2011
CN 102932081 A 2/2013
WO WO-2013052812 A1 4/2013

OTHER PUBLICATIONS

Rahman S., et al., "Performance of PCA Based Semi-supervised Learning in Face Recognition Using MPEG-7 Edge Histogram Descriptor," Journal of Multimedia, 2011, vol. 6 (5), pp. 404-415.
(Continued)

*Primary Examiner* — Sean T Motsinger
(74) *Attorney, Agent, or Firm* — Austin Rapp & Hardman, P.C.

(57) ABSTRACT

A method for obtaining structural information from a digital image by an electronic device is described. The method includes obtaining a digital image. The method also includes determining a gradient vector for each pixel in a region of interest of the digital image. The method further includes transforming each pixel in the region of interest in accordance with a transform. Transforming each pixel includes determining, for each pixel, a first set of pixels. The first set of pixels includes any pixel along a line that is collinear with or perpendicular to the gradient vector and passes through a pixel location. Transforming each pixel includes incrementing with signed integer values, for each pixel, a first set of values in a transform space corresponding to any of the first set of pixels that are in a first direction of the line.

30 Claims, 41 Drawing Sheets

(51) Int. Cl.
G06T 3/00 (2006.01)
G06K 9/46 (2006.01)
(52) U.S. Cl.
CPC .......... G06K 9/4642 (2013.01); G06T 3/0012 (2013.01); G06T 2207/20021 (2013.01)

(56) References Cited

U.S. PATENT DOCUMENTS

| | | | | |
|---|---|---|---|---|
| 2002/0067855 | A1* | 6/2002 | Chiu | G06T 7/0018 382/199 |
| 2002/0126901 | A1* | 9/2002 | Held | G06K 9/00604 382/199 |
| 2005/0169531 | A1* | 8/2005 | Fan | G06T 7/0083 382/199 |
| 2006/0098877 | A1 | 5/2006 | Barnes et al. | |
| 2006/0119909 | A1* | 6/2006 | Liu | G06T 3/4015 358/518 |
| 2012/0257833 | A1* | 10/2012 | Guo | G06K 9/3233 382/199 |
| 2013/0259322 | A1 | 10/2013 | Lin et al. | |
| 2014/0112535 | A1* | 4/2014 | Chen | G06K 9/00604 382/103 |
| 2014/0201126 | A1* | 7/2014 | Zadeh | G06K 9/627 706/52 |
| 2015/0371111 | A1* | 12/2015 | Mohamed | G06K 9/6212 382/165 |
| 2015/0371360 | A1* | 12/2015 | Mohamed | G06K 9/6212 382/282 |
| 2016/0364622 | A1* | 12/2016 | Nonaka | H04N 1/3871 |

OTHER PUBLICATIONS

Gankin K A., et al., "Iris Image Segmentation Based on Approximate Methods with Subsequent Refinements," Journal of Computer and Systems Sciences Internationals, Pleiades Publishing, Moscow, vol. 53, No. 2, Apr. 13, 2014 (Apr. 13, 2014), pp. 224-238, XP035345219, ISSN: 1064-2307, DOI: 10.1134/S1064230714020099 [retrieved on Apr. 13, 2014)] p. 227.
International Search Report and Written Opinion—PCT/US2015/033346—ISA/EPO—dated Nov. 26, 2015.
Loy G., et al., "Fast Radial Symmetry for Detecting Points of Interest," IEEE Transactions on Pattern Analysis and Machine Intelligence, IEEE computer society, USA, vol. 25, No. 8, Aug. 2003 (Aug. 2003), pp. 959-973, XP011099376, ISSN: 0162-8828, DOI: 10.1109/TPAMI.2003.1217601 abstract p. 959 pp. 961-965 p. 972.
O'Gorman F., et al., "Finding Picture Edges Through Collinearity of Feature Points," Proceedings of the International Joint Conference on Artificial Intelligence, XX, XX, Aug. 1973 (Aug. 1973), pp. 543-555, XP000985768, the whole document.
Benn D.E., et al., "Robust Eye Centre Extraction using the Hough Transform", Audio-And Video-Based Biometric Person Authentication, XX, XX, Mar. 12, 1997 (Mar. 12, 1997), pp. 03-09, XP001020856, pp. 5,6.
Haselhoff A., et al., "2D Line Filters for Vision-Based Lane Detection and Tracking", IEEE International Workshop on Multidimensional (ND) Systems, NDS 2009, Piscataway, NJ, USA, Jun. 29, 2009 (Jun. 29, 2009), pp. 1-5, XP031504584, ISBN: 978-1-4244-2797-0, Section II.C.
Jain A.K., "Fundamentals of Digital Image Processing, Passage", Fundamentals of Digital Image Processing, Prentice-Hall International, INC, US, 1989, pp. 244-249, XP001091510, pp. 244, 245.

Kothari R., et al., "Detection of Eye Locations in Unconstrained Visual Images", Proceedings of the International Conference on Image Processing (ICIP) Lausanne, Sep. 16-19, 1996; [Proceedings of the International Conference on Image Processing (ICIP)], New York, IEEE, US, vol. 3, Sep. 16, 1996 (Sep. 16, 1996), pp. 519-522, XP010202445, DOI: 10.1109/ICIP.1996.560546, ISBN: 978-0-7803-3259-1, abstract Section 2.
Magdi M.A., et al., "On iris detection for mobile device applications", Proceedings of Spie, S P I E—International Society for Optical Engineering, US, vol. 9217, Sep. 23, 2014 (Sep. 23, 2014), pp. 92171J-92171J, XP060039747, ISSN: 0277-786X, DOI: 10.1117/12.2063973, ISBN: 978-1-62841-684-8 the whole document.
Matveev I.A., "Iris Center Location Using Hough Transform with Two-Dimensional Parameter Space", Journal of Computer and Systems Sciences International, Nauka/Interperiodica, MO, vol. 51, No. 6, Dec. 15, 2012 (Dec. 15, 2012), pp. 785-791, XP035138806, ISSN: 1555-6530, DOI: 10.1134/S1064230712060068 the whole document.
Tisse C.L., et al., "Person Identification Technique Using Human Iris Recognition", International Conference on Vision Interface, XX, XX, May 27, 2002 (May 27, 2002), pp. 1-6, XP002231650, Section 3.1.
Zingl A., "A Rasterizing Algorithm for Drawing Curves", Nov. 8, 2012 (Nov. 8, 2012), pp. 1-81, XP055208131, Retrieved from the Internet: URL: https://github.com/Traumflug/Teacup_Firmware/raw/master/research/A_Rasterizin_Algorithm_for_Drawing_Curve_-_Alois_Zingl_2012.pdf [retrieved on Aug. 17, 2015] pp. 5-21.
Zingl A., "easy.Filter—The Beauty of Bresenham's Algorithm", Dec. 2012 (Dec. 2012), pp. 1-4, XP055208177, Vienna, Austria, Retrieved from the Internet: URL: http://members.chello.at/easyfilter/bresenham.html [retrieved on Aug. 17, 2015] the whole document.
Ballard D.H., "Generalizing the Hough Transform to Detect Arbitrary Shapes," Pattern Recognition, vol. 13, No. 2, pp. 111-122, Oct. 10, 1979. http://www.cs.utexas.edu/~dana/HoughT.pdf.
Dalal N., et al., "Histograms of oriented gradients for human detection", Computer Vision and Pattern Recognition, 2005 IEEE Computer Society Conference on, IEEE, Piscataway, NJ, USA, Jun. 25, 2005 (Jun. 25, 2005), pp. 886-893 vol. 1, XP031330347, ISBN: 978-0-7695-2372-9 Section 6.3.
Daugman J., "How Iris Recognition Works", IEEE Transactions on Circuits and Systems for Video Technology, IEEE, vol. 14, No. 1, Jan. 1, 2004 pp. 21-30.
EISO/IEC/JTC1/SC29/WG11: "Core Experiment Results for Edge Histogram Descriptor (CT4)", MPEG document M6174, Beijing, Jul. 2000.
Gader P., et al., "Comparison of Crisp and Fuzzy Character Neural Networks in Handwritten Word Recognition," IEEE Transactions on Fuzzy Systems, vol. 3, No. 3, Aug. 1995, pp. 357-363.
Krishnamoorthy R., et al., "Fast and iterative algorithm for iris detection with orthogonal polynomials transform," Proceedings of the 2011 International Conference on Communication, Computing & Security, 2011, pp. 325-330.
NIST: "NIST Handprinted Forms and Characters Database", from NIST Special Database 19, Retrieved on Dec. 22, 2014, pp. 2, http://www.nist.gov/srd/nistsd19.cfm.
OMRON: "The OMRON Face Detection Package" From OKAO Vision, Retrieved on Dec. 22, 2014, 2 pages, URL: http://www.omron.com/r_d/coretech/vision/okao.html.
Timm F., et al., "Accurate Eye Centre Localisation by Means of Gradients," Proceedings of the Int. Conference of Computer Theory and Application (VISAPP), vol. 1, 2011, pp. 125-130, http://cjee.lakeheadu.ca/public/journals/22/TiBa11b.pdf.
Zingl A., "A Rasterizing Algorithm for Drawing Curves", Technical Report, Multimedia and Software, Technikum-Wien, Wien, 2012, pp. 1-98. http://members.chello.at/easyfilter/bresenham.pdf.

* cited by examiner

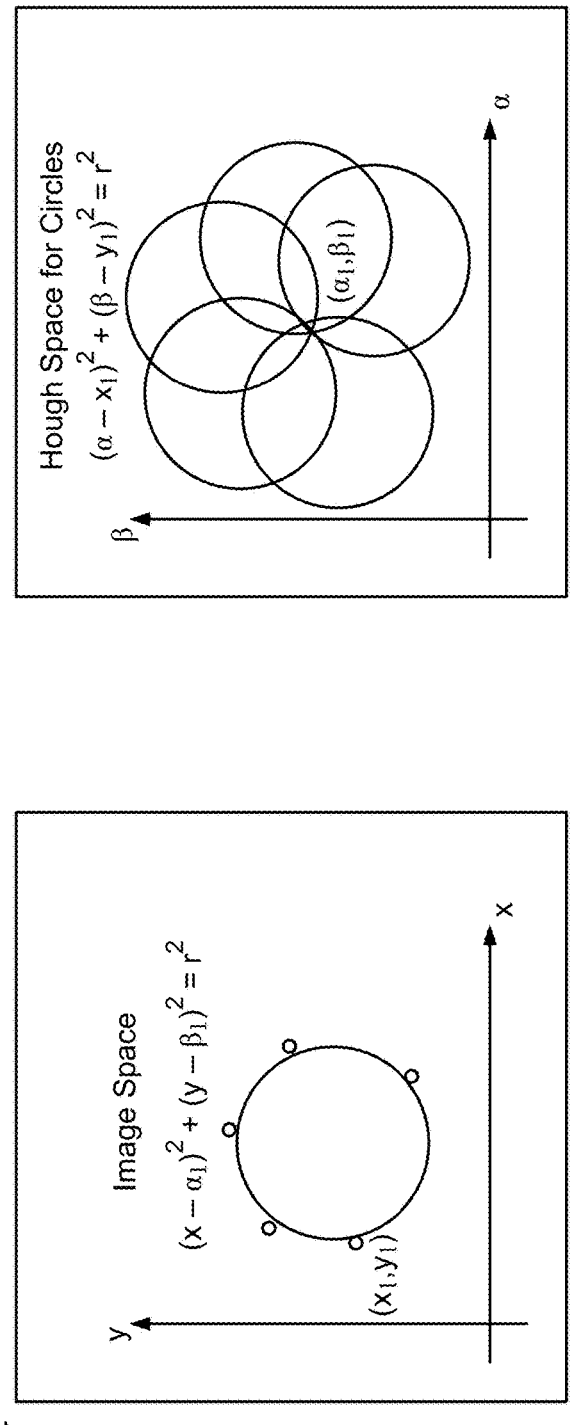
FIG. 7

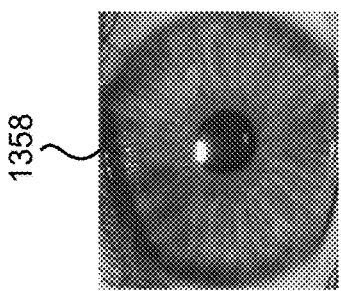
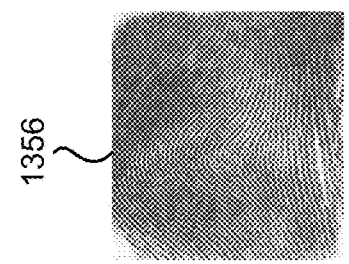
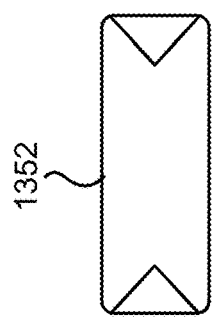
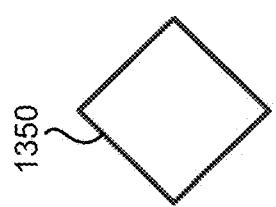
FIG. 13

Table A 2684:

| Method Size (C x R) | Conventional T&B T₁ (Seconds) | Novel GDT T₂ (Seconds) | Speedup Ratio T₁/T₂ |
|---|---|---|---|
| 040 x 030 | 0001.291 | 0000.053 | 024.538 |
| 080 x 060 | 0022.630 | 0000.345 | 065.672 |
| 160 x 120 | 0394.155 | 0002.689 | 146.580 |
| 240 x 180 | 2063.608 | 0013.426 | 153.705 |
| 320 x 240 | 6603.897 | 0036.665 | 180.116 |

Table B 2686:

| Method | T&B | | | | | | | | | | Average | GDT | | | | | | | | | | Average | Speedup |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | | 1 | 2 | 3 | 4 | 5 | 6 | 7 | 8 | 9 | 10 | | |
| 040x030 | 1.330 | 1.355 | 1.282 | 1.281 | 1.269 | 1.264 | 1.275 | 1.294 | 1.288 | 1.289 | 1.291 | 0.058 | 0.052 | 0.053 | 0.052 | 0.051 | 0.052 | 0.051 | 0.052 | 0.053 | 0.052 | 0.53 | 24.538 |
| 080x060 | 22.670 | 22.535 | 22.601 | 22.605 | 22.616 | 22.611 | 22.506 | 22.617 | 22.730 | 22.813 | 22.630 | 0.342 | 0.345 | 0.345 | 0.347 | 0.343 | 0.344 | 0.347 | 0.342 | 0.340 | 0.351 | 0.345 | 65.672 |
| 160x120 | 413.881 | 390.657 | 3291.225 | 390.071 | 400.148 | 394.362 | 385.669 | 392.557 | 390.589 | 392.387 | 394.155 | 2.755 | 2.675 | 2.688 | 2.674 | 2.727 | 2.672 | 2.702 | 2.655 | 2.673 | 2.669 | 2.689 | 146.580 |
| 240x180 | 2069.882 | 2000.904 | 2046.840 | 2045.336 | 2086.665 | 2084.935 | 2071.867 | 2046.120 | 2050.493 | 2073.044 | 2063.608 | 13.455 | 13.506 | 13.333 | 13.372 | 13.399 | 13.463 | 13.431 | 13.362 | 13.353 | 13.524 | 13.426 | 153.705 |
| 320x240 | 6777.781 | 6553.853 | 6588.382 | 6606.071 | 6536.591 | 6543.278 | 6554.527 | 6539.738 | 6594.108 | 6634.645 | 6603.897 | 36.856 | 37.446 | 36.389 | 36.366 | 36.793 | 36.685 | 36.506 | 36.446 | 36.064 | 36.496 | 36.665 | 180.116 |

FIG. 26

| Method Size (C x R) | Conventional T&B $K_1$ | Novel GDT $K_2$ | Speedup Ratio $K_1 * R / K_2$ |
|---|---|---|---|
| 040 x 030 | 8.96528E-07 | 1.10417E-06 | 024.355 |
| 080 x 060 | 9.82205E-07 | 8.98438E-07 | 065.594 |
| 160 x 120 | 1.06911E-06 | 8.75326E-06 | 146.566 |
| 240 x 180 | 1.10576E-06 | 1.29495E-06 | 153.702 |
| 320 x 240 | 1.11964E-06 | 1.49190E-06 | 180.115 |

Table C 2788

| | Feature Descriptor Name | Network Architecture | Recognition Rate in Training MNIST 60K Digits | Recognition Rate in Testing MNIST 10K Digits |
|---|---|---|---|---|
| Digit | RAW | 784 x 10 | 92.34 % | 91.67 % |
| | BAR | 120 x 10 | 97.41 % | 97.80 % |
| | GDT | 156 x10 | 96.51 % | 93.65 % |
| | BAR-GDT | 276 x 10 | 98.68 % | 98.31 % |
| | Feature Descriptor Name | Network Architecture | Recognition Rate in Training MNIST 26K UC | Recognition Rate in Testing MNIST 26K UC |
| Upper Case | RAW | 784 x 26 | 92.20 % | 82.30 % |
| | BAR | 120 x 26 | 95.36 % | 93.80 % |
| | GDT | 156 x 26 | 91.84 % | 90.02 % |
| | BAR-GDT | 276 x 26 | 98.07 % | 95.32 % |
| | Feature Descriptor Name | Network Architecture | Recognition Rate in Training MNIST 26K LC | Recognition Rate in Testing MNIST 26K LC |
| Lower Case | RAW | 784 x 26 | 87.70 % | 77.01 % |
| | BAR | 120 x 26 | 89.92 % | 88.14 % |
| | GDT | 156 x 26 | 87.32 % | 85.45 % |
| | BAR-GDT | 276 x 26 | 97.97 % | 93.25 % |

Table D 3651

FIG. 36

| | Feature Descriptor Name | Network Architecture | Recognition Rate in Training MNIST 60K Digits | Recognition Rate in Testing MNIST 10K Digits |
|---|---|---|---|---|
| Digit | RAW | 784 x 300 x 100 x 10 | 92.62 % | 91.35 % |
| | BAR | 120 x 300 x 100 x 10 | 98.64 % | 98.30 % |
| | GDT | 156 x 300 x 100 x 10 | 98.37 % | 97.26 % |
| | BAR-GDT | 276 x 300 x 100 x 10 | 98.24 % | 98.65 % |
| | Feature Descriptor Name | Network Architecture | Recognition Rate in Training MNIST 26K UC | Recognition Rate in Testing MNIST 26K UC |
| Upper Case | RAW | 784 x 300 x 100 x 26 | 94.50 % | 82.51 % |
| | BAR | 120 x 300 x 100 x 26 | 96.89 % | 94.11 % |
| | GDT | 156 x 300 x 100 x 26 | 93.72 % | 91.35 % |
| | BAR-GDT | 276 x 300 x 100 x 26 | 98.00 % | 93.65 % |
| | Feature Descriptor Name | Network Architecture | Recognition Rate in Training MNIST 26K LC | Recognition Rate in Testing MNIST 26K LC |
| Lower Case | RAW | 784 x 300 x 100 x 26 | 87.25 % | 77.99 % |
| | BAR | 120 x 300 x 100 x 26 | 90.11 % | 89.05 % |
| | GDT | 156 x 300 x 100 x 26 | 87.82 % | 88.14 % |
| | BAR-GDT | 276 x 300 x 100 x 26 | 94.33 % | 92.53 % |

Table E 3753

FIG. 37

SYSTEMS AND METHODS FOR OBTAINING STRUCTURAL INFORMATION FROM A DIGITAL IMAGE

RELATED APPLICATIONS

This application is related to and claims priority to U.S. Provisional Patent Application Ser. No. 62/015,043, filed Jun. 20, 2014, for "SYSTEMS AND METHODS FOR OBTAINING STRUCTURAL INFORMATION FROM A DIGITAL IMAGE," and to U.S. Provisional Patent Application Ser. No. 62/015,060, filed Jun. 20, 2014, for "SYSTEMS AND METHODS FOR OBTAINING STRUCTURAL INFORMATION FROM A DIGITAL IMAGE."

TECHNICAL FIELD

The present disclosure relates generally to electronic devices. More specifically, the present disclosure relates to systems and methods for obtaining structural information from a digital image.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or more reliably are often sought after.

Some electronic devices utilize digital images. For example, a smartphone may capture and process a digital image. However, processing digital images may involve complex operations that require significant resources (e.g., time and power). As can be observed from this discussion, systems and methods that improve digital image processing may be beneficial.

SUMMARY

A method for obtaining structural information from a digital image by an electronic device is described. The method includes obtaining a digital image. The method also includes determining a gradient vector for each pixel in a region of interest of the digital image. The method further includes transforming each pixel in the region of interest in accordance with a transform. Transforming each pixel includes determining, for each pixel, a first set of pixels. The first set of pixels includes any pixel along a line that is collinear with or perpendicular to the gradient vector and passes through a pixel location. Transforming each pixel also includes incrementing, for each pixel, a first set of values in a transform space corresponding to any of the first set of pixels that are in a first direction of the line. Determining the first set of pixels may include multiplying an error value by 2. Transforming each pixel in the region of interest may have a computing complexity of a longest dimension of the region of interest squared times another dimension of the region of interest times a constant.

Arithmetic operations of the transform may include only integer multiplication, integer addition and/or integer subtraction. The integer multiplication may be implemented as a bit shift.

The method may include decrementing, for each pixel, a second set of values in the transform space corresponding to any of the first set of pixels that are in a second direction of the line. The method may include determining a character in the region of interest based on the transform.

Numbers utilized by the transform may only include integer values. The integer values may not be represented as floating point numbers.

Each element of the transform space may be represented as a first dimension position, a second dimension position and a value. The value may indicate a number of lines intersecting a pixel corresponding to an element in the transform space.

An electronic device for obtaining structural information from a digital image is also described. The electronic device includes a processor. The electronic device also includes memory in electronic communication with the processor. The electronic device further includes instructions stored in the memory. The instructions are executable by the processor to obtain a digital image. The instructions are also executable to determine a gradient vector for each pixel in a region of interest of the digital image. The instructions are further executable to transform each pixel in the region of interest in accordance with a transform. Transforming each pixel includes determining, for each pixel, a first set of pixels. The first set of pixels includes any pixel along a line that is collinear with or perpendicular to the gradient vector and passes through a pixel location. Transforming each pixel also includes incrementing, for each pixel, a first set of values in a transform space corresponding to any of the first set of pixels that are in a first direction of the line.

A computer-program product for obtaining structural information from a digital image is also described. The computer-program product includes a non-transitory tangible computer-readable medium with instructions. The instructions include code for causing an electronic device to obtain a digital image. The instructions also include code for causing the electronic device to determine a gradient vector for each pixel in a region of interest of the digital image. The instructions further include code for causing the electronic device to transform each pixel in the region of interest in accordance with a transform. The instructions for transforming each pixel include code for causing the electronic device to determine, for each pixel, a first set of pixels. The first set of pixels includes any pixel along a line that is collinear with or perpendicular to the gradient vector and passes through a pixel location. The instructions for transforming each pixel also include code for causing the electronic device to increment, for each pixel, a first set of values in a transform space corresponding to any of the first set of pixels that are in a first direction of the line.

An apparatus for obtaining structural information from a digital image is also described. The apparatus includes means for obtaining a digital image. The apparatus also includes means for determining a gradient vector for each pixel in a region of interest of the digital image. The apparatus further includes means for transforming each pixel in the region of interest in accordance with a transform. The means for transforming each pixel includes means for determining, for each pixel, a first set of pixels. The first set of pixels comprises any pixel along a line that is collinear with or perpendicular to the gradient vector and passes through a pixel location. The means for transforming each pixel also includes means for incrementing, for each pixel, a first set of values in a transform space corresponding to any of the first set of pixels that are in a first direction of the line.

BRIEF DESCRIPTION OF THE DRAWINGS

FIG. 7 illustrates an example of a Hough transform utilized for iris detection;

FIG. 13 illustrates examples of applications of the transform disclosed herein;

FIG. 26 illustrates a comparison between the transform disclosed herein and the Timm & Barth transform;

FIG. 27 illustrates another comparison between the transform disclosed herein and the Timm & Barth transform;

FIG. 29 illustrates an example of the BAR transform;

FIG. 36 summarizes some results for a handwriting recognition application for different feature descriptors with neural networks of 0 hidden layers;

FIG. 37 summarizes some results for a handwriting recognition application for different feature descriptors with neural networks of 2 hidden layers;

DETAILED DESCRIPTION

Figure 1:
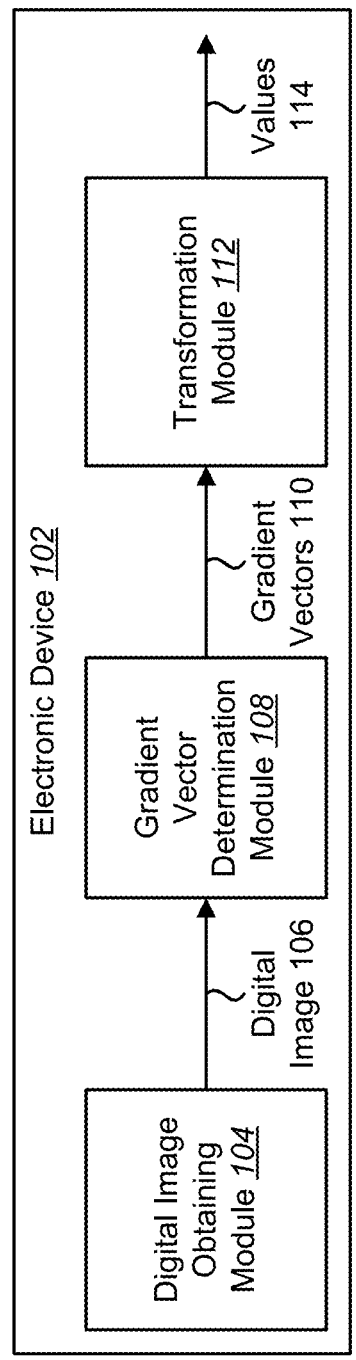
FIG. 1 is a block diagram illustrating one configuration of an electronic device in which systems and methods for obtaining structural information from a digital image may be implemented.

Systems and methods for obtaining structure information from a digital image are described herein. For example, some configurations of the systems and methods disclosed herein may utilize a gradient direction transform for fast detection of curved items in digital images.

Detecting naturally curved items in digital images by identifying their constituent components usually requires sophisticated processing to deal with significant variations in object size and imaging conditions. Conventional Hough Transform-based techniques work on the gradient magnitude of the images after binarization. The Timm and Barth (T&B) conventional technique considers only the gradient orientations (ignoring the direction signs) and overlooks the size of the object. The requirements of these conventional techniques limit their uses in real-time platforms with small memory and processing footprints for high resolution inputs and data rates.

The systems and methods disclosed herein describe a transform for fast detection of naturally curved items in digital images. This general purpose image transform may be defined to suit platforms with limited memory and processing footprints by utilizing simple operations (e.g., only additions and simple shift and bitwise operations in some configurations). This unique algorithmic approach may be applied to real world problems of iris detection and handwriting recognition systems as applications in electronic devices. The new approach has been tested on several data sets and the experiments show promising and superior performance compared to known techniques.

In particular, the systems and methods disclosed herein may provide a general purpose digital image transform that characterizes the content of the input image by emphasizing the locations where the gradient normal vectors intersect and/or diverge. Accordingly, this transform may provide concavity and convexity descriptors of the content. By virtue of its design, this novel integer-computation-based Gradient Direction Transform (GDT) can differentiate between the positive and negative direction of the gradient normal vectors, rather than only considering the orientation of the gradient normal vectors as done in the expensive floating-point-computation-based T&B technique. The GDT can be extended to consider the gradient tangent vector direction together or instead of the gradient normal vector direction. These GDT mappings can be used as standalone techniques or in combination with the classical techniques depending upon the target application. One application of the GDT is real-time iris detection purposes. It utilizes an efficient rasterizing algorithm for determining curves, developed by Bresenham, using simple integer addition and shift registers to perform the computations.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for obtaining structural information from a digital image 106 may be implemented. Examples of the electronic device 102 include smartphones, cellular phones, digital cameras, tablet devices, laptop computers, desktop computers, video cameras, etc.

The electronic device 102 may include a digital image 106 obtaining module 104, a gradient vector determination module 108 and/or a transformation module 112. As used herein, a "module" may be implemented in hardware (e.g., circuitry) or a combination of hardware and software. It should be noted that one or more of the modules described in connection with FIG. 1 may be optional. Furthermore, one or more of the modules may be combined or divided in some configurations. More specific examples of one or more of the functions, procedures and/or structures described in connection with FIG. 1 may be given in connection with one or more of FIGS. 2-6, 9-21 and 26-37.

The digital image 106 obtaining module 104 may obtain a digital image 106. For example, the electronic device 102 may capture a digital image 106 using one or more image sensors and/or cameras. Additionally or alternatively, the electronic device 102 may receive the digital image 106 from another device (e.g., a memory card, an external storage device, a web camera, a digital camera, a smartphone, a computer, a video camera, etc.).

The digital image 106 or a region of interest of the digital image 106 may be provided to the gradient vector determination module 108. The region of interest may include the entire digital image 106 or a portion of the digital image 106. For example, the region of interest may include a subset of the pixels of the digital image 106. In some configurations, the region of interest may be a cropped portion of the digital image 106. Additionally or alternatively, the region of interest may be a down-sampled or decimated version of all or part of the digital image 106. For instance, the region of interest may be a lower resolution version of all or part of the digital image 106.

In some configurations, the electronic device 102 (e.g., digital image obtaining module 104) may detect the region of interest as a particular structure shown in the digital image 106. For example, the electronic device 102 may detect a face, eye, character (e.g., number, letter, etc.) and/or other structure shown in the digital image 106. The electronic device 102 (e.g., digital image obtaining module 104) may extract the region of interest and/or crop out other portions of the digital image 106 to obtain the region of interest.

The gradient vector determination module 108 may determine a gradient vector for each pixel in a region of interest of the digital image 106. For example, the gradient vector determination module 108 may utilize one or more Sobel operators or Sobel filters to determine a gradient vector for each pixel in the region of interest. Other approaches may be utilized. In some configurations, each of the gradient vectors 110 may be represented as a first dimension component value (e.g., "dy") and a second dimension component value (e.g., "dx"). The gradient vectors 110 may be provided to the transformation module 112.

The transformation module 112 may transform each pixel in the region of interest (e.g., each gradient vector corresponding to each pixel in the region of interest) in accordance with a transform (e.g., the GDT). For example, the transformation module 112 may determine a first set of pixels for each pixel in the region of interest. The first set of pixels includes any pixel along a line that is collinear with or perpendicular to the gradient vector and that passes through the pixel location (and/or intersects the origin of the gradient vector for the current pixel, for example). For instance, the transformation module 112 may determine a line that is collinear with the gradient vector. The line may extend to one or more edges of the region of interest. For example, the line may extend from the current pixel (e.g., from the origin of the gradient vector) in one or both directions to one or more edges of the region of interest. Any pixel that is along the line may be included in the first set of pixels. It should be noted that a line may not be formed in some cases. For example, if the first dimension component value and the second dimension component value of the gradient vector are both 0, then no line may be formed (and hence no pixels may be along a line). In this case, a set of pixels (e.g., the first set of pixels) may be an empty set or may include only one pixel (e.g., the current pixel).

The transformation module 112 may increment, for each pixel, a first set of values in a transform space corresponding to any of the first set of pixels that are in a first direction of the line. For example, each value in the transform space corresponds to a pixel in the region of interest of the digital image 106 (in the image space). In some configurations, the transform space may include a set of elements, where each element of the transform space is represented as a first dimension position, a second dimension position and a value. The first dimension position and the second dimension position in the transform space may respectively correspond to a first dimension position and a second dimension position of the corresponding pixel in the image space. For example, the first dimension position may be represented as an index value along a vertical axis (e.g., y axis) and the second dimension position may be represented as an index value along a horizontal axis (e.g., x axis). Each value (e.g., score) in the transform space may indicate a number of lines intersecting a pixel corresponding to an element in the transform space.

The transformation module 112 may increment a first set of values in the transform space corresponding to any of the pixels in the first set of pixels in a first direction of the line. For example, the transformation module 112 may increment each value in the transform space that is along one direction of the line. The direction may be in the same direction as the gradient vector, in the opposite direction from the gradient vector, in one direction along a line that is perpendicular to the gradient vector or in the other direction along a line that is perpendicular to the gradient vector. One or more of the values may accumulate (e.g., increase) as values along lines corresponding to each pixel in the region of interest are incremented. Each value may accordingly represent a cumulative score.

In some configurations, the transformation module 112 may increment or decrement a second set of values corresponding to any of the pixels in the first set of pixels in a second direction of the line. For example, assume a configuration in which the first set of pixels includes pixels in line with a gradient vector that extends to two edges of the region of interest. In this example, the transformation module 112 may increment all values in the transform space corresponding to pixels in the first set of pixels that are in the same direction as the gradient vector. The transformation module 112 may also decrement all values in the transform space corresponding to pixels in the first set of pixels that are in the opposite direction from the gradient vector.

It should be noted that the term "increment" and variations thereof may mean incrementing in a positive direction (e.g., +1) or incrementing in a negative direction (e.g., −1). The term "decrement" and variations thereof may mean decrementing from a positive direction (e.g., −1) or decrementing from a negative direction (e.g., +1). When "increment" and "decrement" and variations thereof are used in a single context (e.g., in a configuration, in a claim, in an example, etc.), incrementing and decrementing are opposite operations. It should be noted that an increment size or decrement size may be an arbitrary value (e.g., +1, −1, 2, −2, etc.). In some configurations, increment and/or decrement size may be limited to integer values.

It should also be noted that the term "addition" and variations thereof may include adding positive numbers, negative numbers or a combination thereof. For example, −1 may be added to −1 to yield −2. In some configurations, "decrementing" may be implemented as an addition of a negative number. For example, an electronic device 102 may decrement a number by adding a negative number.

The transformation module 112 may provide values 114 corresponding to the transform space. For example, the values 114 may be the values (e.g., scores) from each element of the transform space. The values 114 may provide a measure of concavity and/or convexity of one or more structures (e.g., lines, curves, shapes, etc.) in the image. The values 114 may be utilized to determine one or more parameters of the one or more structures. In one example, high values 114 may indicate a focus (e.g., center) of structures. For instance, a maximum score may indicate the center of a circle (e.g., the iris of an eye) or an ellipse. Groups of approximately uniform values 114 may be utilized to determine the size of a shape. For example, rectangular shapes may exhibit approximately uniform values 114 along width and/or height of the shape. Patterns of scores may also be used to detect (e.g., recognize and/or identify) certain structures.

For clarity, some distinguishing characteristics of the transform (e.g., GDT) disclosed in accordance with the systems and methods disclosed herein are described as follows. It should be noted that some of these distinguishing characteristics may only apply in certain configurations of the transform (e.g., GDT).

The transform disclosed herein may specify one or more lines, where the one or more lines are collinear with the gradient vector and/or perpendicular to the gradient vector of each pixel. Some known transforms (e.g., the Hough transform) may utilize circles or cones. Utilizing circles or cones in a transform is more computationally complex than utilizing lines. Accordingly, the transform disclosed herein is advantageous because it is less computationally complex than transforms that utilize circles, cones or ellipses. In comparison, the transform disclosed herein may be computed more quickly and may utilize fewer resources (e.g., processing resources, memory, power, etc.).

The one or more lines specified in accordance with the transform disclosed herein may pass through the current pixel or origin of the gradient vector. As described above, the transform space values 114 along these one or more lines may be incremented and/or decremented. Some known approaches for detecting shapes (e.g., U.S. Patent Application Publication No. 2006/0098877) "vote" for pixels along a line that does not pass through the origin. The transform disclosed herein is superior to these known approaches for several reasons. For example, these known approaches require the specification of a number of sides of a polygon as well as a size (e.g., radius). In contrast, the transform disclosed herein may not require the specification of a number of sides or a size. Furthermore, the transform disclosed herein may operate on arbitrary shapes and/or curves of arbitrary size. These known approaches also require determining an endpoint in order to specify a line for "voting." Determining an endpoint may require floating point numbers, which the transform disclosed herein does not require. In general, operations with floating point numbers may be more computationally expensive than operations on integer values. Accordingly, the transform disclosed herein may operate more efficiently, more flexibly (e.g., with fewer constraints/assumptions) and/or more quickly than these known approaches.

In some configurations of the transform disclosed herein, arithmetic operations of the transform (e.g., GDT) may only include multiplication (e.g., integer multiplication), addition (e.g., integer addition) and/or subtraction (e.g., integer subtraction). For example, each iteration of a loop for determining the first set of pixels as described above may only utilize a multiplication by two (which may be implemented as a simple bit shift) and a limited number of addition and/or subtraction operations. Additionally or alternatively, some configurations of the transform disclosed herein may only utilize integer numbers (which may not be represented as floating point numbers, for example). Known approaches and/or transforms utilize computationally expensive operations and/or data representations (e.g., floating point numbers). For example, the T&B transform may utilize floating point numbers and operations such as a dot product, squaring the dot product and normalization. The Histogram of Gradients (HOG) may use floating point numbers and a normalization operation. Other approaches compute an angle using sine or cosine functions. However, the transform disclosed herein may not utilize floating point numbers. Furthermore, some configurations of the transform disclosed herein may not use computationally expensive operations such as the dot product, division, normalization, computing a norm, raising by a power (in general), sine, cosine, affine transformations, etc. Accordingly, the transform disclosed herein may be advantageous because it requires fewer resources (e.g., processing resources, power, time, etc.) than known approaches.

The transform disclosed herein may offer a computational complexity limited by $A^2BK_2$, where A is a longest dimension of a region of interest (e.g., a number of columns, width of a region of interest, etc.), B is the other dimension (e.g., a number of rows, height of a region of interest, etc.) and $K_2$ is a constant that includes a computational cost of a multiplication by two (which may be implemented as a bitwise shift) and a limited number of addition and/or subtraction operations. Other known approaches/transforms require a higher computational complexity. For example, the T&B transform has a complexity of $A^2B^2K_1$, where $K_1$ is a constant that includes a computational cost for a normalized floating point vector dot product. Accordingly, the transform disclosed herein offers lower computational complexity than other approaches. This is advantageous because the transform disclosed herein may be performed with fewer resources (e.g., processing resources, power, time, etc.) than known approaches.

Some configurations of the transform disclosed herein may only update values corresponding to pixels along a line for each pixel. Other approaches (e.g., T&B) may update values corresponding to all pixels for each pixel. Accordingly, the values that are affected based on a gradient vector corresponding to a single pixel may be fewer in some configurations of the transform disclosed herein. This may be beneficial by reducing computational complexity and improving the robustness in comparison with known approaches.

In some configurations of the transform disclosed herein, one or more lines may extend across the entire region of interest. However, some other approaches may utilize gradient vectors 110 to only operate on a very localized window (e.g., 3×3 pixels, 5×5 pixels, etc.). In contrast, the gradient corresponding to a single pixel may selectively affect values across the region of interest in accordance with some configurations of the transform disclosed herein.

The transform disclosed herein may only utilize certain aspects of each gradient vector. For example, the transform disclosed herein may operate with only the origin and direction (e.g., orientation) of the gradient vectors 110. In particular, each line specified by the transform disclosed herein may be generated only with the origin and direction of the gradient vector. In contrast, the Hough transform utilizes the magnitude of a gradient vector. The direction of the gradient vector in accordance with the transform disclosed herein may be represented in terms of a first dimension component value (with sign) and a second dimension component value (with sign). The transform disclosed herein may not explicitly calculate an angle of the gradient vector. In contrast, other approaches use trigonometric functions (e.g., sine, cosine, etc.) to obtain vector angles. Also, the T&B transform squares a dot product, which eliminates the direction of the vector. In other words, vector sign is irrelevant to the T&B transform. By utilizing only certain aspects of each gradient vector (e.g., origin and direction) in a simple representation (e.g., origin with two values and direction in terms of two values), the transform disclosed herein requires fewer resources (e.g., processing resources, power, time, etc.) in comparison with known approaches/transforms.

The transform disclosed herein may produce a transform space with a particular meaning. The transform space may be represented as a set of elements, where each element includes a first dimension position (e.g., y0), a second dimension position (e.g., x0) and a value. In some configurations, the transform space may be represented with only the first dimension position, the second dimension position and the value. As described above, each value may represent a number of lines intersecting a pixel that corresponds to the element in the transform space (e.g., an accumulated score based on lines corresponding to pixels in the region of interest). Other transform spaces in known approaches may represent different quantities. For example, a transform space in accordance with the Generalized Hough Transform may represent votes for the size, orientation and location of an ellipse. In another example, the Hough transform produces a transform space that provides line parameters. The transform disclosed herein produces a transform space that provides a measure of concavity and/or convexity of one or more structures in a digital image 106.

Figure 2:
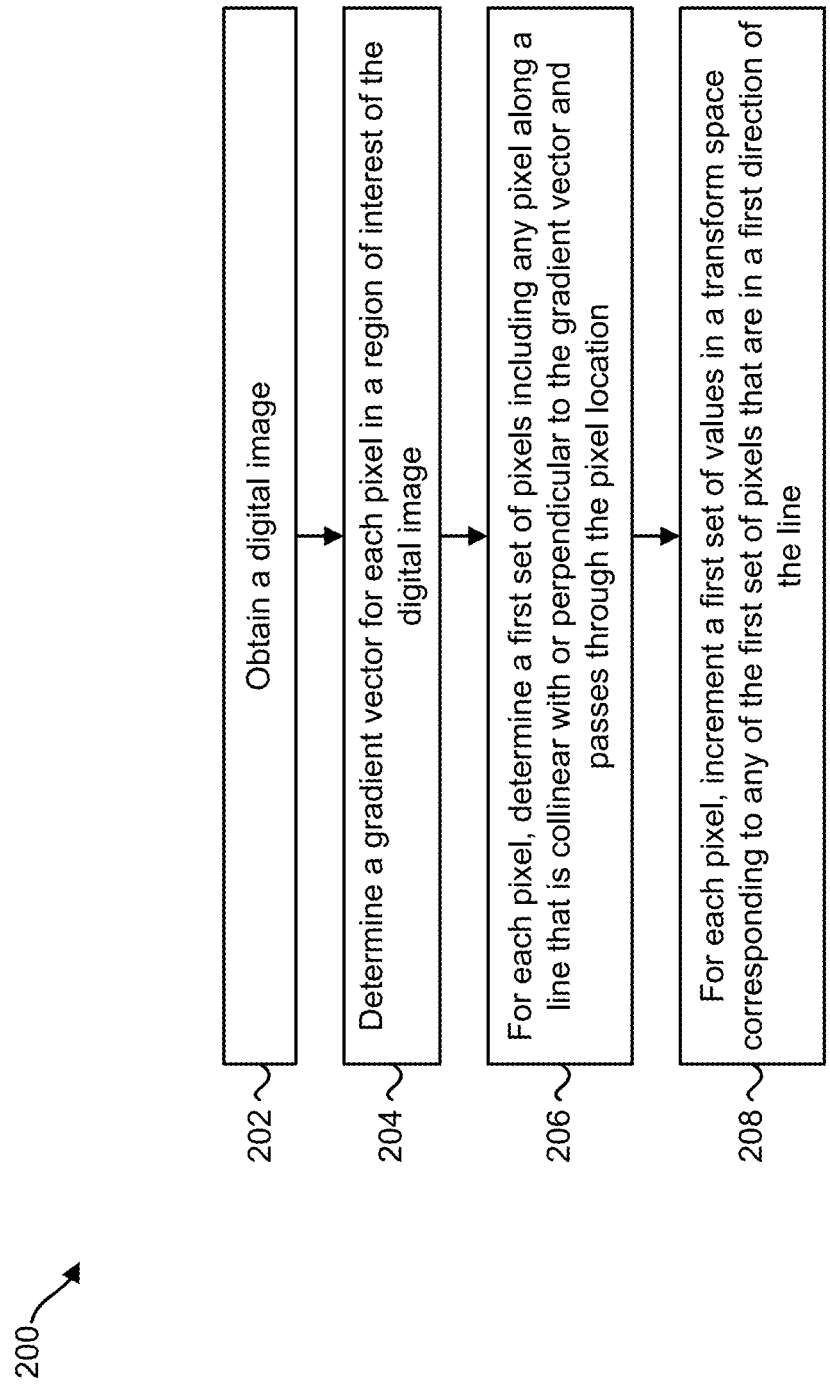
FIG. 2 is a flow diagram illustrating one configuration of a method for obtaining structural information from a digital image.

FIG. 2 is a flow diagram illustrating one configuration of a method 200 for obtaining structural information from a digital image 106. The method may be performed by the electronic device 102 described in connection with FIG. 1. The electronic device 102 may obtain 202 a digital image 106. This may be accomplished as described above in connection with FIG. 1, for example.

The electronic device 102 may determine 204 a gradient vector for each pixel in a region of interest of the digital image 106. This may be accomplished as described above in connection with FIG. 1, for example.

For each pixel, the electronic device 102 may determine 206 a first set of pixels including any pixel along a line that is collinear with or perpendicular to the gradient vector and that passes through the pixel location (and/or intersects an origin of the gradient vector, for example). This may be accomplished as described above in connection with FIG. 1, for example.

For each pixel, the electronic device 102 may increment 208 a first set of values in a transform space corresponding to any of the first set of pixels that are in a first direction of the line. This may be accomplished as described above in connection with FIG. 1, for example.

Transforming each pixel in the region of interest may comprise determining 206 the first set of pixels and incrementing 208 the first set of values. Transforming each pixel in the region of interest in accordance with the systems and methods disclosed herein solves technological problems. In particular, transforming the pixels solves a problem of efficiently representing object features in digital images. As discussed above, many approaches utilize transforms that are computationally more complex (e.g., with floating point number representation and/or more computationally expensive functions such as dot products and sine or cosine functions). Accordingly, those approaches may waste power and/or hinder implementation on platforms with limited processing capability and/or limited power resources (e.g., mobile devices powered with batteries). However, the systems and methods disclosed herein may enable faster processing and/or greater energy efficiency. This enables efficient object feature representation, which may allow efficient processing on a variety of platforms and in particular, on mobile platforms where processing and power are limited resources.

The values 114 in the transform space (e.g., the transformed pixels) may be utilized in a variety of applications. For example, the values 114 may be applied to object detection, object tracking and/or object recognition in digital images. For instance, the values 114 may provide an indication of object parameters, such as a center point of an iris. Additionally or alternatively, the values 114 may provide recognitions patterns for handwriting characters.

Figure 3A:
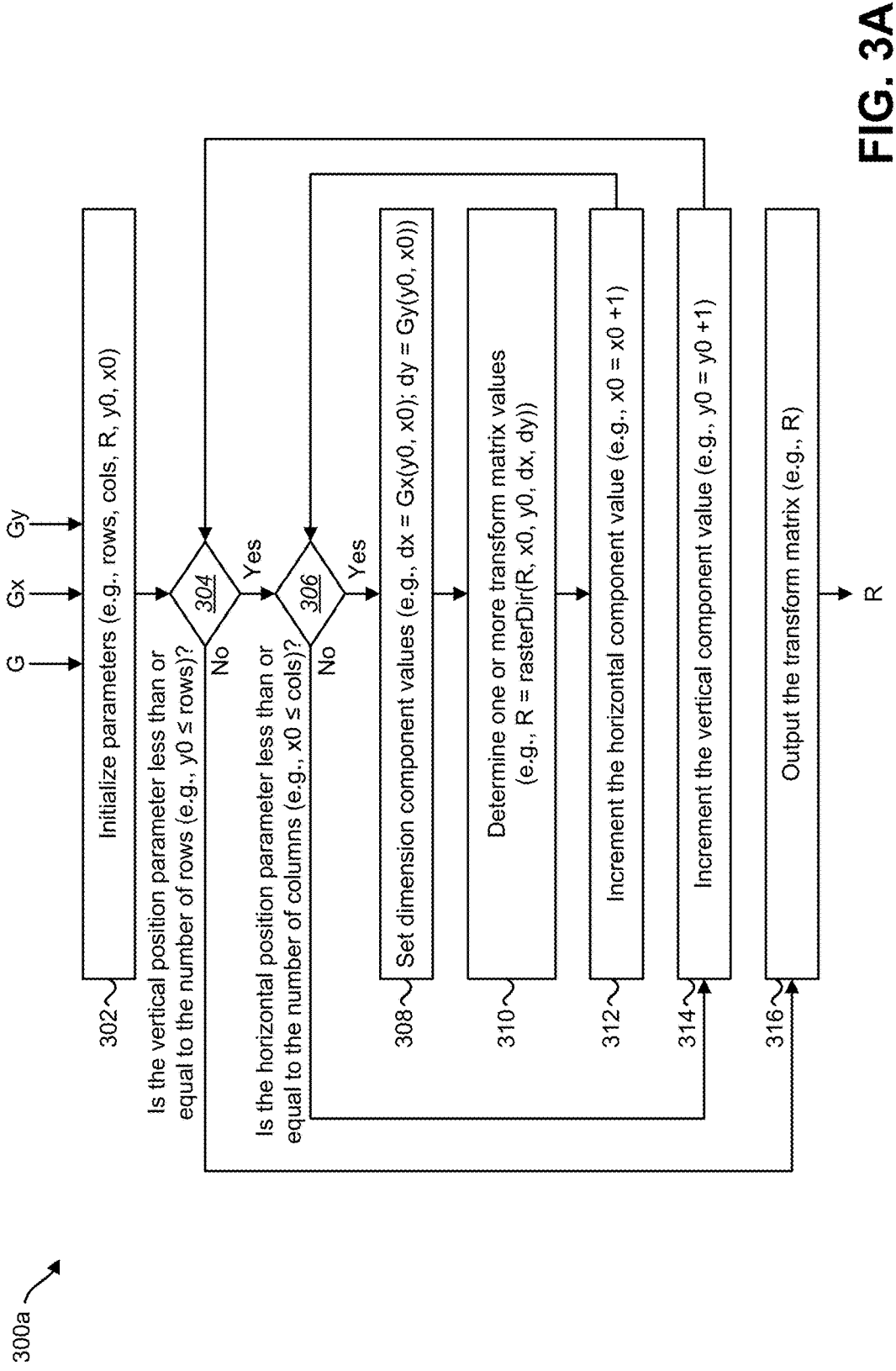
FIG. 3A is a flow diagram illustrating a configuration of a method for transforming each pixel in the region of interest in accordance with a transform.

FIG. 3A is a flow diagram illustrating a configuration of a method 300a for transforming each pixel in the region of interest in accordance with a transform. The method may be performed by the electronic device 102 described in connection with FIG. 1, for example. Specifically, FIG. 3A illustrates an example of an algorithm of the gradient direction transform (e.g., a function call, R=gdt(G, Gx, Gy)). The algorithm may be implemented, for example, as a gdt(G, Gx, Gy) function that takes three inputs: G, Gx and Gy. G is a matrix (e.g., image) that represents the pixels in the region of interest. Gx is a matrix representing a gradient horizontal component of the region of interest and Gy is a matrix representing a gradient vertical component of the region of interest. It should be noted that the variable names described herein and/or depicted in the Figures are merely examples. Other variable names may be utilized.

The electronic device 102 may initialize 302 parameters. For example, a "rows" parameter may be set to the number of rows in G (e.g., rows=rows(G)). A "cols" parameter may be set to the number of columns in G (e.g., cols=columns (G)). All element values in a transform matrix R may be initially set to 0, for example. The transform matrix R may include values 114 in the transform space. A vertical position parameter y0 may be initially set to 1 (e.g., y0=1) and a horizontal position parameter x0 may be initially set to 1 (e.g., x0=1).

The electronic device 102 may determine 304 whether the vertical position parameter is less than or equal to the rows parameter (e.g., y0≤rows, "y0<=rows"). If the vertical position parameter is not less than or equal to the rows parameter, the electronic device 102 may output 316 the transform matrix R.

If the vertical position parameter is less than or equal to the rows parameter, the electronic device 102 may determine 306 whether the horizontal position parameter is less than or equal to the columns parameter (e.g., x0≤cols, "x0<=cols"). If the horizontal position parameter is not less than or equal to the columns parameter, the electronic device 102 may increment 314 the vertical position parameter (e.g., y0=y0+1). The electronic device 102 may return to determining 304 whether the vertical position parameter is less than or equal to the number of rows.

If the horizontal position parameter is less than or equal to the columns parameter, the electronic device 102 may set 308 dimension component values (e.g., dx=Gx(y0, x0); dy=Gy(y0, x0)). For example, the electronic device 102 may set a horizontal dimension component value (e.g., dx) to the value of the gradient horizontal component matrix (e.g., Gx) at a row and column indicated by the vertical position parameter (e.g., y0) and the horizontal position parameter (e.g., x0). The electronic device may additionally set a vertical dimension component value (e.g., dy) to the value of the gradient vertical component matrix (e.g., Gy) at a row and column indicated by the vertical position parameter (e.g., y0) and the horizontal position parameter (e.g., x0).

The electronic device 102 may determine 310 one or more transform matrix values (e.g., R=rasterDir(R, x0, y0, dx, dy)). For example, the electronic device 102 may increment one or more values of the transform matrix (e.g., R) along a line that is collinear with or perpendicular to the gradient vector (e.g., dx, dy) and passes through a pixel location (e.g., x0, y0). An example of an algorithm for determining 310 one or more transform matrix values is given in connection with FIG. 3B.

The electronic device 102 may increment 312 the horizontal component value (e.g., x0=x0+1). The electronic device 102 may return to determining 306 whether the horizontal position parameter is less than or equal to the number of columns. As illustrated in FIG. 3A, the algorithm may iterate over the rows and columns of G, obtaining the transform matrix (or one or more values of the transform matrix) R at each pixel location.

Figure 3B:
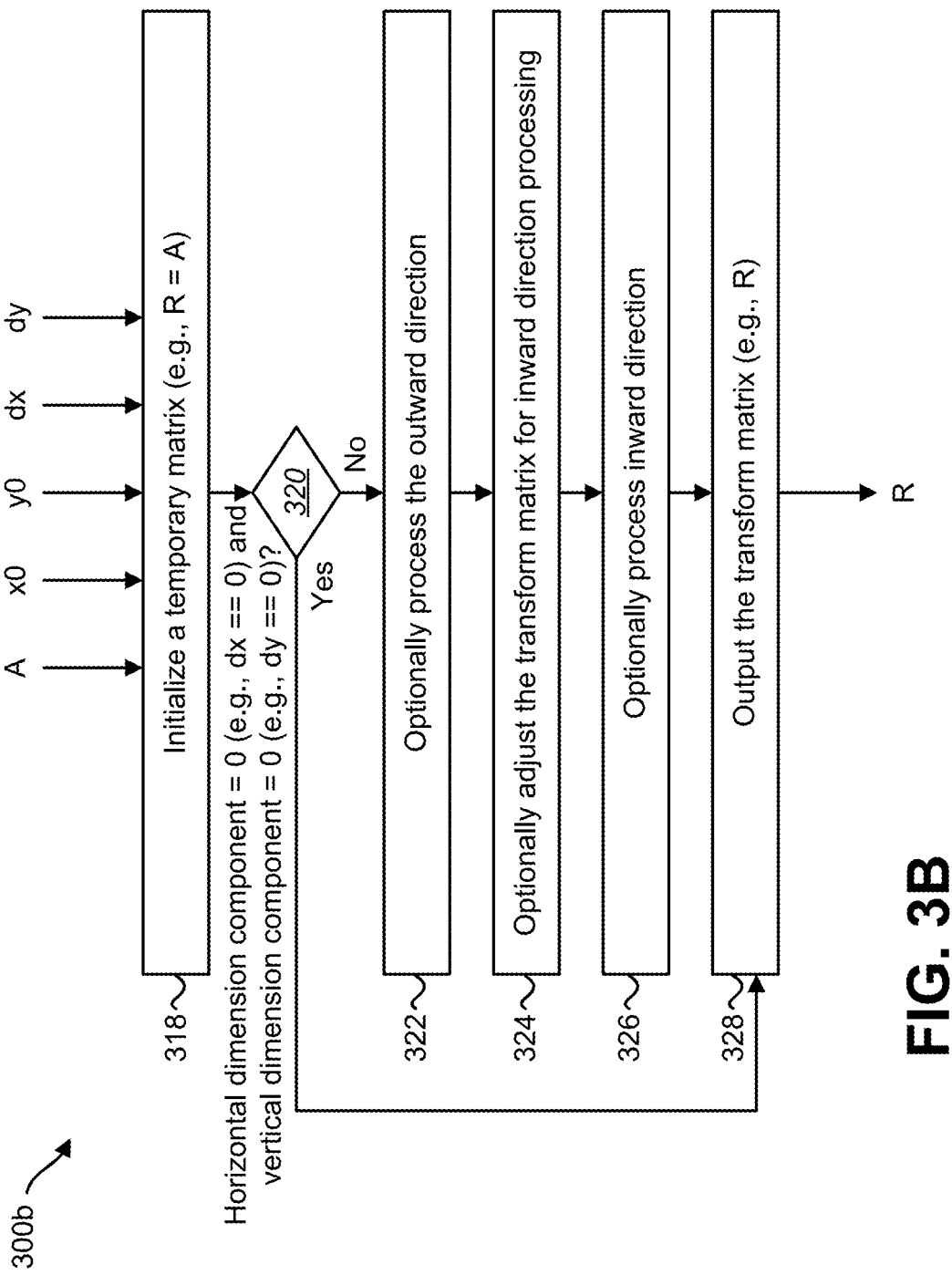
FIG. 3B is a flow diagram illustrating a configuration of a method for determining one or more transform matrix values.

FIG. 3B is a flow diagram illustrating a configuration of a method 300b for determining one or more transform matrix values. The method 300b may be performed by the electronic device 102 described in connection with FIG. 1, for example. More specifically, FIG. 3B illustrates an example of an algorithm for determining one or more transform matrix values that takes any inputs A, x0, y0, dx and dy (e.g., a function call, R=rasterDir(A, x0, y0, dx, dy)), where A is a matrix variable name, where x0, y0, dx and dy are scalar variable names, and where the algorithm returns a matrix R (e.g., R=rasterDir(A, x0, y0, dx, dy)).

The electronic device 102 may initialize 318 a temporary matrix (e.g., R) as equal to the input matrix A (e.g., R=A). The electronic device 102 may determine 320 whether the horizontal dimension component (e.g., dx) is equal to 0 and the vertical dimension component (e.g., dy) is equal to 0 (e.g., dx==0 AND dy==0). If the horizontal dimension component (e.g., dx) is equal to 0 and the vertical dimension component (e.g., dy) is equal to 0 (e.g., dx==0 AND dy==0), the electronic device 102 may output 328 the transform matrix (e.g., R). For example, in the case that the gradients components in both directions are zero, the transform matrix (e.g., R) may not be modified (for that pixel location, for instance).

If the horizontal dimension component (e.g., dx) is not equal to 0 or the vertical dimension component (e.g., dy) is not equal to 0, the electronic device 102 may optionally process 322 the outward direction (of the gradient vector, for example). Processing 322 the outward direction may include incrementing one or more values in a direction relative to the gradient vector (e.g., collinear with or perpendicular to the gradient vector). Processing 322 the outward direction may be based on the input matrix (e.g., A), the horizontal position parameter (e.g., x0), the vertical position parameter (e.g., y0), the horizontal dimension component value (e.g., dx), the vertical dimension component value (e.g., dy) and/or a direction parameter (e.g., dir). In some configurations, processing 322 the outward direction may be performed in accordance with a function rasterDirection(A, x0, y0, x0+dx, y0+dy, dir), where dir is −1 (or optionally 1 or 0). For instance, x1=x0+dx and y1=y0+dy. The direction parameter (e.g., dir) may represent an amount by which values in the transform space are incremented and/or decremented. In some configurations, optionally processing 322 the outward direction may be performed in accordance with the pseudo code in Listing (1).

| Listing (1) |
| --- |
| /* process outward direction */<br>dir = −1; /* optionally, dir=1; or dir=0; */<br>R = rasterDirection(A, x0, y0, x0+dx, y0+dy, dir); |

The electronic device 102 may optionally adjust 324 the transform matrix (e.g., R). For example, the electronic device may subtract the direction parameter from the value of the transform matrix at position indicated by the horizontal position parameter and the vertical position parameter (e.g., R(y0, x0)=R(y0, x0)−dir). The adjustment 324 may be performed in some configurations and/or cases because the pixel location (y0, x0) may be processed twice, being part of both the outward and inward lines. In some configurations, optionally adjusting 324 the transform matrix may be performed in accordance with the pseudo code in Listing (2).

Listing (2)

```
/* adjust for inward direction*/
R(y0, x0) = R(y0, x0) − dir;
```

In some configurations, the adjustment may be optionally utilized in the application of the transform to raster only along one direction (inward or outward) or both. For example, configuring the transform along only one direction may reduce the total computation and avoid processing the same pixel twice. It should be noted that such configurations are optional and/or may only be used in certain use cases.

The electronic device 102 may process 326 the inward direction (of the gradient vector, for example). Processing 326 the inward direction may include incrementing one or more values in a direction relative to the gradient vector (e.g., collinear with or perpendicular to the gradient vector, opposite from the outward direction). Processing 326 the inward direction may be based on the transform matrix (e.g., R), the horizontal position parameter (e.g., x0), the vertical position parameter (e.g., y0), the horizontal dimension component value (e.g., dx), the vertical dimension component value (e.g., dy) and a direction parameter (e.g., dir). In some configurations, processing 326 the inward direction may be performed in accordance with a function rasterDirection(R, x0, y0, x0−dx, y0−dy, dir), where dir is 1. For instance, x1=x0−dx and y1=y0−dy. In some configurations, processing 326 the inward direction may be performed in accordance with the pseudo code in Listing (3).

Listing (3)

```
/* process inward direction */
dir = 1;
R = rasterDirection(R, x0, y0, x0−dx, y0−dy, dir);
```

Depending on the configuration, the electronic device 102 may process 326 just the inward direction or may process 322 the outward direction and process 326 the inward direction. More detail regarding processing 322 the outward direction and/or processing 326 the inward direction is described in connection with FIG. 3C. The electronic device 102 (e.g., the rasterDir function) may output 328 the transform matrix (e.g., R).

Figure 3C:
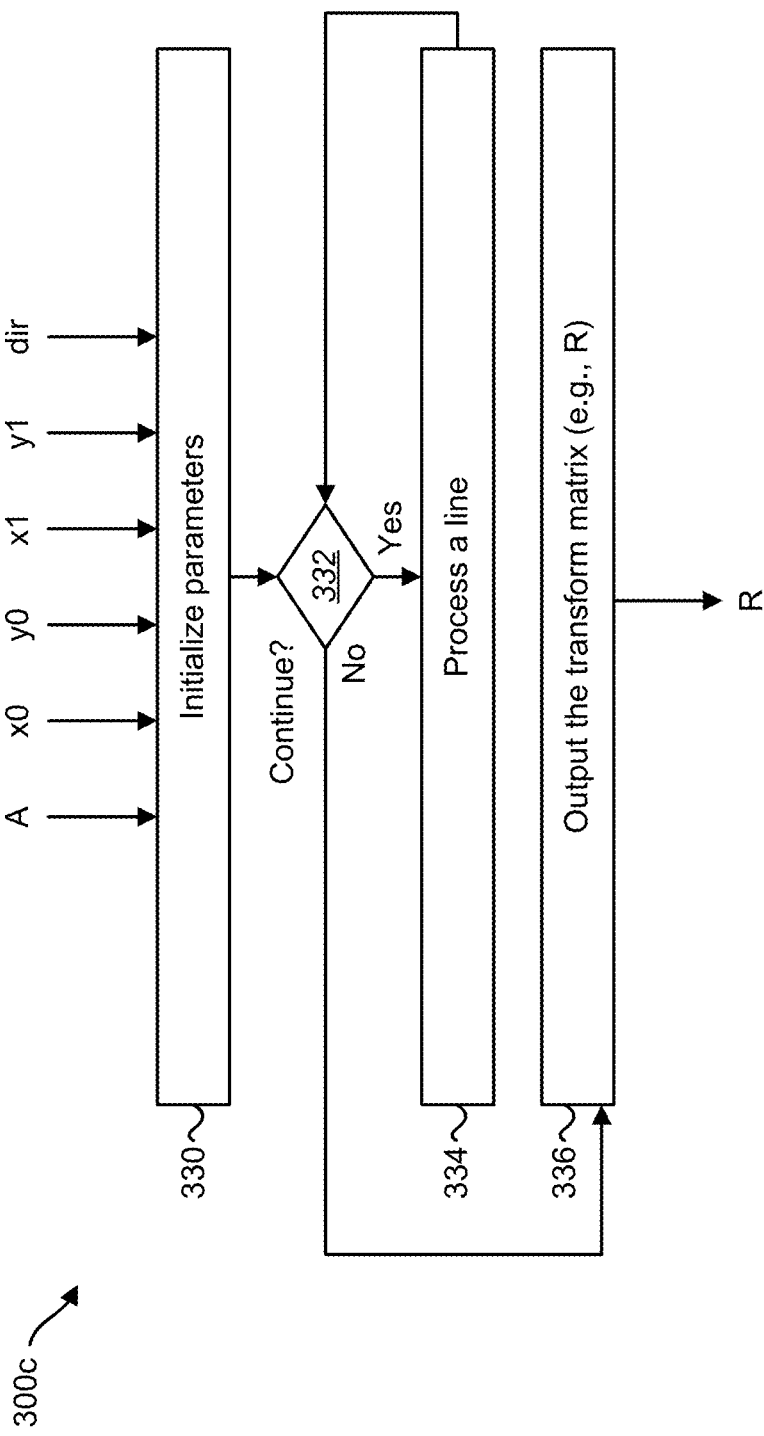
FIG. 3C is a flow diagram illustrating a configuration of a method for processing a direction.

FIG. 3C is a flow diagram illustrating a configuration of a method 300c for processing a direction. The method may be performed by the electronic device 102 described in connection with FIG. 1, for example. More specifically, FIG. 3C illustrates an example of an algorithm for processing a direction that takes inputs A, x0, y0, x1, y1 and dir (e.g., function call R=rasterDirection(A, x0, y0, x1, y1, dir)).

The electronic device 102 may initialize 330 parameters. For example, the electronic device 102 may determine a horizontal dimension component value (e.g., dx) as the absolute value of the difference of a first horizontal dimension component value (e.g., x0) and a second horizontal dimension component value (e.g., x1). For example, dx=abs(x1−x0). The electronic device 102 may initialize a horizontal sign value (e.g., sx). For example, the electronic device 102 may initialize the horizontal sign value based on the first horizontal dimension component value (e.g., x0) and the second horizontal dimension component value (e.g., x1). If the first horizontal dimension component value is less than the second horizontal dimension component value, the horizontal sign value may be set to 1. Otherwise, the horizontal sign value may be set to −1. For instance, if (x0<x1), sx=1; else sx=−1.

The electronic device 102 may determine a vertical dimension component value (e.g., dy) as the negative absolute value of the difference of a first vertical dimension component value (e.g., y0) and a second vertical dimension component value (e.g., y1). For example, dy=−abs(y1−y0). The electronic device 102 may initialize a vertical sign value (e.g., sy). For example, the electronic device 102 may initialize the vertical sign value based on the first vertical dimension component value (e.g., y0) and the second vertical dimension component value (e.g., y1). If the first vertical dimension component value is less than the second vertical dimension component value, the vertical sign value may be set to 1. Otherwise, the vertical sign value may be set to −1. For instance, if (y0<y1), sy=1; else sy=−1.

The electronic device 102 may initialize an error value (e.g., err). For example, the error value may be the sum of the horizontal dimension component value (e.g., dx) and the vertical dimension component value (e.g., dy). For instance, err=dx+dy.

The electronic device 102 may initialize a row parameter (e.g., "rows") to the number of rows in the input matrix (e.g., A) and may initialize a column parameter (e.g., "cols") to the number of columns in the input matrix (e.g., A). For example, rows=rows (A) and cols=columns(A). In some configurations, the transform matrix (e.g., R) may be set to the temporary matrix (e.g., A). For example, R=A. It should be noted that A is the matrix input variable name. A continue indicator (e.g., "cont") may be initialized to 1 (e.g., cont=1). In some configurations, initializing 330 parameters may be accomplished in accordance with the pseudo code in Listing (4).

Listing (4)

```
/* set initial values */
dx = abs(x1−x0);
if (x0<x1), sx=1; else sx=−1; end;
dy = −abs(y1−y0);
if (y0<y1), sy=1; else sy=−1; end;
err = dx + dy;
rows = number of rows in A;
cols = number of columns in A;
R = A;
cont = 1;
```

The electronic device 102 may determine 332 whether to continue processing (e.g., whether cont==1). This determination may be based on the continue indicator. If the electronic device 102 determines not to continue processing, the electronic device 102 (e.g., the rasterDirection function) may output 336 the transform matrix (e.g., R). For example, if cont==0, then the electronic device 102 may output the transform matrix.

If the electronic device 102 determines to continue processing (e.g., if cont==1), the electronic device 102 may process 334 a line. For example, the electronic device 102 may increment a value in the transform matrix by the direction parameter (e.g., dir). For instance, R(y0, x0)=R(y0, x0)+dir. The electronic device 102 may multiply the error value to obtain a multiplied error value (e.g., e2). For example, e2=2*err. The electronic device 102 may adjust the error value (e.g., err) and one or more of the position parameters (e.g., x0 and/or y0) based on the multiplied error value, the horizontal dimension component value, the vertical dimension component value, the horizontal sign and/or the vertical sign. For example, if (e2≥dy), err=err+dy, x0=x0+sx; end; if (e2≤dx), err=err+dx, y0=y0+sy; end. The electronic device 102 may update the continue indicator when one or more conditions are met. For example, if the horizontal position parameter is less than 1 or is greater than the number of columns or if the vertical position parameter is less than 1 or is greater than the number of rows, the electronic device 102 may update the continue indicator to indicate that processing should not continue for the line. For instance, if ((x0<1) OR (x0>cols) OR (y0<1) OR (y0>rows)) cont=0; end. As illustrated in FIG. 3C, the electronic device 102 may continue to process the line until the continue indicator indicates that processing should not continue. In some configurations, processing 334 the line may be accomplished in accordance with the pseudo code given in Listing (5).

Listing (5)

```
R(y0,x0) = R(y0,x0) + dir;
e2 = 2 * err;
if (e2>=dy), err=err+dy; x0=x0+sx; end;
if (e2<=dx), err=err+dx; y0=y0+sy; end;
if ((x0<1) OR (x0>cols) OR (y0<1) OR (y0>rows)) cont=0; end;
```

Figure 4:
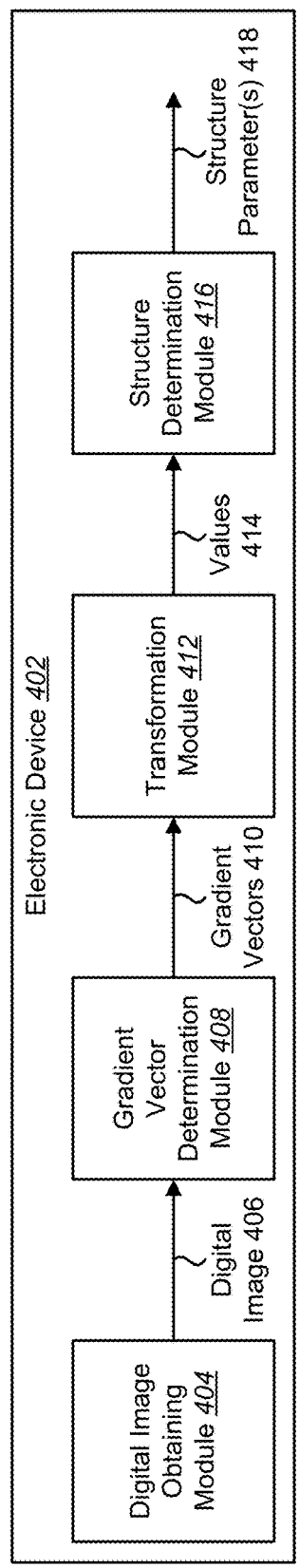
FIG. 4 is a block diagram illustrating another configuration of an electronic device in which systems and methods for obtaining structural information from a digital image may be implemented.

FIG. 4 is a block diagram illustrating another configuration of an electronic device 402 in which systems and methods for obtaining structural information from a digital image 406 may be implemented. The electronic device 402 described in connection with FIG. 4 may be an example of the electronic device 402 described in connection with one or more of FIGS. 1-2.

The electronic device 402 may include a digital image obtaining module 404, a gradient vector determination module 408, a transformation module 412 and/or a structure determination module 416. It should be noted that one or more of the modules described in connection with FIG. 4 may be optional. Furthermore, one or more of the modules may be combined or divided in some configurations. More specific examples of one or more of the functions, procedures and/or structures described in connection with FIG. 4 may be given in connection with one or more of FIGS. 1-3,5-6,9-21 and 26-37.

The digital image obtaining module 404 may obtain a digital image 406. For example, the electronic device 402 may obtain a digital image as described above in connection with FIG. 1. The digital image 406 or a region of interest of the digital image 406 may be provided to the gradient vector determination module 408 as described above in connection with FIG. 1. For example, the electronic device 402 may detect the region of interest as a particular structure shown in the digital image 406. For instance, the electronic device 402 may detect a face, eye, text, character (e.g., number, letter, etc.) and/or other structure shown in the digital image 406.

The gradient vector determination module 408 may determine a gradient vector for each pixel in a region of interest of the digital image 406. For example, the gradient vector determination module 408 may determine gradient vectors 410 as described above in connection with one or more of FIGS. 1-2. The gradient vectors 410 may be provided to the transformation module 412.

The transformation module 412 may transform each pixel in the region of interest (e.g., each gradient vector corresponding to each pixel in the region of interest) in accordance with a transform (e.g., the GDT). For example, the transformation module 412 may determine a first set of pixels for each pixel in the region of interest as described in connection with one or more of FIGS. 1-3C. The transformation module 412 may provide values 114 corresponding to the transform space to the structure determination module 416. For example, the values 114 may be the values 114 (e.g., scores) from each element of the transform space (e.g., transform matrix R).

The structure determination module 416 may determine one or more structure parameters 418 based on the values 114. As described above, the values 114 may provide a measure of concavity and/or convexity of one or more structures (e.g., lines, curves, shapes, etc.) in the digital image 406 (e.g., in the region of interest). The values 114 may be utilized to determine one or more parameters of the one or more structures. In one example, high values 114 may indicate a focus (e.g., center) of structures.

In some configurations, the structure determination module 416 may determine an iris position in the region of interest based on the values 414 (e.g., transform space, transform matrix R, etc.). For example, the structure determination module 416 may determine a first dimension position and a second dimension position corresponding to a maximum value in the transform space. In particular, the structure determination module 416 may determine an element of the transform space with a maximum value. The first dimension position and the second dimension position of the element may correspond to a pixel in the region of interest where the center of a circle or ellipse (e.g., an iris center) is located. In some configurations, the location of the iris may be utilized to perform one or more operations, such as eye tracking (e.g., for 3-dimensional (3D) image processing), user interface (UI) control, camera steering, zoom, autofocus, etc.

In some configurations, the electronic device 402 may perform additional operations. For example, the electronic device 402 may perform a second transform (e.g., a Hough transform) on the digital image 406 (e.g., region of interest). Determining the iris position may then be based on a confidence measure that combines information from the transform space (of the GDT, for example) and the second transform (e.g., Hough).

The electronic device 402 may additionally or alternatively perform blur convolution based on the digital image 406 to produce weights and gradient vectors 410. The electronic device 402 may weight the GDT space based on the weights to produce a weighted GDT space. The structure determination module 416 may utilize the weighted transform space to determine the one or more structure parameters 418 (e.g., the location of an iris).

In some configurations, the structure determination module 416 may perform character recognition (e.g., handwriting recognition). For example, the structure determination module 416 may use the transforms for the normal gradient direction and the tangent gradient direction to compute corresponding feature maps and construct a compact feature vector, called a Gradient Direction Descriptor (GDD), containing unique discriminant information. For instance, the GDD me be used as an input (instead of the raw input image, for instance) to handwriting classifiers such as Deep Neural Networks (DNN) to achieve higher recognition accuracies with less computations and memory requirements.

Figure 5:
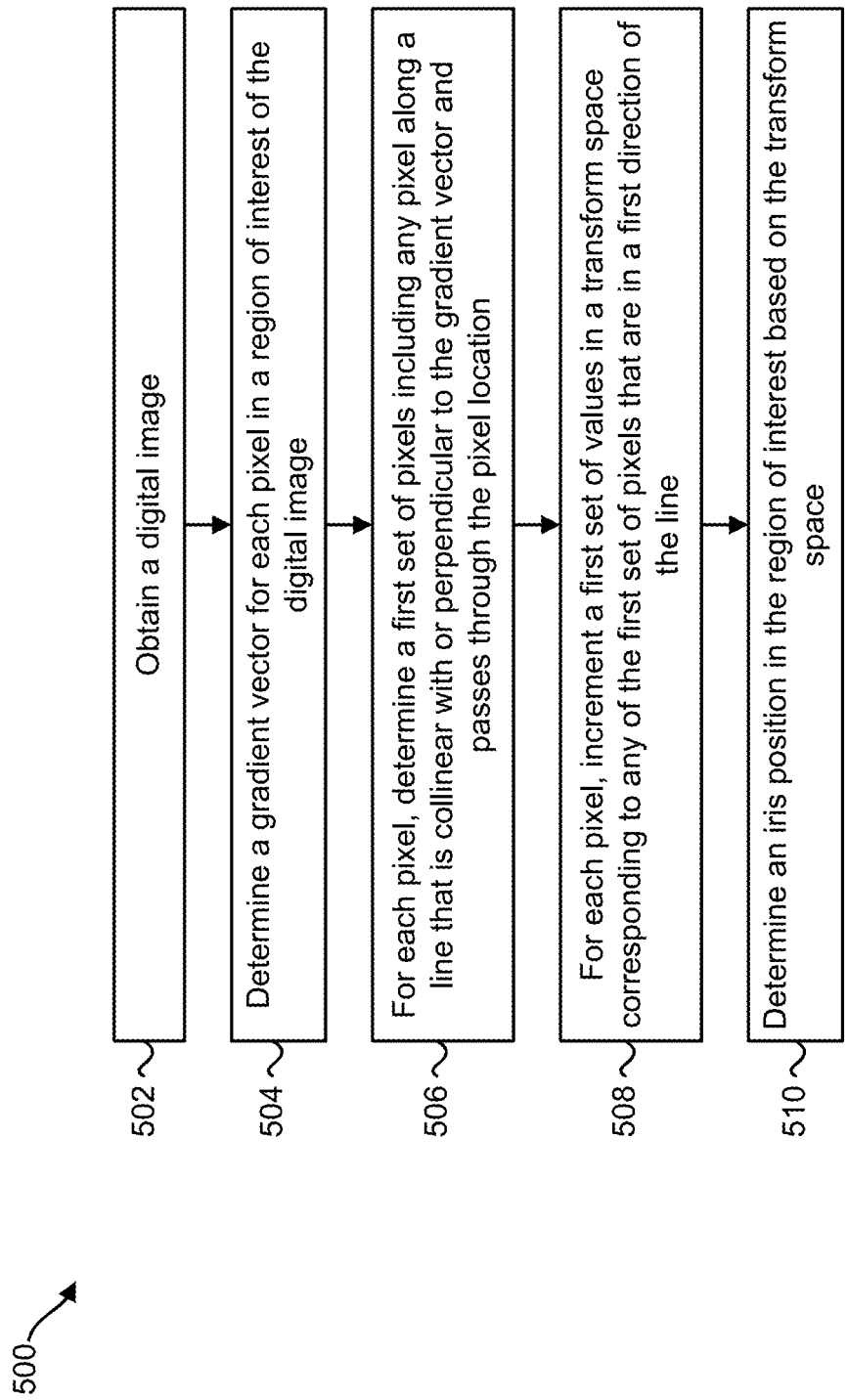
FIG. 5 is a flow diagram illustrating another configuration of a method for obtaining structural information from a digital image.

FIG. 5 is a flow diagram illustrating another configuration of a method 500 for obtaining structural information from a digital image 406. The method 500 may be performed by the electronic device 402 described in connection with FIG. 4. The electronic device 402 may obtain 502 a digital image 406. This may be accomplished as described above in connection with one or more of FIGS. 1-2 and 4, for example.

The electronic device 402 may determine 504 a gradient vector for each pixel in a region of interest of the digital image 406. This may be accomplished as described above in connection with one or more of FIGS. 1-2 and 4, for example.

For each pixel, the electronic device 402 may determine 506 a first set of pixels including any pixel along a line that is collinear with or perpendicular to the gradient vector and that passes through the pixel location (and/or intersects an origin of the gradient vector). This may be accomplished as described above in connection with one or more of FIGS. 1-4, for example.

For each pixel, the electronic device 402 may increment 508 a first set of values 114 in a transform space corresponding to any of the first set of pixels that are in a first direction of the line. This may be accomplished as described above in connection with one or more of FIGS. 1-4, for example.

The electronic device 402 may determine 510 an iris position in the region of interest based on the transform space. This may be accomplished as described above in connection with one or more of FIGS. 1 and 4, for example. For instance, the highest value of the values 414 in the transform space (e.g., transform matrix R) may be determined 510 as the iris position (e.g., the center of the iris).

Figure 6:
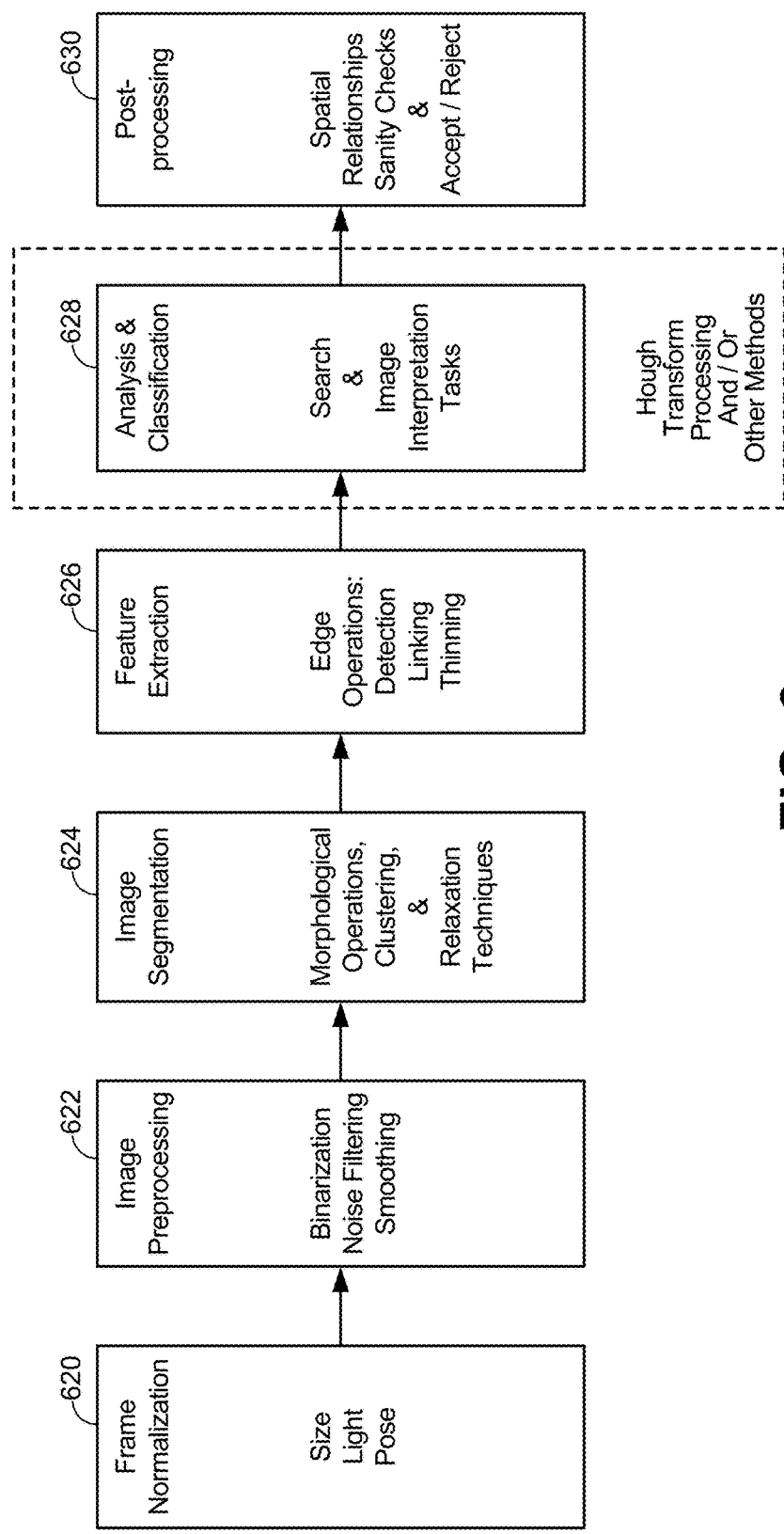
FIG. 6 is a block diagram illustrating examples of some modules that may be implemented in conjunction with some configurations of the systems and methods disclosed herein.

FIG. 6 is a block diagram illustrating examples of some modules that may be implemented in conjunction with some configurations of the systems and methods disclosed herein. In particular, FIG. 6 illustrates a frame normalization module 620, an image preprocessing module 622, an image segmentation module 624, a feature extraction module 626, an analysis and classification module 628 and a post-processing module 630. One or more of these modules may be implemented in an electronic device (e.g., the electronic device 102 described in connection with FIG. 1 and/or the electronic device 402 described in connection with FIG. 4). In some configurations, one or more of the modules described in connection with FIG. 6 may be utilized for optical eye tracking.

The frame normalization module 620 may normalize a digital image 106 frame. For example, the frame normalization module 620 may normalize the size, light and/or pose of a frame. The image preprocessing module 622 may perform binarization, noise filtering and/or smoothing on the digital image 106.

The image segmentation module 624 may perform morphological operations, clustering and/or relaxation techniques on the digital image 106. The feature extraction module 626 may perform one or more edge operations (e.g., detection, linking and/or thinning).

The analysis and classification module 628 may perform one or more search and/or image interpretation tasks. For example, the analysis and classification module 628 may perform the transform disclosed herein (as described in connection with one or more of FIGS. 1-5) and/or one or more other transforms (e.g., Hough transform) and/or other operations. For instance, the analysis and classification module 628 may perform the GDT in order to detect an iris (e.g., determine a location of an iris) in some configurations.

Iris detection may be performed for one or more applications. For example, iris detection may be performed for optical eye tracking. In some configurations, the analysis and classification module 628 may perform character recognition (e.g., handwriting recognition).

The post-processing module 630 may determine spatial relationships, perform one or more sanity checks and/or accept or reject the image interpretation provided by the analysis and classification module 628. For example, the post-processing module 630 may check the spatial relationships of one or more structures (e.g., eyes, nose, mouth, etc.) in an image. If the spatial relationships of the structures are beyond a threshold range in distance (e.g., a nose is indicated above the eyes), then the post-processing module 630 may reject the image interpretation. However, if the spatial relationships of the structures are within a threshold range in distance, the post-processing module 630 may accept the image interpretation.

FIG. 7 illustrates an example of a Hough transform utilized for iris detection. Previous studies in the literature of digital image transformation for shape description involve Hough transform engines (HTE), histogram approaches such as histogram of gradient (HOG), edge histogram descriptor (EHD), histogram of sign of gradient (HSG) and Timm & Barth transform (T&B), among others. (See e.g., Paul V. C. Hough, "Method and Means for Recognizing Complex Patterns," U.S. Pat. No. 3,069,654, issued on Dec. 18, 1962; D. H. Ballard, "Generalizing the Hough Transform to Detect Arbitrary Shapes," Pattern Recognition Vol. 13, No. 2 pp. 111-122, 1981; Magdi Mohamed and Irfan Nasir, "Method and System for Parallel Processing of Hough Transform Computations," U.S. Pat. No. 7,406,212, issued on Jul. 29, 2008; N. Dalal and B. Triggs, "Histogram of Oriented Gradients for Human Detection," in IEEE Conference Computer Vision and Pattern Recognition, June 2005; EISO/IEC/JTC1/SC29/WG11, "Core Experiment Results for Edge Histogram Descriptor (CT4)," MPEG document M6174, Beijing, July 2000; Fabian Timm and Erhardt Barth, "Accurate Eye Center Localisation by Means of Gradients," in Proceedings of the Int. Conference of Computer Theory and Application (VISAPP), Volume 1, pp. 125-130, Algarve, Portugal, 2011.) Daugman also proposed a contour analyzing algorithm for iris recognition applications. (See John Daugman, "How Iris Recognition Works", IEEE Transactions on Circuits and Systems for Video Technology, Vol. 14, No. 1, pp. 21-30, 2004.) For handwriting recognition applications, one technique based on the conventional binary distance transform called the bar transform descriptor (BAR) was described and shown to provide good accuracy. (See Paul Gader, Magdi Mohamed, and Jung-Hsien Jiang, "Comparison of Crisp and Fuzzy Character Neural Networks in Handwritten Word Recognition," IEEE Transactions on Fuzzy Systems, Vol. 3, No. 3, pp. 357-363, 1995.) In connection with FIGS. 7-8, details of selected techniques applied in the literature to common applications of interest are described.

As described above, the Hough transform is one approach that may be utilized for detecting an iris. Iris detection in accordance with the Hough transform may have one or more aspects and/or requirements. In particular, the Hough transform may deal with variations in light and reflections. It may deal with partially occluded, missing and noisy features. No special markers or makeup may be required. The Hough transform may feature real-time processing. It may also quantify action codes. Accordingly, the Hough approach may detect multiple curves and is resilient to noisy inputs.

More specifically, early activities for detecting parameterized shapes such as straight lines, circles and ellipses in binary digital images used the Hough transform. (See Paul V. C. Hough, "Method and Means for Recognizing Complex Patterns," U.S. Pat. No. 3,069,654, issued on Dec. 18, 1962.) Gray input images are usually binarized based on an estimation of the gradient amplitude and an optimal threshold before computing the Hough transform. While the Hough approach was found to be very robust and also capable of detecting multiple curves using a single transform, it is computationally expensive and requires large memory for characterizing shapes with a large number of parameters. Several extensions have been proposed to generalize the Hough method including the Ballard approach. (See D. H. Ballard, "Generalizing the Hough Transform to Detect Arbitrary Shapes," Pattern Recognition Vol. 13, No. 2 pp. 111-122, 1981.)

Formally, the conventional Hough transform uses a primitive curve form satisfying the equation $$s(x,p)=0 \tag{1}$$

where p is a parameter vector and x is a position vector in the input image. This can be viewed as an equation defining points x in the image space for a fixed parameter vector p, or as defining points in a parameter space for fixed values of the position vector x (i.e., for a particular pixel location). In computation of a Hough transform, the parameter space is quantized to discrete values of the parameter vector to form a Hough parameter space P. For a fixed parameter vector $p_k \in P$, the coordinates of x in the image space that satisfy equation (1) are denoted as $x_n(p_k)$. The value of the corresponding point in the parameter space is defined as $$H(p_k) = \sum_{n=1}^{N} A(x_n(p_k)) \tag{2}$$

where A(x) is the gray level value of the pixel at position x, and N is the total number of pixels in the input image data. Usually, A(x) is set to the value 1 for foreground pixels and 0 for background pixels. The value corresponding to a point in the Hough transform space can then be calculated recursively as $$H_0(p_k)=0$$

$$H_n(p_k)=H_{n-1}(p_k)+A(x_n(p_k)), \; n=1{:}N \tag{3}$$

FIG. 7 shows a sample Hough transform for eye detection (e.g., image space and Hough space). For each point $(x_1, y_1)$ in the image space of example A 732a, there is a corresponding cone in the Hough space whose cross-section at radius of size r is shown in the Hough space for circles. The image space in example A 732a is illustrated in height (y) versus width (x) (in pixels, for example). The Hough space is shown in dimensions of β versus α. In example B 732b (e.g., eye detection), an edge image after thresholding is shown on the right hand side, and the resultant best ellipse and circle fits representing the detected eyelid and iris boundaries are shown on the left hand side. This method may be robust, since moving a point in the image space will result only in moving its corresponding cone in the Hough space, in this case, but since the rest of the cones are not moved, the solution will remain the same implying resilience to noise.

Since Hough transform computations are naturally parallelizable, dedicated hardware designs have already been considered for real time application domains that require higher levels of accuracy. (See Magdi Mohamed and Irfan Nasir, "Method and System for Parallel Processing of Hough Transform Computations," U.S. Pat. No. 7,406,212, issued on Jul. 29, 2008.) The Hough approach remains one of the most successful techniques for many image analysis applications. It triggered a unique paradigm for transforming a 0-dimension point in the image space into a 1-dimension curve, or n-dimension structure in the transform space, for robust shape detection uses.

Figure 8:
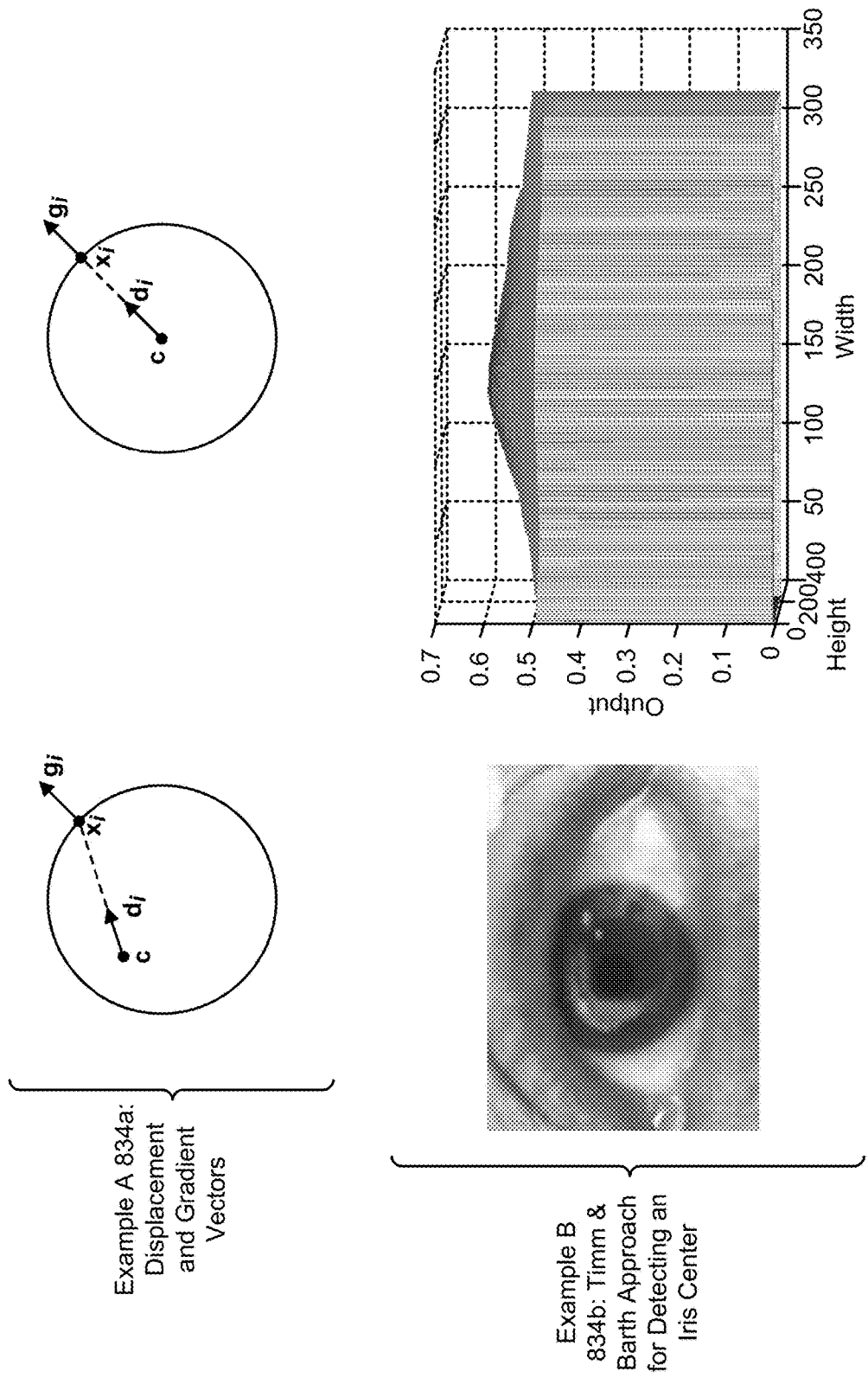
FIG. 8 illustrates the Timm & Barth approach for detecting the center of an iris.

FIG. 8 illustrates the Timm & Barth approach for detecting the center of an iris. In particular, FIG. 8 illustrates the Timm & Barth (T&B) image transform. Timm & Barth defined an approach for iris detection by analyzing the vector field of the image gradients. (See Fabian Timm and Erhardt Barth, "Accurate Eye Center Localisation by Means of Gradients," in Proceedings of the Int. Conference of Computer Theory and Application (VISAPP), Volume 1, pp. 125-130, Algarve, Portugal, 2011.) The approach is motivated by the availability of graphics processing units (GPUs), since it involves intensive computations of dot products of normalized vectors constructed from the input image.

As illustrated in example A 834a, let c be a possible object center and $g_i$ be a normalized gradient vector at position $x_i$. The normalized displacement vector $d_i$ is defined as shown in the two cases of example A 834a. The estimated center c* of a circular object in an image with pixel positions $x_i$, where i=1 to N, is given by $$c^* = \underset{c}{\operatorname{argmin}}\left\{\frac{1}{N}\sum_{i=1}^{N}(d_i^T g_i)^2\right\} \tag{4}$$

$$d_i = \frac{x_i - c}{\|x_i - c\|_2}, \; \forall \; i\colon \|g_i\|_2 = 1$$

Prior knowledge about the object center can be incorporated by applying a weight $w_c$ for each possible center c and the modified objective becomes $$\underset{c}{\operatorname{argmin}}\frac{1}{N}\sum_{i=1}^{N} w_c(d_i^T g_i)^2 \tag{5}$$

Example B 834b accordingly illustrates one example of the T&B approach for detecting an iris center.

Figure 9:
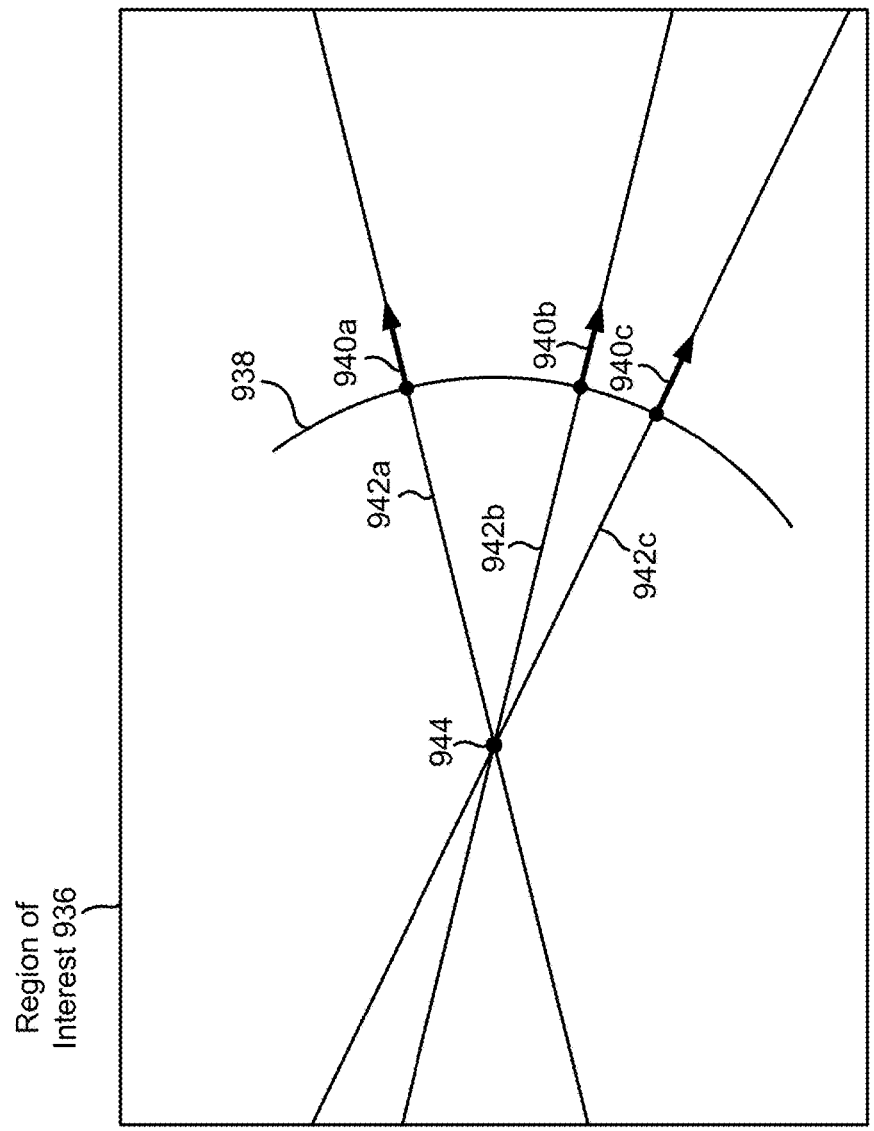
FIG. 9 is a diagram illustrating one example of the transform disclosed herein.

FIG. 9 is a diagram illustrating one example of the transform disclosed herein. Advances in image sensor technologies have made high data rate digital inputs available to mobile device applications. Several approaches for transforming digital images into different domains and feature maps that achieve analysis results are discussed above. While they may succeed in performing such tasks to certain extent, a major concern remains to be the increased complexities of both memory management and floating point processing in small footprint and low-power battery-operated devices. Although it is possible to quantize the gradient directions for some pragmatic uses, this may result in reduced performance levels. Some configurations of the transform (e.g., an integer computation based transform) disclosed herein addresses these concerns by reducing the complexities without quantizing the gradient direction values or sacrificing overall performance.

In particular, FIG. 9 illustrates a concept of the Gradient Direction Transform (GDT). For example, a non-parametric approach for the analysis of closed and/or open curves 938 in digital images may be utilized as a mechanism of emphasizing concavities and convexities in its constituent components using gradient information. Some configurations of this new transform may rely only on the estimated gradient direction (ignoring the gradient amplitude) to characterize the shapes of naturally curved items 938, particularly in ambiguous and noisy imaging situations.

In some configurations, the GDT may be constructed as follows. After initializing a transform matrix (e.g., R) to zeroes, for each gradient vector 940a-c in the input image region of interest 936, increment or decrement the value of the cells in the transform matrix that are in line 942a-c with gradient vectors 940a-c according to their location. For example, depending on the application, just the locations identified by the straight lines 942a-c determined by the gradient vectors may be incremented, or only the inward locations (opposite the vector 940a-c direction, for example) may be incremented and the outward locations (in the vector 940a-c direction, for example) may be decremented. It is also possible to leave the outward locations with no adjustments to further reduce the computations.

By doing so, it is clear that the computation is greatly reduced to estimating the un-normalized gradient vectors and identifying the straight line 942a-c associated with each of them. Another useful characteristic of the GDT is that, in addition to the gradient vector direction, a second mapping may be constructed by considering the tangent direction that is orthogonal to the gradient vector direction, to characterize other features depending on the application of the transform.

As described above in connection with FIGS. 1-2 and 4-5, electronic devices may determine (e.g., estimate) gradient vectors (e.g., gradient vectors 940a-c). In some configurations, computation of the gradient of an image f(x, y) may be based on obtaining the partial derivatives Gx=df/dx and Gy=df/dy at every pixel location. Several linear convolution operators can be used to numerically estimate ($G_x$, $G_y$) including Sobel operators, Prewitt operators and/or Scharr operators. Other nonlinear approaches (e.g., mathematical morphology) may be used to estimate the gradients when the image is extremely noisy. Sobel operators of size (3×3) for each image axis may be utilized in conjunction with the new transform and the conventional ones for proper performance evaluation.

As can be observed in the example of FIG. 9, incrementing values along lines 942a-c corresponding to the gradient vectors 940a-c of curved items 938 may tend to accumulate at a location (e.g., center 944) relative to the curved item. For circles and ellipses, for example, the value at the center 944 may tend to be higher than other values, since the lines 942a-c that are collinear with the gradient vectors 940a-c intersect at the center 944.

Figure 10:
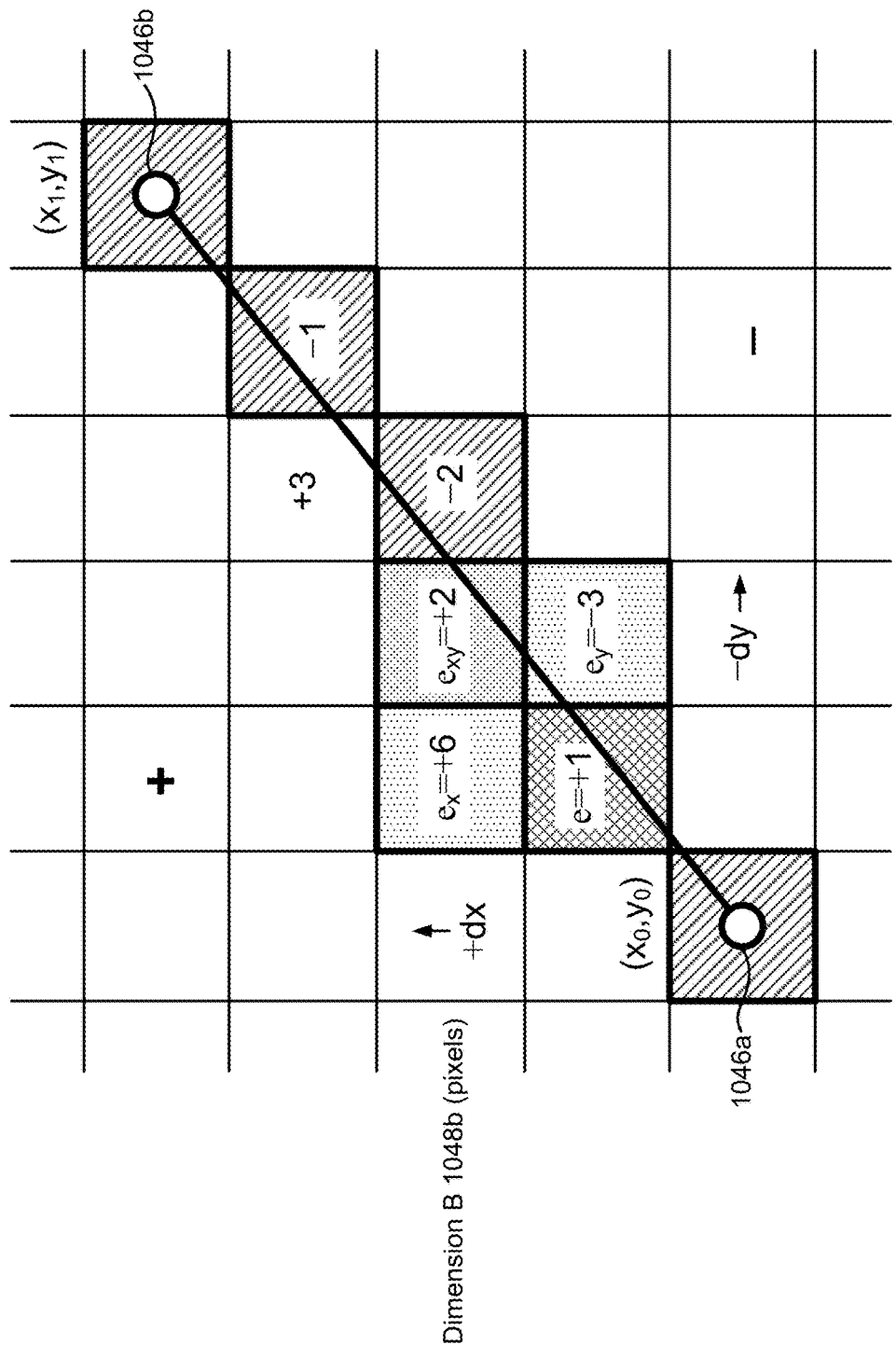
FIG. 10 is a diagram illustrating one example of Bresenham's algorithm for drawing straight lines.

FIG. 10 is a diagram illustrating one example of Bresenham's algorithm for drawing straight lines. A class of efficient techniques (e.g., rasterizing algorithms) for drawing curves in digital images based on Bresenham's algorithm is described. (See Alois Zingl, "A Rasterizing Algorithm for Drawing Curves, Technical Report, Multimedia and Software, Technikum-Wien, Wien, 2012.) A modified version of Bresenham's algorithm may be utilized for drawing straight lines to identify the locations of cells ($x_i$, $y_i$) in the GDT to be updated according to each gradient direction estimate. The stopping criterion may be modified to exit the loop when the cell location is outside of the region of interest, to avoid solving for intersections with boundary lines and finding end points that requires floating point computations. Hence, for each pixel, only the gradient estimates ($G_x$, $G_y$) may be required to complete the transform commutations. It is clear, from the C-code in Listing (6), which is a simple example of Bresenham's line algorithm, that this algorithm only requires integer additions, multiplication by two (bit shifts) and bitwise logical operations. These implementation details significantly reduce the complexity of the GDT algorithm. The line rasterizing algorithm may be utilized for implementing the GDT.

Listing (6)

```
void plotLine(int x0, int y0, int x1, int y1)
{
    int dx = abs(x1-x0), sx = x0<x1 ? 1 : -1;
    int dy = -abs(y1-y0), sy = y0<y1 ? 1 : -1;
    int err = dx+dy, e2; /* error value e_xy */
    for(;;){ /* loop */
        setPixel(x0, y0);
        if (x0==x1 && y0==y1) break;
        e2 = 2*err;
        if (e2 >= dy) { err += dy; x0 += sx; } /* e_xy+e_x > 0 */
        if (e2 <= dx) { err += dx; y0 += sy; } /* e_xy+e_y < 0 */
    }
}
```

Specifically, FIG. 10 illustrates the operation of Bresenham's algorithm for drawing a line between a first point 1046a (e.g., (x0, y0)) and a second point 1046b (e.g., (x1, y1)). In this example, the line is plotted in dimension B 1048b (in pixels) over dimension A 1048a (in pixels). For example, dimension A 1048a could be the width of an image and dimension B 1048b could be the height of an image or vice versa.

Figure 11:
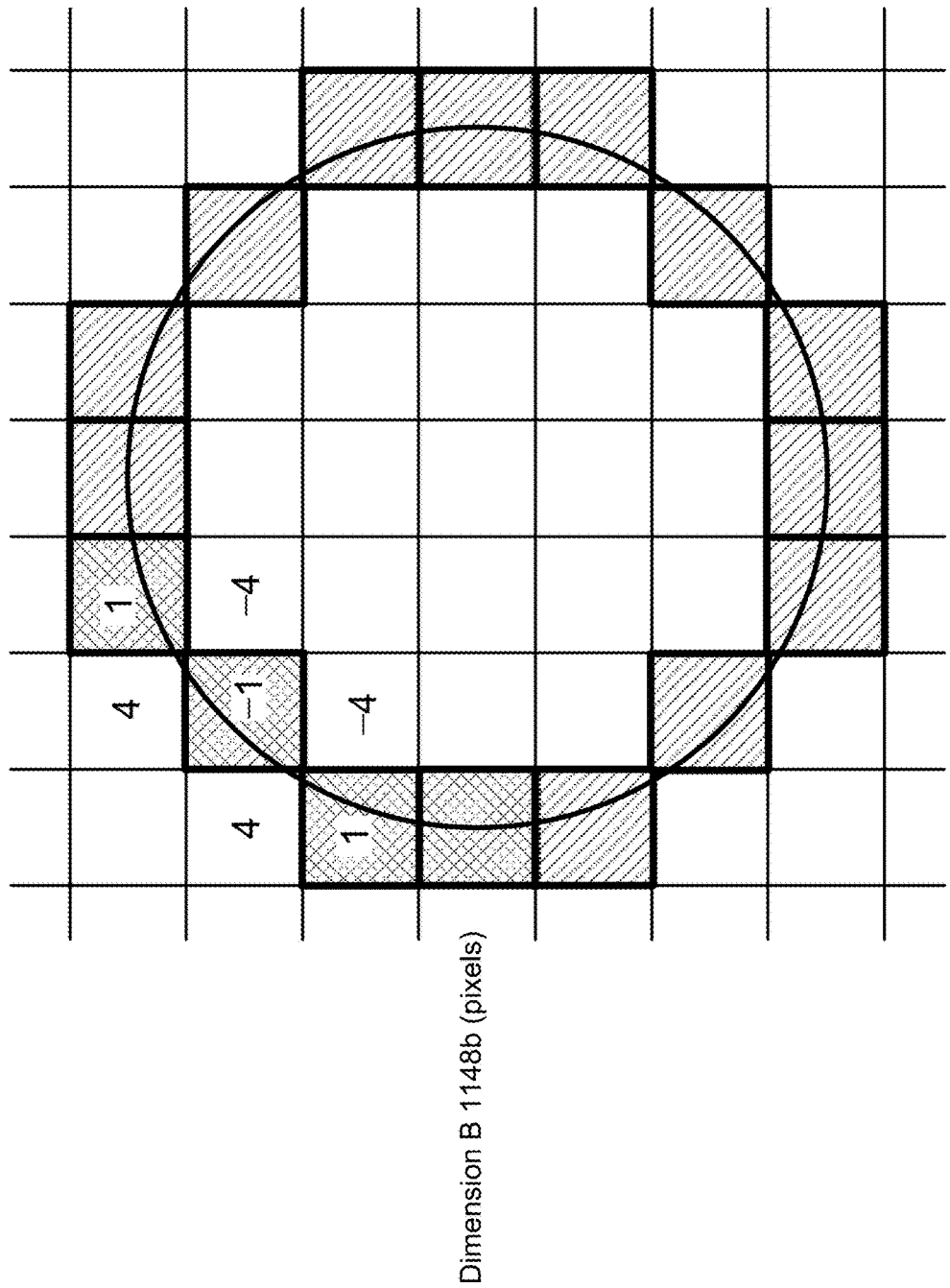
FIG. 11 is a diagram illustrating one example of Bresenham's algorithm for drawing circles.

FIG. 11 is a diagram illustrating one example of Bresenham's algorithm for drawing circles. Bresenham's algorithm can be extended efficiently to draw other curves such as circles among others to be utilized in the Hough transform, for example. The C-code in Listing (7), illustrates an implementation of the circle algorithm.

Listing (7)

```
void plotCircle(int xm, int ym, int r)
{
    int x = -r, y = 0, err = 2-2*r; /* II. Quadrant */
    do {
        setPixel(xm-x, ym+y); /* I. Quadrant */
        setPixel(xm-y, ym-x); /* II. Quadrant */
        setPixel(xm+x, ym-y); /* III. Quadrant */
        setPixel(xm+y, ym+x); /* IV. Quadrant */
        r = err;
        if (r <= y) err += ++y*2+1; /* e_xy+e_y < 0 */
        if (r > x || err > y) err += ++x*2+1; /*e_xy+e_x > 0 or
        no 2nd y-step */
    } while (x < 0);
}
```

Specifically, FIG. 11 illustrates the operation of Bresenham's algorithm for drawing a circle with radius r. In this example, the circle is plotted in dimension B 1148b (in pixels) over dimension A 1148a (in pixels). For example, dimension A 1148a could be the width of an image and dimension B 1048b could be the height of an image or vice versa.

Figure 12:
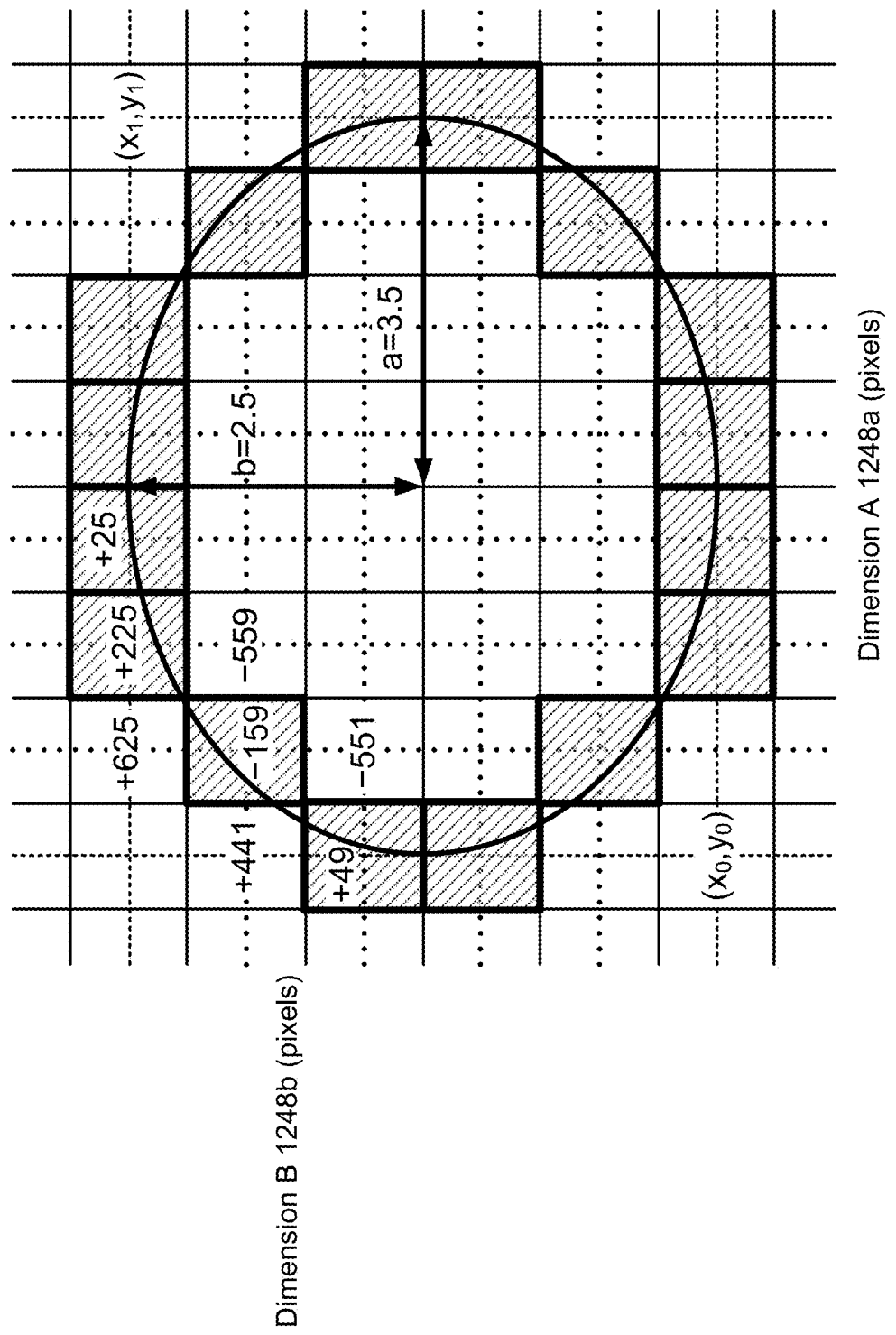
FIG. 12 is a diagram illustrating one example of Bresenham's algorithm for drawing ellipses.

FIG. 12 is a diagram illustrating one example of Bresenham's algorithm for drawing ellipses. Bresenham's algorithm can be extended efficiently to draw other curves such as ellipses among others to be utilized in the Hough transform, for example. The C-code in Listing (8) illustrates an implementation of the ellipse algorithm. In particular, Listing (8) plots an ellipse inside a specified rectangle.

Listing (8)

```
void plotEllipseRect(int x0, int y0, int x1, int y1)
{
    int a = abs(x1-x0), b=abs(y1-y0), b1 = b&1; /* values of diameter */
    long dx = 4*(1-a)*b*b, dy = 4*(b1+1)*a*a; /* error increment */
    long err = dx+dy+b1*a*a, e2; /* error of 1.step */
    if (x0 > x1) { x0 = x1; x1 +=a; } /* if called with swapped points */
    if (y0 > y1) y0 = y1; /* .. exchange them */
    y0 += (b+1)/2; y1 = y0-b1; /* starting pixel */
    a *= 8*a; b1 = 8*b*b;
    do {
        setPixel(x1, y0); /* I. Quadrant */
        setPixel(x0, y0); /* II. Quadrant */
        setPixel(x0, y1); /* III. Quadrant */
        setPixel(x1, y1); /* IV. Quadrant */
        e2 = 2*err;
        if (e2 <= dy) { y0++; y1--; err += dy += a; } /* y step */
        if (e2 >= dx) || 2*err > dy) { x0++; x1--; err += dx += b1; }
        /* x step */
    } while (x0 < x1);
    while (y0-y1 < b) { /* too early stop of flat ellipses a=1 */
        setPixel(x0-1, y0); /* -> finish tip of ellipse */
        setPixel(x1+1, y0++);
        setPixel(x0-1, y1);
        setPixel(x1+1, y1--);
    }
}
```

In this example, the ellipse is plotted in dimension B 1248*b* (in pixels) over dimension A 1248*a* (in pixels). For example, dimension A 1148*a* could be the width of an image and dimension B 1048*b* could be the height of an image or vice versa.

FIG. 13 illustrates examples of applications of the transform disclosed herein. In particular, FIG. 13 illustrates a diamond shape 1350, a rounded rectangle 1352, a handwritten character ("3") 1354, a fingerprint 1356 and an image of an eye 1358. The transform disclosed herein may be applied to detection of any of these items and others. For example, an electronic device 102 may take a gradient direction transform of an image of any of these items.

As follows, a description is given of examples and experiments conducted to evaluate the transform disclosed herein. In particular, two different and specific applications are described, one for iris detection and one for handwriting recognition. These examples illustrate the generality and potential uses of the GDT for image analysis and computer vision tasks.

In general, intensive application of preprocessing to a given image may introduce unexpected distortion to the data which may cause irrecoverable errors in the analysis. Even through simple binarization of the gray scale image, useful information can be lost. To avoid the risk of suppressing important shape information in an implementation of the GDT, some configurations of the systems and methods disclosed herein may utilize limited preprocessing. For example, preprocessing applied to the input images may include scaling to a fixed size region of interest, with addition to smoothing, to ensure a reliable estimation of gradient vectors, in both iris detection and handwriting recognition applications.

Figure 14:
FIG. 14 illustrates one example of an image of an eye.

FIG. 14 illustrates one example of an image 1460 of an eye. Images may be captured in color in some configurations. In FIG. 14, the image 1460 of the eye is illustrated in grayscale for convenience. In this example, the image 1460 is a sample image of dimensions 320×240 pixels. FIGS. 14-27 provide examples and comparisons between the GDT and T&B for iris detection on a sample eye image 1460. Iris detection is the task of finding the center of a partial (e.g., circular/elliptical) structure containing the iris image. It should be noted that while a gray image representation (one-band) is utilized for purposes of illustration, the transform can be applied to each image band (3-bands of color) in a similar manner.

Figure 15:
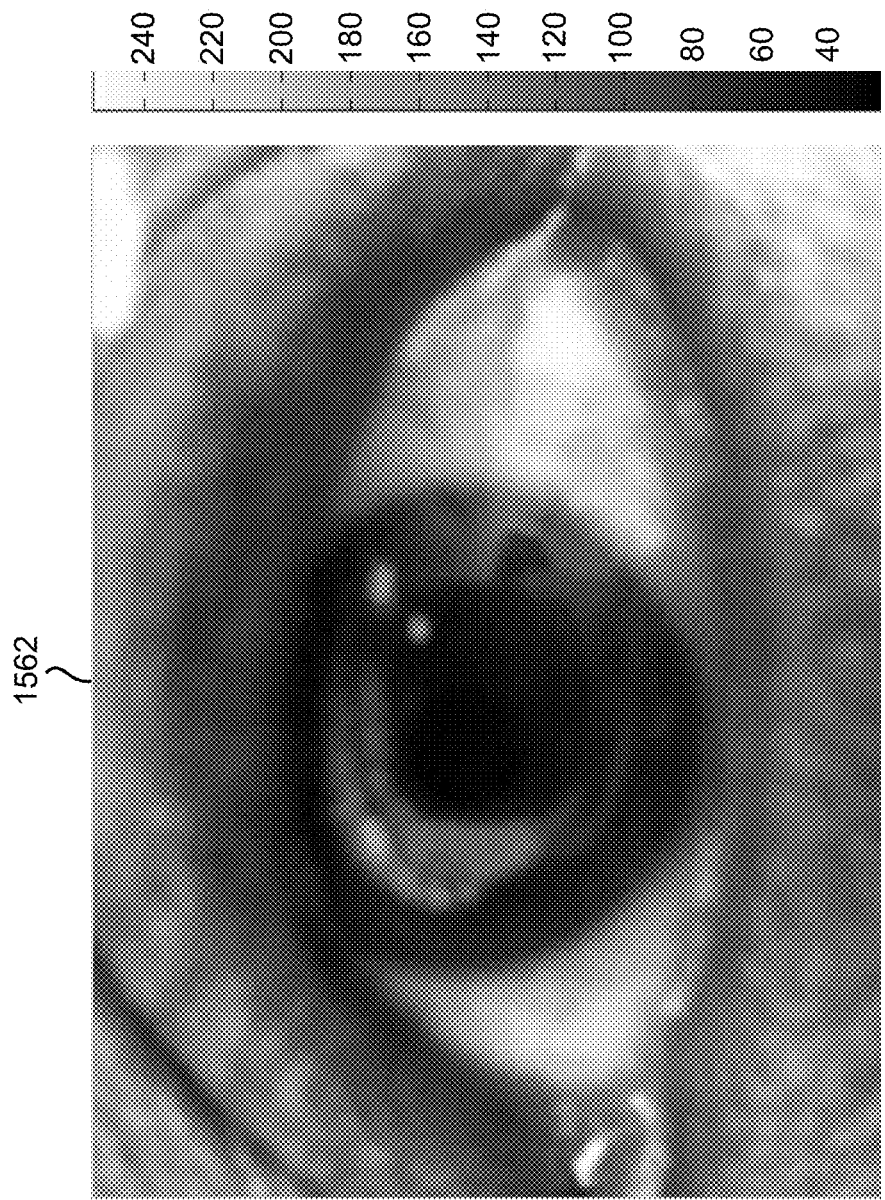
FIG. 15 illustrates one example of a gray image of an eye.

FIG. 15 illustrates one example of a gray image 1562 of an eye. In some configurations, for example, only one band of a color image (e.g., image or region of interest) may be utilized for the transform. For instance, color information of an image or region of interest may be discarded or an image may be converted to grayscale. FIG. 15 shows a gray image 1562 (e.g., an input image of 320×240 pixels) that is based on an original color image of the eye. A range of grayscale values is illustrated next to the gray image 1562. In some configurations, the digital image obtaining module 104 may capture a color image and convert it to a gray image.

Figure 16:
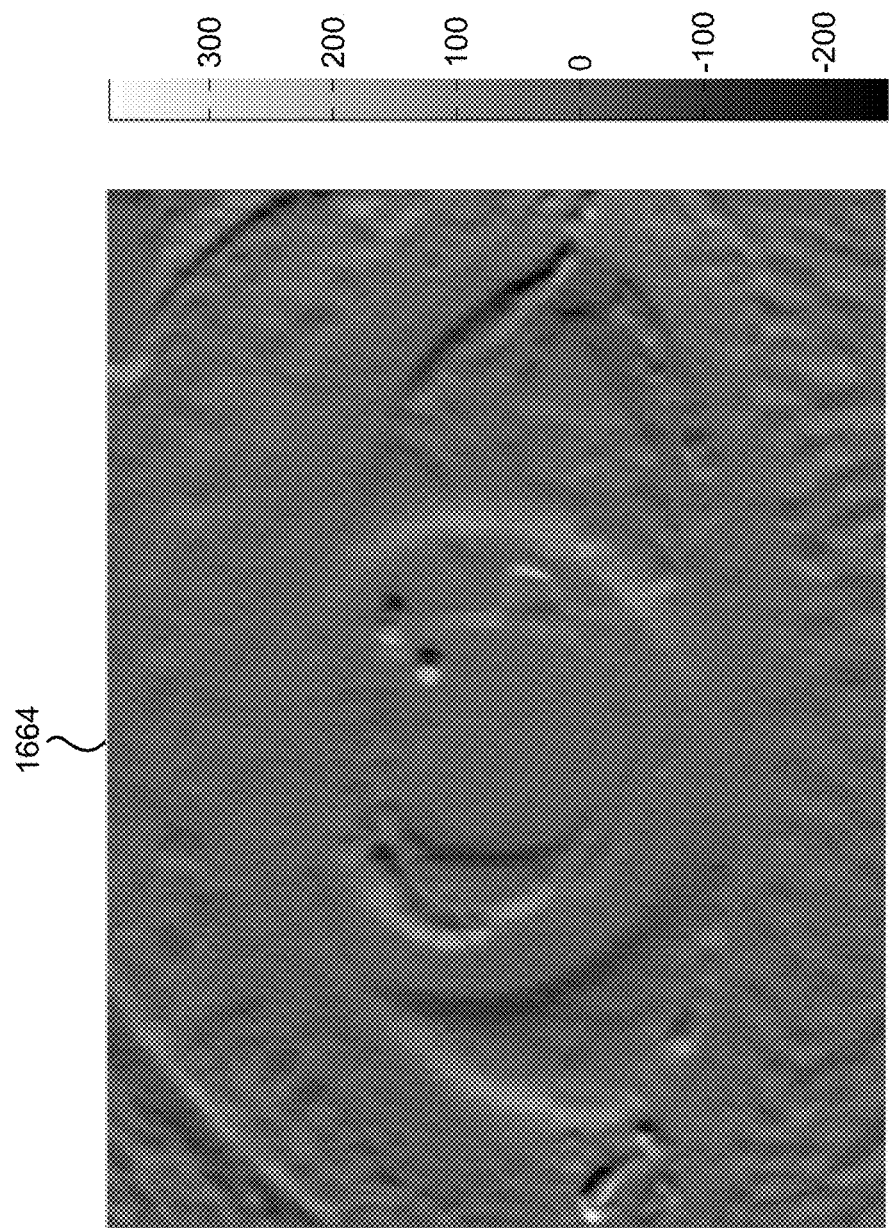
FIG. 16 illustrates one example of a gradient horizontal component (Gx) gray image of an eye.

FIG. 16 illustrates one example of a gradient horizontal component (Gx) gray image 1664 of an eye. In particular, FIG. 16 illustrates a gradient image 1664 in the x direction (Gx) corresponding to the gray image illustrated in FIG. 15. A range of gradient (e.g., gray) values is illustrated next to the gray image 1664. In some configurations, the gradient vector determination module 108 may determine a gradient horizontal component (Gx) image as described above.

Figure 17:
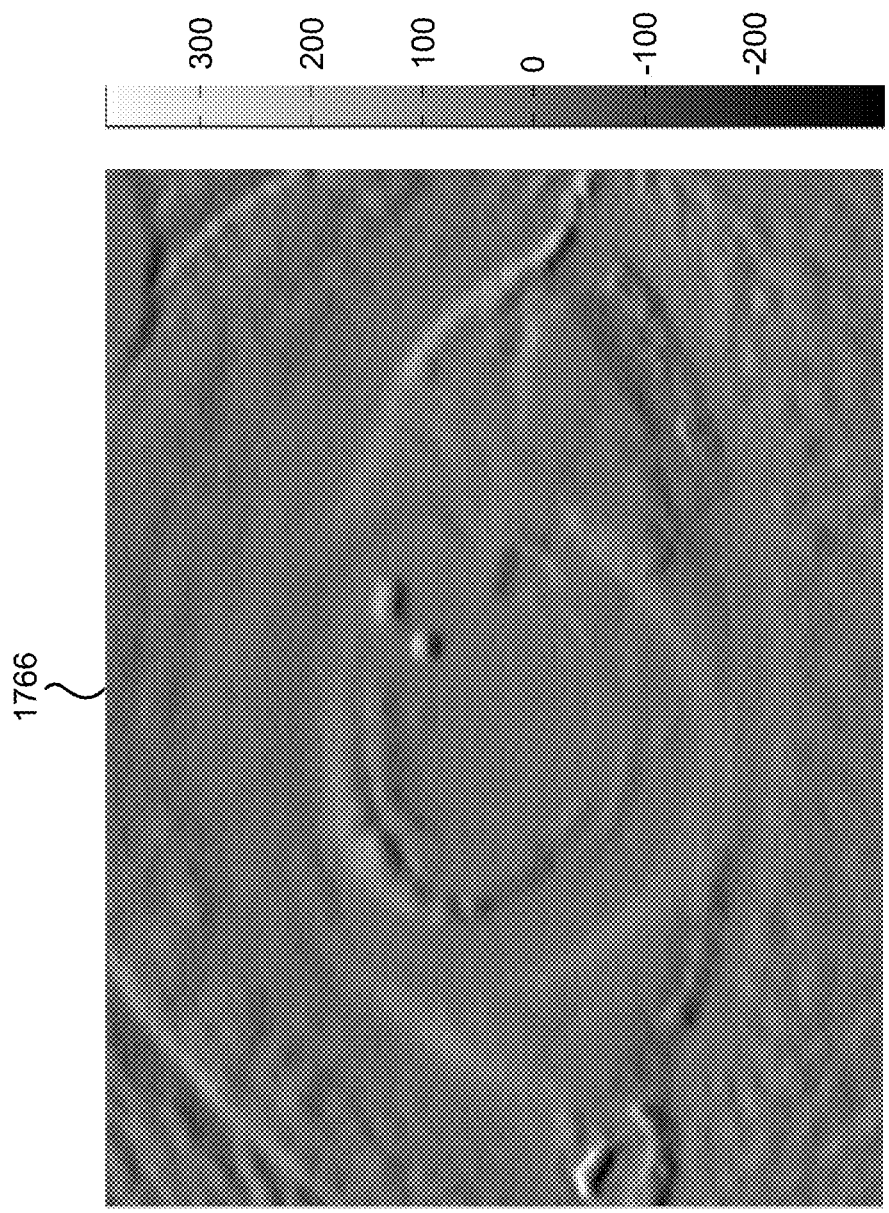
FIG. 17 illustrates another example of a gradient vertical component (Gy) gray image of an eye.

FIG. 17 illustrates an example of a gradient vertical component (Gy) gray image 1766 of an eye. In particular, FIG. 17 illustrates a gradient image 1766 in the y direction (Gy) corresponding to the gray image illustrated in FIG. 15. A range of gradient (e.g., gray) values is illustrated next to the gray image 1766. In some configurations, the gradient vector determination module 108 may determine a gradient vertical component (Gy) image as described above.

Figure 18:
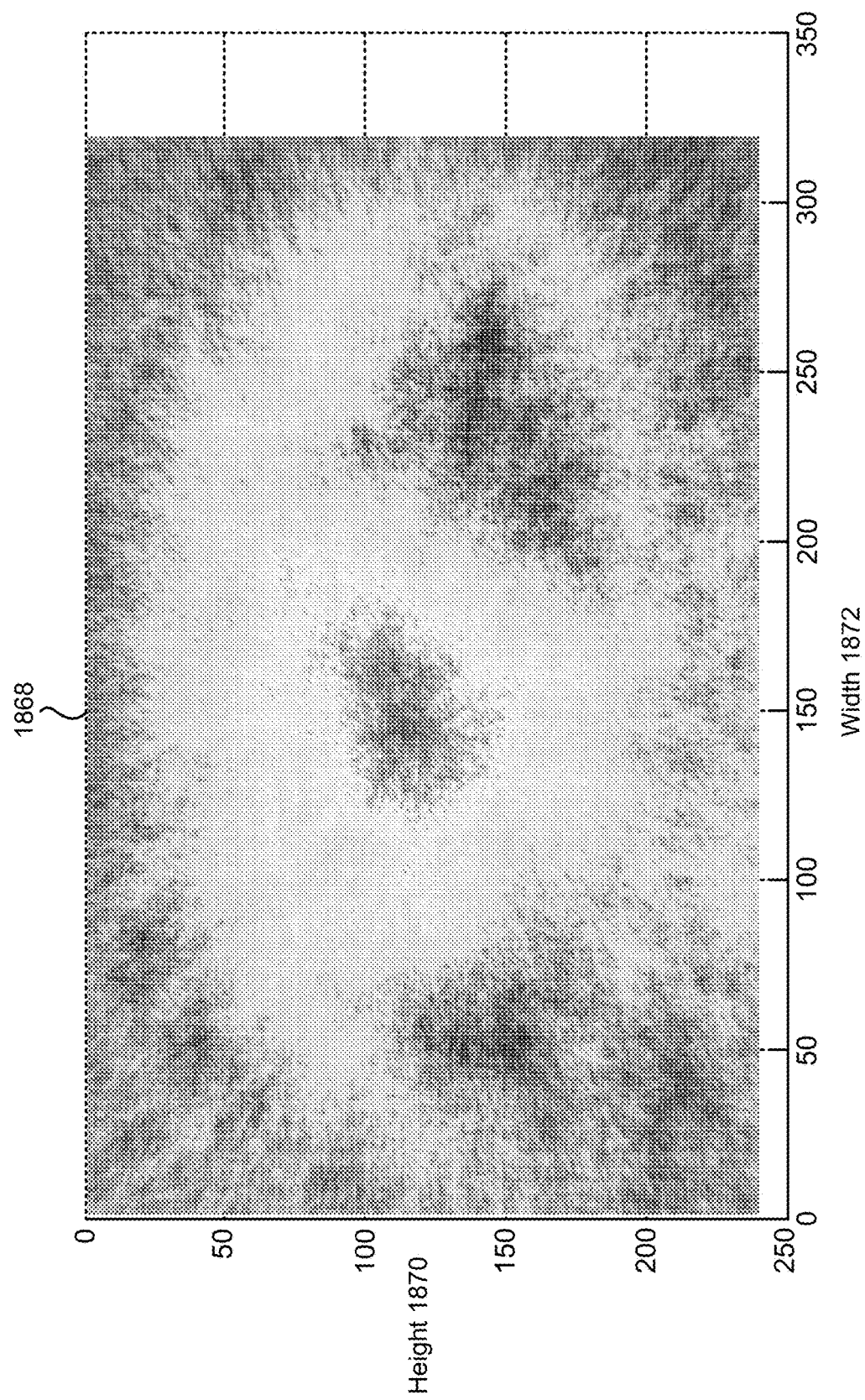
FIG. 18 illustrates one example of a transform space in accordance with the systems and methods disclosed herein.

FIG. 18 illustrates one example of a transform space 1868 in accordance with the systems and methods disclosed herein. In particular, FIG. 18 illustrates one example of the GDT (in dimensions of 320×240) corresponding to the gradient images illustrated in FIGS. 16-17. In this example, the transform space 1868 is illustrated in Width 1872 versus Height 1870. Each of the points of the transform space 1868 may correspond to a pixel in the image 1460 of FIG. 14. Accordingly, the width and height of the transform space may correspond to pixel dimensions of the image 1460. As illustrated in FIG. 18, the darker portion near the center of the transform space may correspond to higher values.

Figure 19:
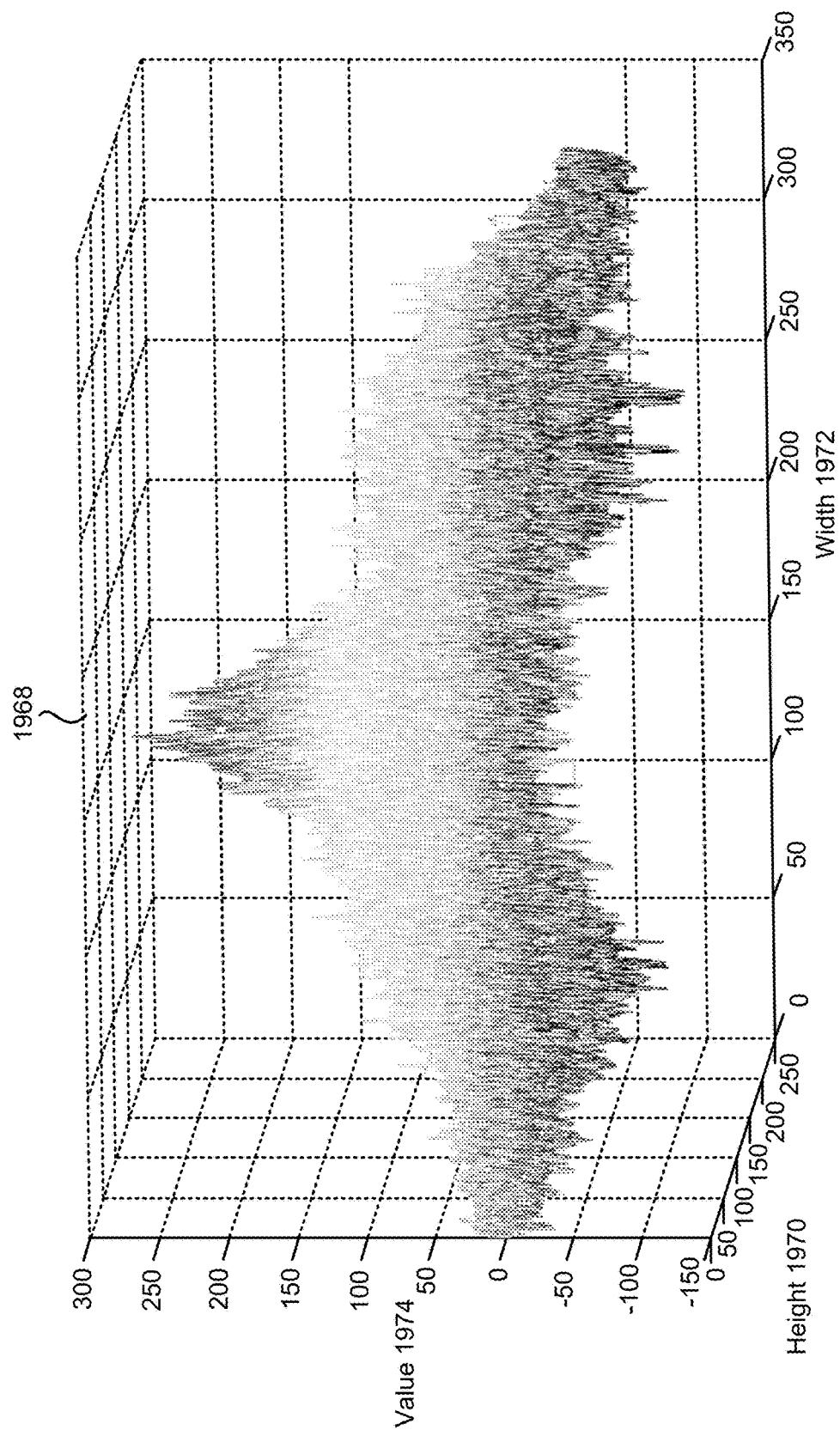
FIG. 19 illustrates another representation of the transform space in accordance with the systems and methods disclosed herein.

FIG. 19 illustrates another representation (3-Dimensional) of the transform space 1968 in accordance with the systems and methods disclosed herein. In particular, FIG. 19 illustrates one example of the GDT (in dimensions of 320×240) in three dimensions (3D) corresponding to the gradient images illustrated in FIGS. 16-17. In this example, the transform space 1968 is illustrated in Value 197 over Width 1972 (e.g., x position) and Height 1970 (e.g., y position). The Value 1974 axis represents a measure of the numerical value (e.g., score) at each point or position in the transform space 1968. As can be observed, higher values occur at locations corresponding to the iris of the eye.

Figure 20:
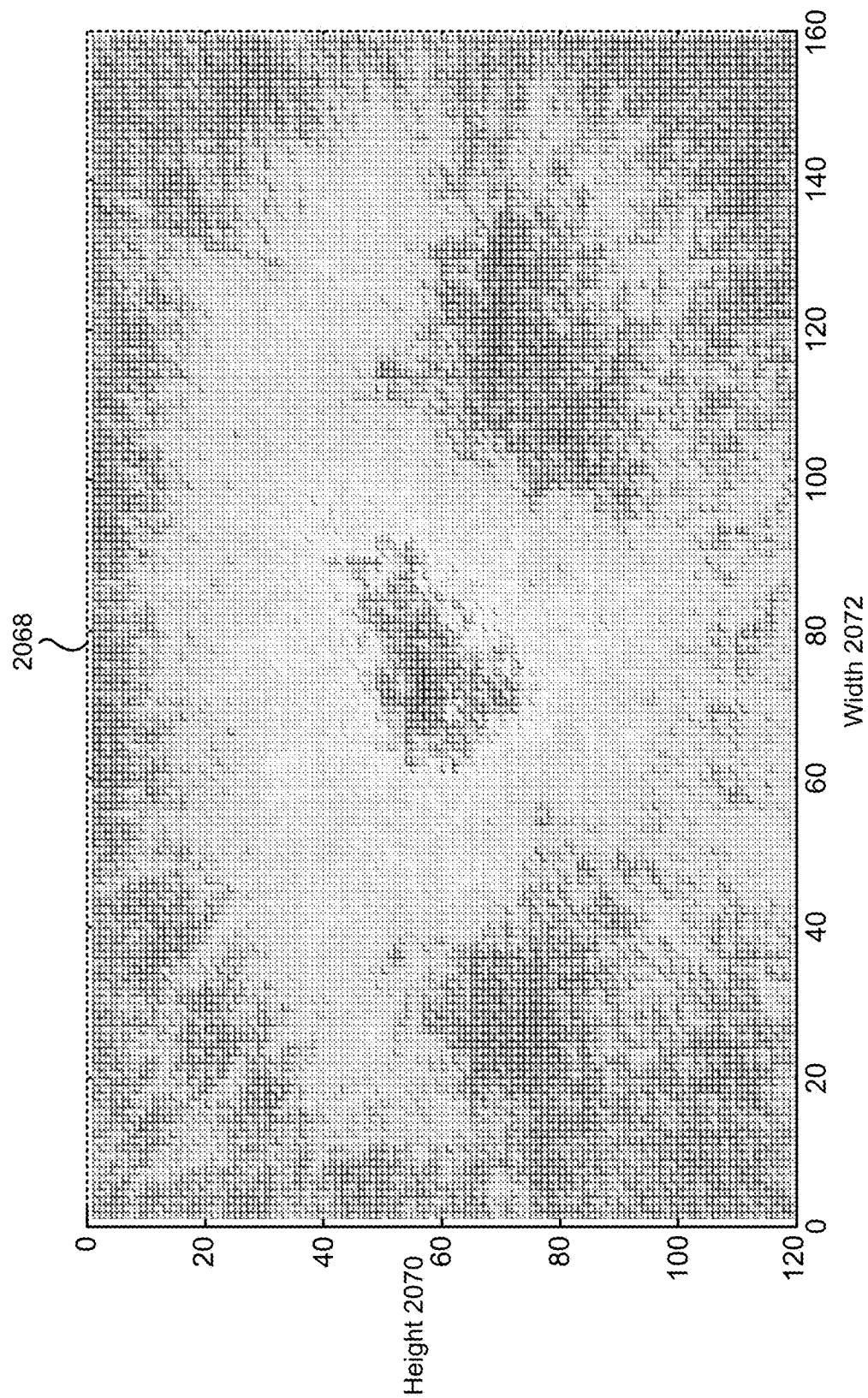
FIG. 20 illustrates one example of a transform space, in lower spatial resolution, in accordance with the systems and methods disclosed herein.

FIG. 20 illustrates one example of a transform space 2068, in lower spatial resolution, in accordance with the systems and methods disclosed herein. In particular, FIG. 20 illustrates one example of the GDT (in dimensions of 160×120) corresponding to gradient images. In this example, the transform space 2068 is illustrated in Width 2072 versus Height 2070. In some configurations, the transform may be performed on images with a lower resolution or may be performed on a subset of pixels (e.g., on a decimated image). As illustrated in FIG. 20, the darker portion near the center of the transform space may correspond to higher values.

Figure 21:
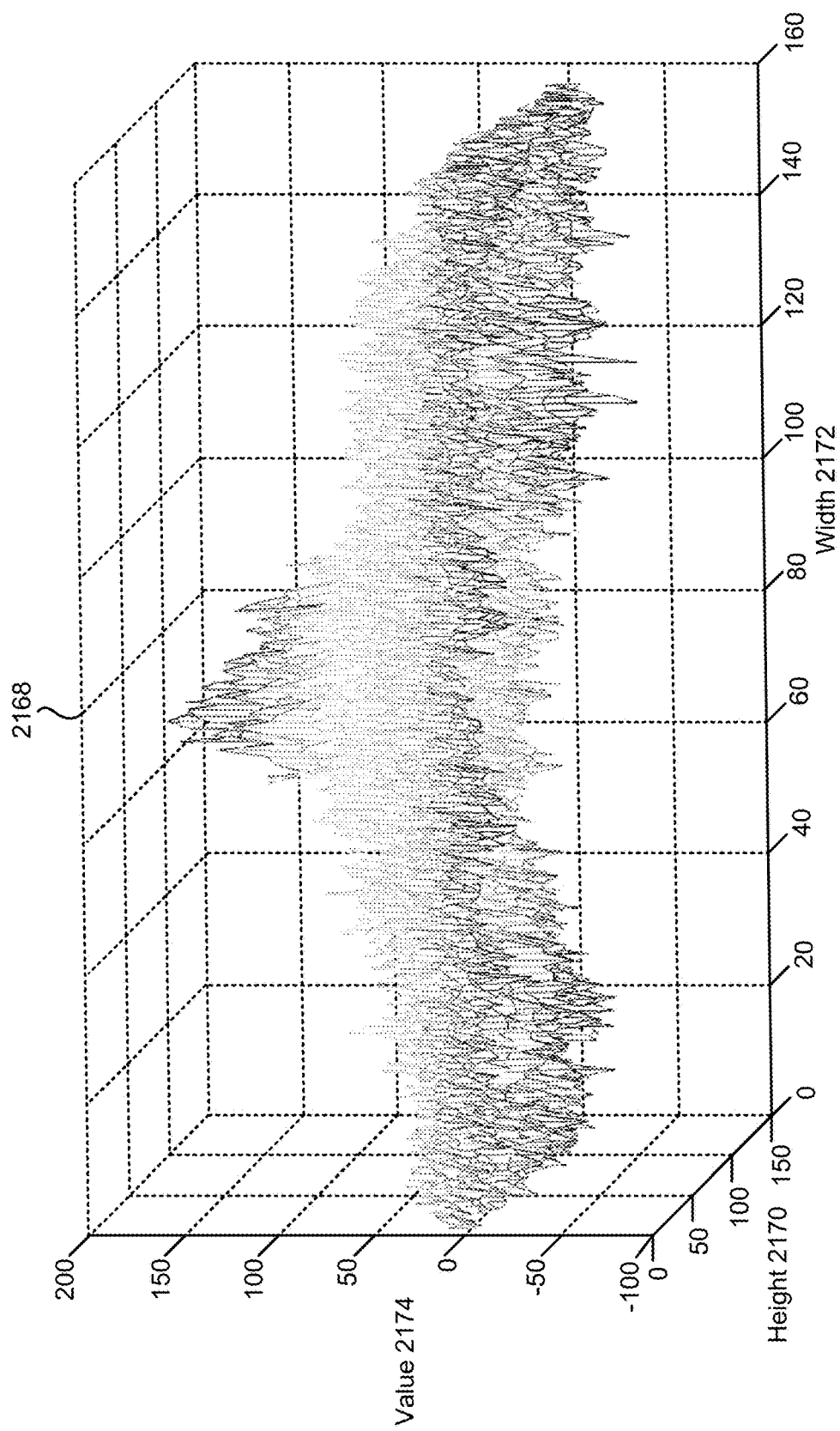
FIG. 21 illustrates another representation of the transform space, in lower spatial resolution, in accordance with the systems and methods disclosed herein.

FIG. 21 illustrates another representation (3-Dimensional) of the transform space 2168, in lower spatial resolution, in accordance with the systems and methods disclosed herein. In particular, FIG. 21 illustrates one example of the GDT (in dimensions of 160×120) in 3D corresponding to gradient images. In this example, the transform space 2168 is illustrated in Value 2174 over Width 2172 (e.g., x position) and Height 2170 (e.g., y position). The Value 2174 axis represents a measure of the numerical value (e.g., score) at each point or position in the transform space 2168. As can be observed, higher scores occur at locations corresponding to the iris of the eye. As illustrated in FIG. 21, the transform may be performed on images with a lower resolution or may be performed on a subset of pixels (e.g., on a decimated image) in some configurations.

Figure 22:
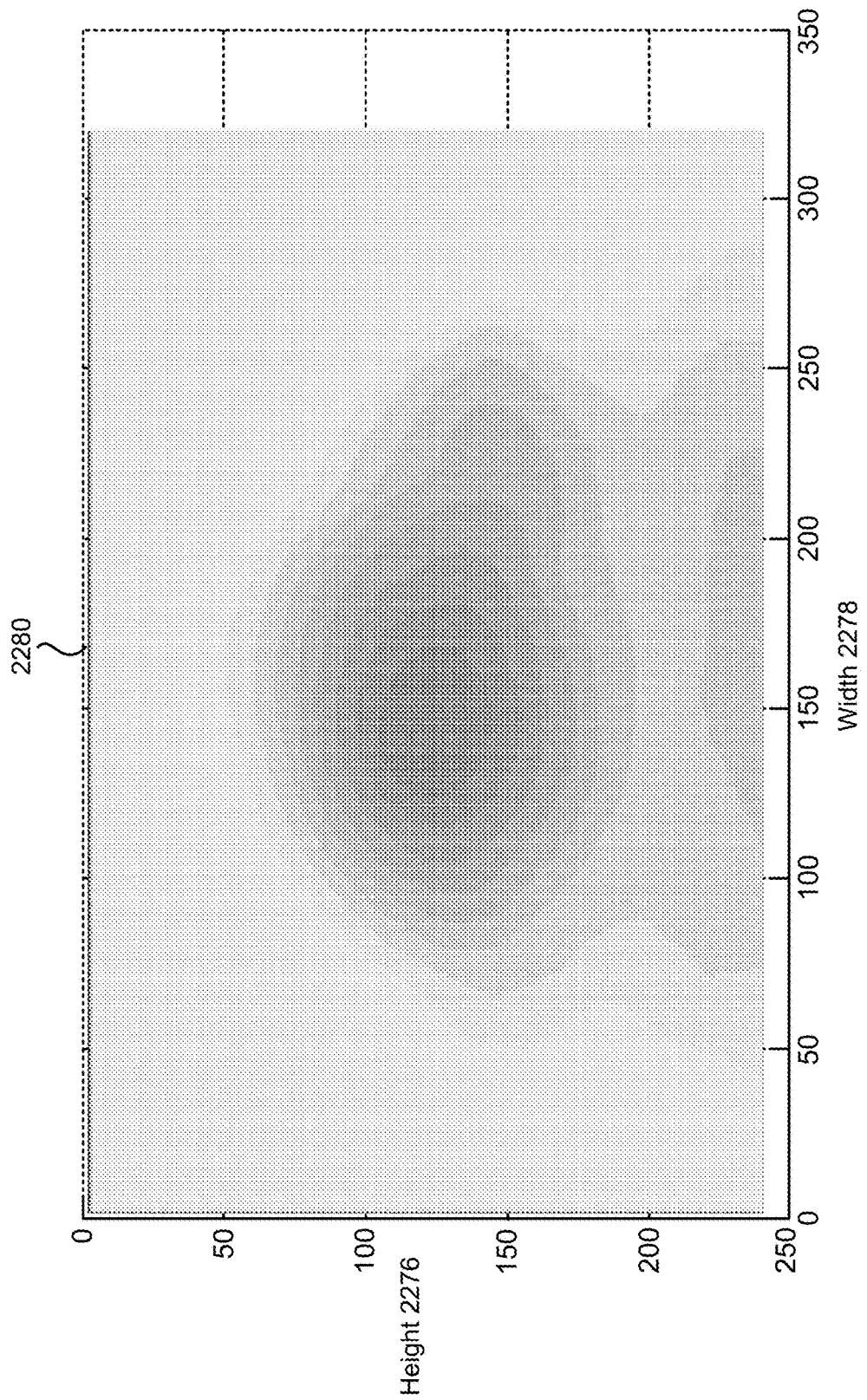
FIG. 22 illustrates one example of a Timm & Barth transform.

FIG. 22 illustrates one example of a Timm & Barth transform 2280. In particular, FIG. 22 illustrates one example of the T&B transform 2280 (in dimensions of 320×240) corresponding to the gray image illustrated in FIG. 15. This example is illustrated in Height 2276 and Width 2278.

Figure 23:
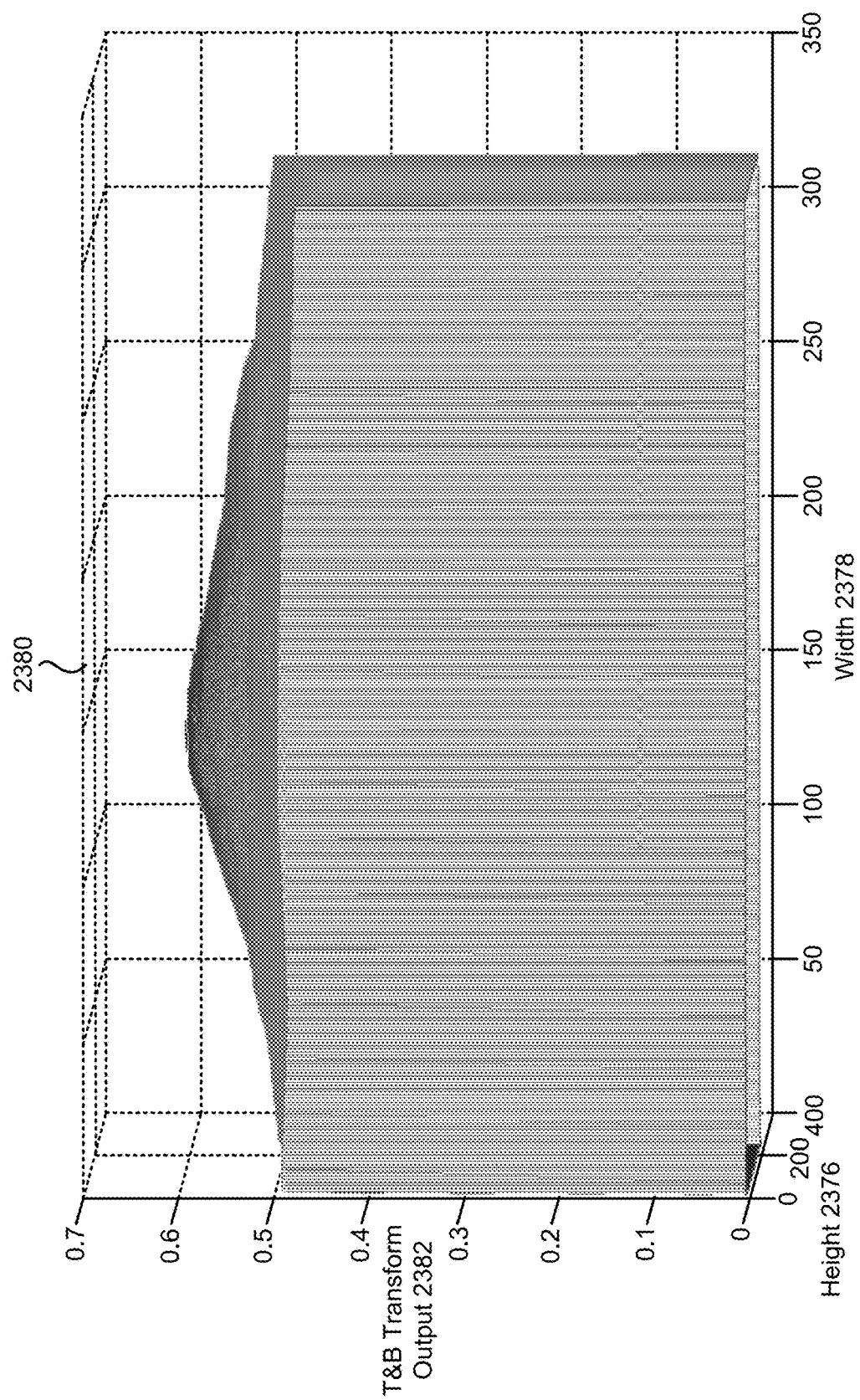
FIG. 23 illustrates another representation of the Timm & Barth transform.

FIG. 23 illustrates another representation (3-Dimensional) of the Timm & Barth transform 2380. In particular, FIG. 23 illustrates one example of the T&B transform 2380 (in dimensions of 320×240) in 3D corresponding to the gray image illustrated in FIG. 15. In comparing FIG. 19 to FIG. 23, the corresponding GDT and T&B representations are plotted in 3D to highlight the locations of the iris position. The example in FIG. 23 is illustrated in T&B Transform Output 2382 over Height 2376 and Width 2378.

Figure 24:
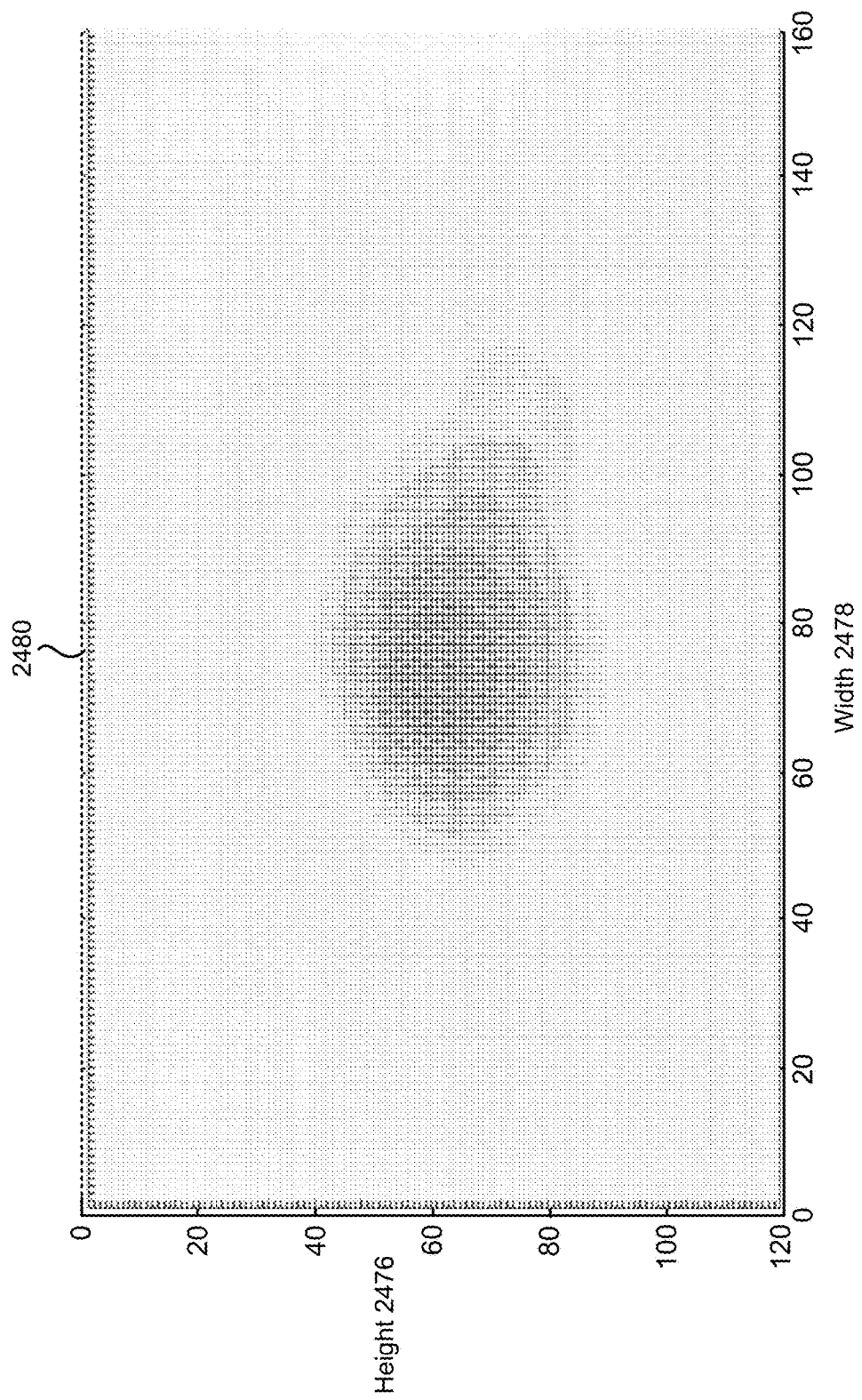
FIG. 24 illustrates one example of a Timm & Barth transform, in lower spatial resolution.

FIG. 24 illustrates one example of a Timm & Barth transform 2480, in lower spatial resolution. In particular, FIG. 24 illustrates one example of the T&B transform 2480 (in dimensions of 160×120) corresponding to the gray image illustrated in FIG. 15. This example is illustrated in Height 2476 and Width 2478.

Figure 25:
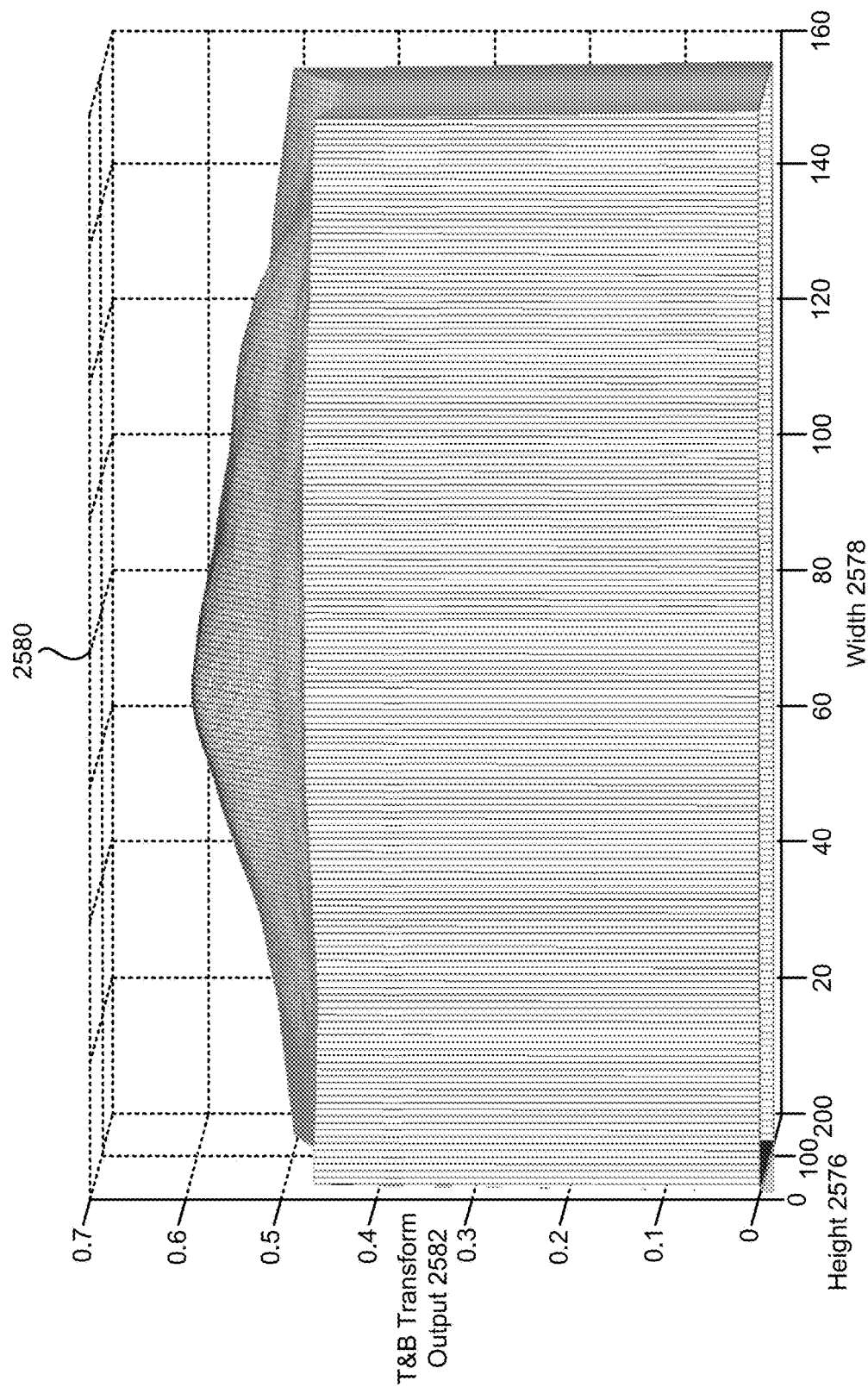
FIG. 25 illustrates another representation of the Timm & Barth transform, in lower spatial resolution.

FIG. 25 illustrates another representation (3-Dimensional) of the Timm & Barth transform 2580, in lower spatial resolution. In particular, FIG. 25 illustrates one example of the T&B transform 2580 (in dimensions of 160×120) in 3D corresponding to the gray image illustrated in FIG. 15. The example in FIG. 25 is illustrated in T&B Transform Output 2582 over Height 2576 and Width 2578.

FIG. 26 illustrates a comparison between the transform disclosed herein and the Timm & Barth transform. For example, FIG. 26 illustrates aspects of the performance of the Timm & Barth transform versus the Gradient Direction Transform. When analyzing an image, face detection may take approximately 30 milliseconds (ms) (for 24×24 dimensions, for example). Additionally, eye corner detection may take approximately 12 ms (for 256×256 dimensions, for example). Iris detection time complexity for a region of interest may be given as follows. Analytically, when processing any image with a region of interest of size C columns by R rows, the time complexity of Timm & Barth approach is equal to $K_1(C*R)^2$ where $K_1$ is the cost for each normalized floating point dot product. The worst case time complexity for the GDT approach is equal to $K_2(C*R)*C$, assuming $C \geq R$, where $K_2$ is the cost for the integer additions and bit-wise operations used to identify the cells in line with each gradient vector.

It should be noted that the T&B approach ignores the sign of the vector in squaring dot products to avoid square root computations. However, the GDT is capable of efficient consideration of sign of vectors at no extra cost (e.g., inward/outward directions). The extension of a gradient normal-vector (in some configurations) to other directions such as the gradient tangent-vector may suit describing other (binary/gray/color) image analysis tasks.

Compared to T&B approach as illustrated in FIG. 23, the transform disclosed herein may be less smooth. In some configurations, an inexpensive 3×3 linear averaging filter may be utilized to smooth the transform. The T&B algorithm has a high positive constant value due to summing the squared values of non-collinear vectors as expressed in Equation (4) and Equation (5), for example.

Specifically, FIG. 26 illustrates measured speedup ratios (e.g., $T_1/T_2$) between the GDT and the T&B transform. An experiment to quantify the speedup on iris detection was conducted, using a Matlab time profiler tool, by resizing an eye image to different spatial resolutions, as illustrated in the shown in Table A 2684. Average time and corresponding speedup values are computed for each case as shown in Table A 2684 with ten repetitions for each approach as illustrated in Table B 2686. The times illustrated in Table A 2684 and Table B 2686 are given in units of seconds according to a time profiler. It should be noted that the same time unit is used for both algorithms.

FIG. 27 illustrates another comparison between the transform disclosed herein and the Timm & Barth transform. In particular, FIG. 27 illustrates a comparison of the constants in computational complexity between the GDT ($K_2$) and the T&B transform ($K_1$). Specifically, FIG. 27 includes Table C 2788 that illustrates a speedup ratio between the performance of the Timm & Barth transform versus the Gradient Direction Transform. In FIG. 27, $K_1$ and $K_2$ are given in units of seconds according to a time profiler.

Figure 28:
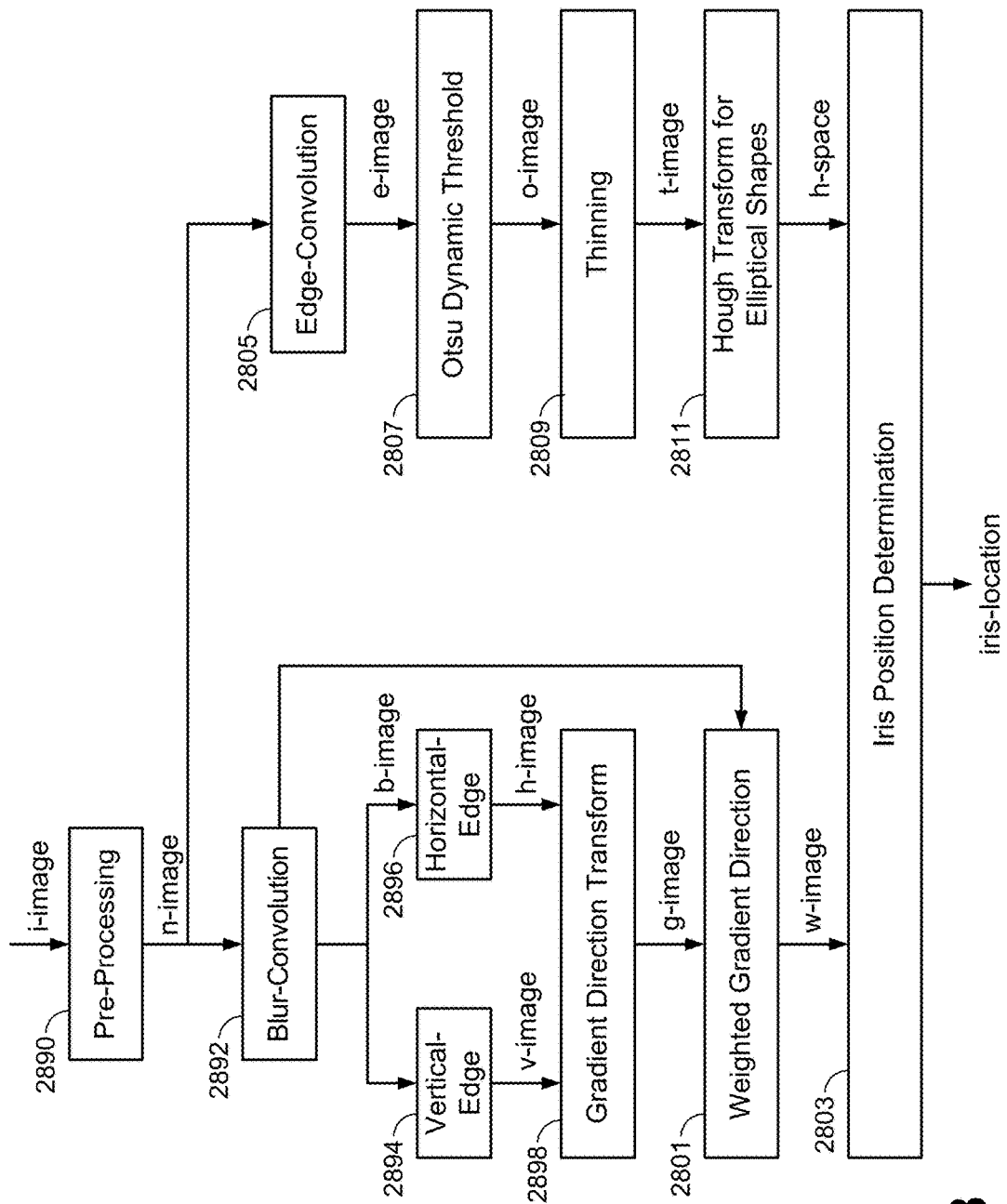
FIG. 28 is a block diagram illustrating a more specific configuration of modules for obtaining structural information from a digital image.

FIG. 28 is a block diagram illustrating a more specific configuration of modules for obtaining structural information from a digital image. In particular, FIG. 28 illustrates an optional combination of the GDT and HTE for iris detection. Several modules 2890, 2892, 2894, 2896, 2898, 2801, 2803, 2805, 2807, 2809, 2811 are illustrated in FIG. 28, one or more of which may be implemented in an electronic device 102. An original image (e.g., i-image) may be provided to a pre-processing module. In some configurations of the GDT approach for the iris detection, the pre-processing module 2890 may scale the eye region of interest to a fixed width of 40 pixels, preserving the aspect ratio of the input image. Scaling may ensure that the detection task is completed in a fixed budget time. The scaled image may be referred to as an n-image, which may be provided to a blur convolution module 2892 and/or to an edge convolution module 2805.

The scaled image (e.g., n-image) may also be smoothed and/or blurred by the blur convolution module 2892 in order to obtain better gradient direction estimation. For example, the blurred and/or smoothed image may be referred to as a b-image and may be provided to a vertical edge module 2894 and/or a horizontal edge module 2896.

The vertical edge module 2894 and the horizontal edge module 2896 may be used as estimators for the vertical (e.g., Gy) and horizontal (e.g., Gx) gradient images, respectively. For example, the vertical edge module 2894 and/or the horizontal edge module 2896 may apply Sobel operators, Prewitt operators, Scharr operators and/or mathematical morphology to determine the gradient images. The vertical gradient image may be referred to as a v-image and the horizontal gradient image may be referred to as an h-image.

The vertical gradient image and the horizontal gradient image may be provided to a gradient direction transform module 2898.

The gradient direction transform module 2898 may determine (e.g., compute) the gradient direction transform based on the vertical gradient image and the horizontal gradient image as described above in connection with one or more of FIGS. 1-5 and 9. The transform space (e.g., values, transform matrix, etc.) may be referred to as a g-image. The transform space may be provided to a weighted gradient direction module 2801.

The weighted gradient direction module 2801 may optionally apply a prior weight to the raw transform (after computing the GDT for each scaled and blurred region, for example), utilizing the observation that the iris center is usually dark, so that the weight is inversely proportional to the gray level value. Specifically, the blur convolution module 2892 may provide the b-image to the weighted gradient direction module 2801. The weighted gradient direction module may apply weights to the g-image based on the b-image. For example, the weighted gradient direction module 2801 may generate weights based on the b-image, where darker pixels are assigned higher weights and lighter pixels are assigned lower weights. This may emphasize (e.g., scale up) the values in the g-image corresponding to the darker areas of the b-image (e.g., the iris). The resulting weighted gradient direction image may be referred to as a w-image, which may be provided to an iris position determination module 2803.

It should be noted that the edge convolution module 2805, the Otsu dynamic threshold module 2807, the thinning module 2809 and/or the Hough transform for elliptical shapes module 2811 may be optional. One or more of these modules 2805, 2807, 2809, 2811 may be helpful in certain situations. For example, one difficulty may occur when there is strong corneal reflection in the images from light sources covering the iris center location. This is expected, since the transform may be weighted as mentioned above. Also, some scenarios for iris detection using sensors mounted on the inside direction of head mounted displays, or other eye glasses for example, may utilize a different processing chain to find the eye corners and iris locations simultaneously, since the full image of the face may not be available in such cases. One approach to do so, using both the gradient amplitude (via HTE) and the gradient direction (via GDT) is outlined in FIG. 28.

The edge convolution module 2805 may perform edge convolution on the n-image. The resulting edge-convolved image may be referred to as an e-image, which may be provided to the Otsu dynamic threshold module 2807. The Otsu dynamic threshold module 2807 may produce an image referred to as an o-image, which may be provided to the thinning module 2809. The thinning module 2809 may thin the o-image. The thinned image may be referred to as a t-image, which may be provided to the Hough transform for elliptical shapes module 2811. The purpose of the edge convolution module 2805, the Otsu dynamic threshold module 2807 and the thinning module 2809 may be to construct a binary image (t-image) with minimal reliable foreground pixels to be used for computing the Hough transform in the Hough transform for elliptical shapes module 2811 efficiently, since the time complexity of Hough transform computations increases with the number of foreground pixels.

The Hough transform for circles or ellipses may be implemented using Bresenham's algorithms to avoid floating point computations as described above in connection with FIGS. 11-12. In this case, the range of values for the parameters of the circle and the ellipse can be greatly constrained to further reduce the memory and processing requirements for Hough transform computations. The Hough transform for elliptical shapes module 2811 may produce a Hough transform space, which may be referred to as an h-space. The h-space may be provided to the iris position determination module 2803.

The GDT role here may be to uniquely utilize the gradient orientation information to further improve the accuracy of detection. Gradient-based image analysis approaches of the last couple of decades do not fully utilize the gradient information due to computational and memory constraints. The systems and methods disclosed herein may contribute a complete and efficient image transformation scheme that improves (e.g., is faster and more robust) and extends known approaches to enable real-time applications.

More detail is given hereafter regarding the application of the GDT to handwriting recognition. In particular, other approaches are described in connection with FIGS. 29-30. Application of the GDT to handwriting recognition is then described in greater detail in connection with FIGS. 31-35.

Recognizing the content of digital images that contain hand-written characters and/or hand-drawn shapes often requires sophisticated processing to deal with significant variations in size, style and data acquisition conditions. Conventional distance-transform based techniques such as bar-transform (BAR) descriptors work a on down-scaled binary representation and quantize the direction information into four major orientations to reduce the input dimensionality. Deep Neural Networks (DNN) are also applied directly to the raw input image pixel values, using multiple hidden layers, to perform automatic feature extraction and classification tasks. The requirements of these techniques, particularly when considering large (greater than four) number of directions in BAR descriptors, or large number of hidden layers in DNN, limit their uses in platforms with small memory and processing footprints, for high resolution inputs and data rates.

Figure 29:
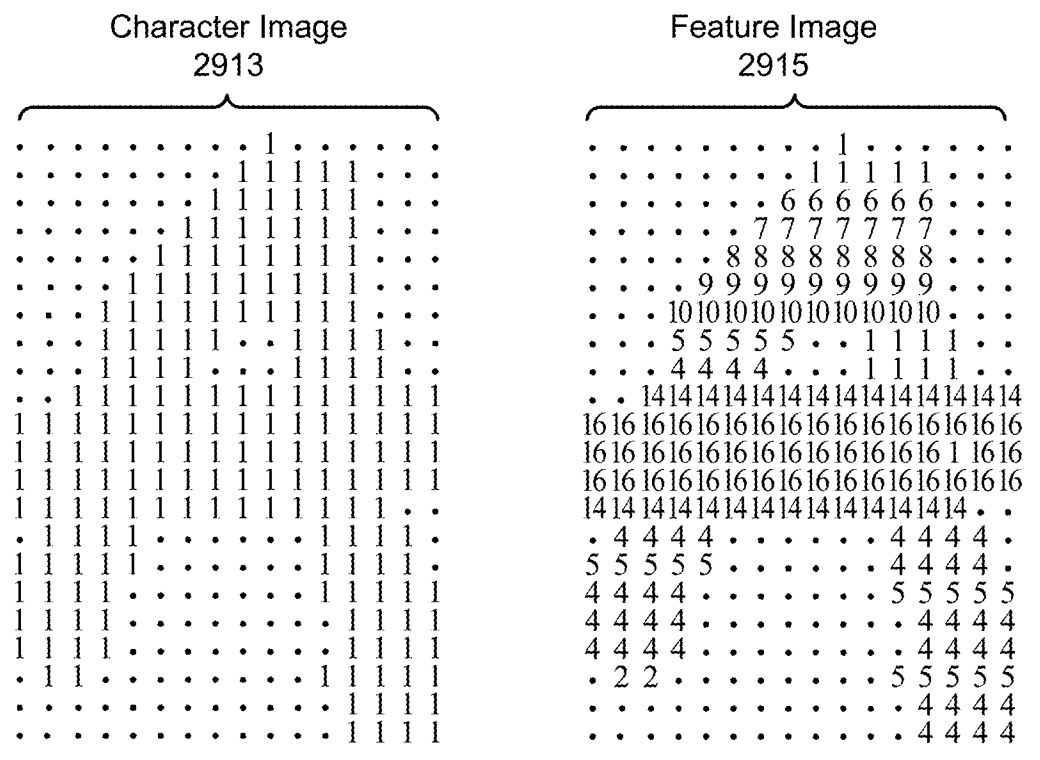

FIG. 29 illustrates an example of the BAR transform. The bar transform was originally defined on binary character images. It is used to compute a feature descriptor (e.g., BAR features (handcrafted)) for character (e.g., handwriting) recognition applications. (See Paul Gader, Magdi Mohamed, and Jung-Hsien Jiang, "Comparison of Crisp and Fuzzy Character Neural Networks in Handwritten Word Recognition," IEEE Transactions on Fuzzy Systems, Vol. 3, No. 3, pp. 357-363, 1995.) Initially, eight feature images are generated. Each feature image map corresponds to one of the directions: east (e), northeast (ne), north (n) and northwest (nw), in either the foreground or the background. Each feature image has an integer value at each location that represents the length of the longest bar that fits at that point in that direction. An example of an original binary image or character image 2913 and the bar feature image 2915 e(i,j) (e.g., for foreground horizontal direction) for the foreground representation is shown in FIG. 29. In particular, The BAR approach considers 4 directions (e.g., horizontal, vertical, diagonal and anti-diagonal} to construct a feature vector (of size=120, for example) by summing values in overlapping zones of 4 maps for foreground and 4 maps for background.

A two pass algorithm is used to generate the feature images. In the forward pass, the image is scanned left-to-right and top-to-bottom. Listing (9) illustrates a pseudo-code for computing the BAR transform on the foreground. More specifically, at each point, either the foreground or the background feature images are updated as shown in Listing (9). On the backward pass, the maximum is propagated back up from bottom-to-top, right-to-left as shown in the second part of Listing (9).

Listing (9)

```
/* FORWARD PASS */
    FOR i = 1, 2, ..., nrows DO
        FOR j = 1, 2, ..., ncols DO
            e(i, j) = e(i, j − 1) +1
            ne(i, j) = ne(i − 1, j + 1) +1
            n(i, j) = n(i − 1, j) +1
            nw(i, j) = nw(i −1, j − 1) +1
/* BACKWARD PASS */
    FOR i = nrows, nrows − 1, ..., 1 DO
        FOR j = ncols, ncols − 1, ..., 1 DO
            e(i, j) = max(e(i, j), e(i, j + 1))
            ne(i, j) = max(ne(i, j), ne(i + 1, j − 1))
            n(i, j) = max(n(i, j), n(i + 1, j))
            nw(i, j) = max(nw(i, j), nw(i + 1, j + 1))
```

Figure 30:
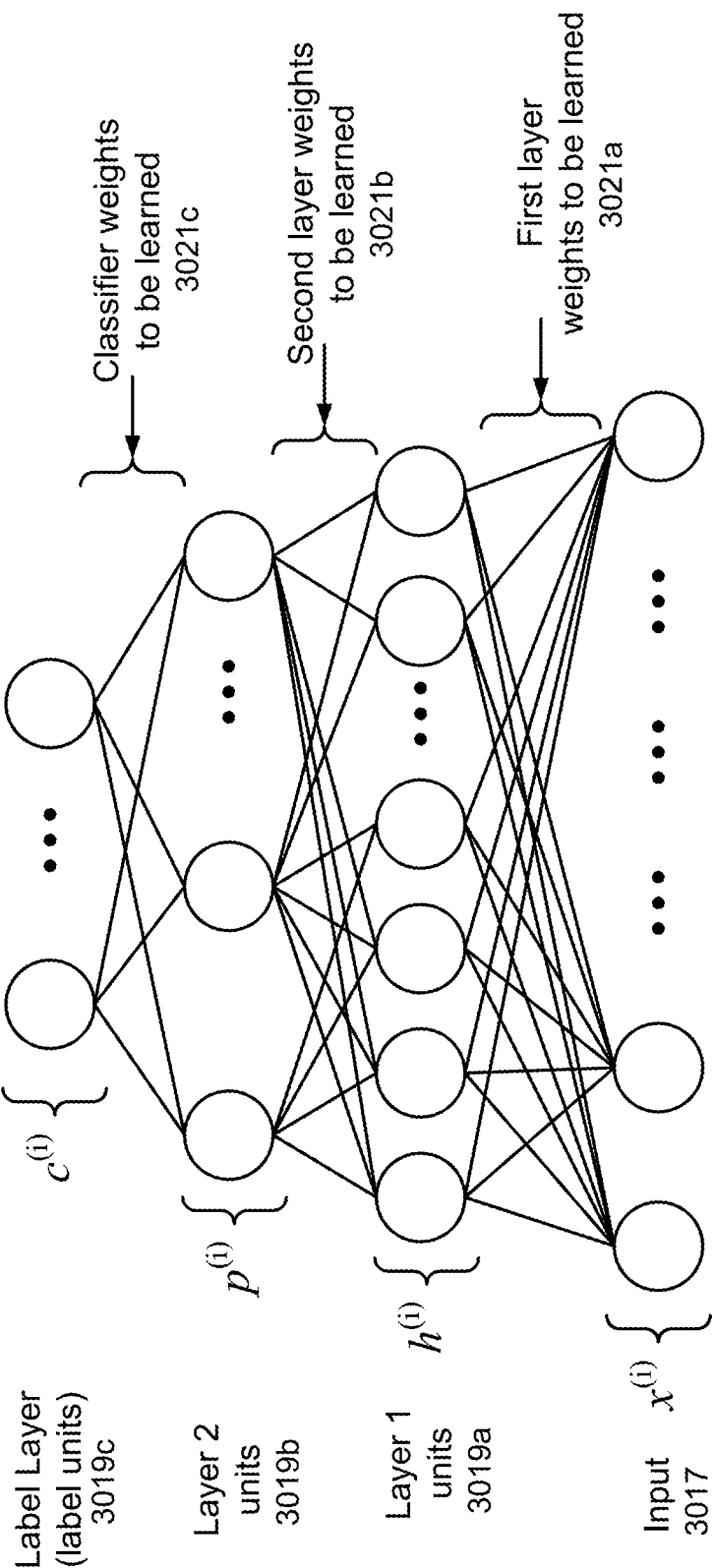
FIG. 30 is a diagram illustrating one example of a deep neural network.

FIG. 30 is a diagram illustrating one example of a deep neural network. The deep neural network may be applied for handwriting recognition. In particular, deep neural network features may be learned to describe handwriting. A deep neural network may learn weights 302a-c by minimizing reconstruction error and prediction error. As illustrated in FIG. 30, first layer weights 3021a may be learned to map input values 3017 to layer 1 units 3019a. Second layer weights 3021b may be learned to map layer 1 units 3019a to layer 2 units 3019b. Classifier weights 3021c may be learned to map layer 2 units 3019b to the label layer or layer units 3019c.

The systems and methods disclosed herein provide a compact and fast feature extractor, which may be referred to as a Gradient Direction Descriptor (GDD). The GDD is based on the Gradient Direction Transform (GDT) scheme described above. The GDD characterizes the content of an input image (e.g., digital image 406) by emphasizing the locations of concavity and convexity regions and intersections of strokes as pieces of information for describing the content. This information may be utilized in order to perform shape classification. This feature descriptor can discriminate among several shape classes, using small size classification models. The GDD values can be used as standalone input feature vector, or in combination with other descriptors to reduce complexity and improve performance of pattern recognition systems.

The GDD is described for handwriting recognition applications. The GDD utilizes an efficient implementation of the GDT algorithm to compute the discriminant features. Further description of the pattern recognition model construction and a neural network architecture is provided as well.

Figure 31:
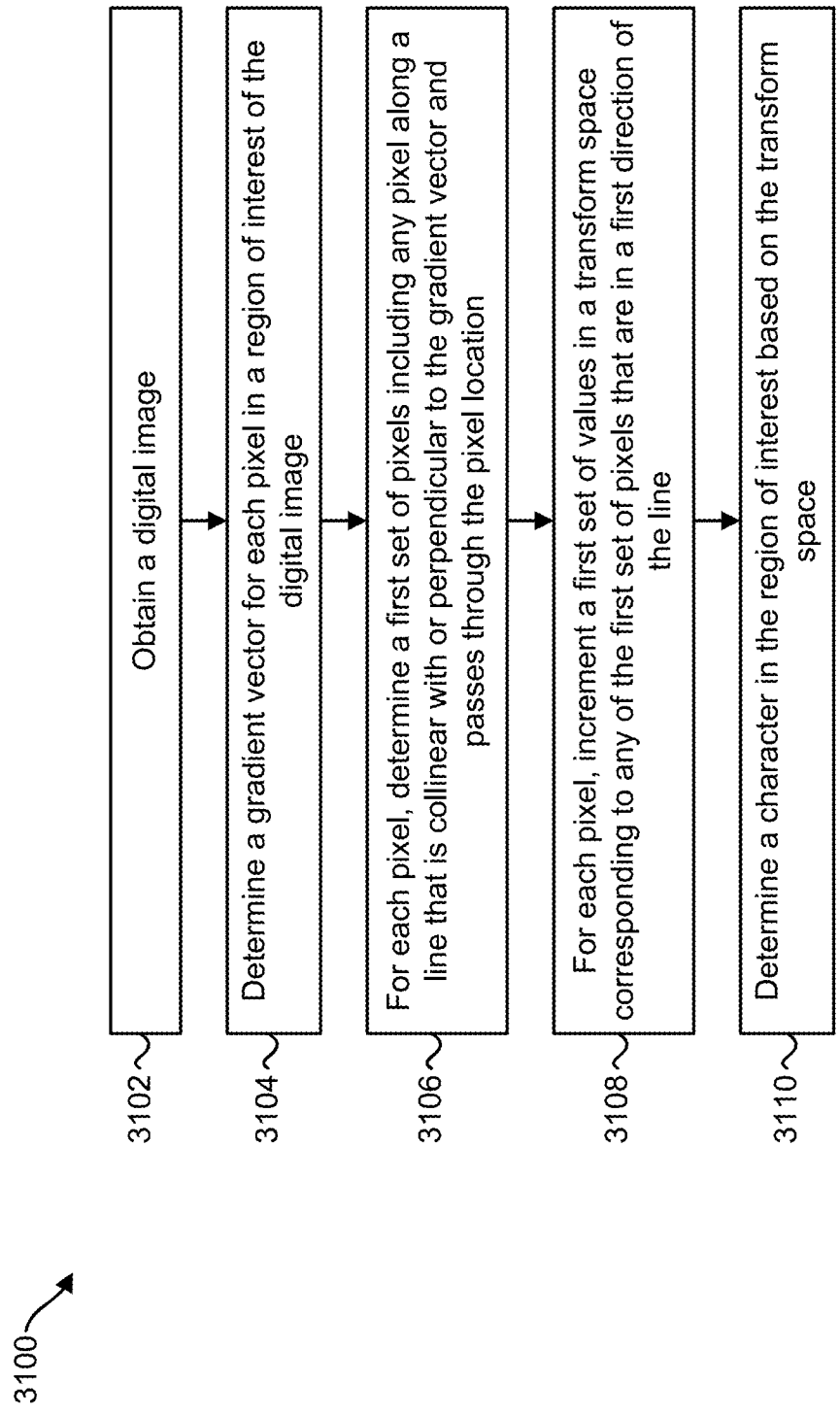
FIG. 31 is a flow diagram illustrating one configuration of a method for determining a character from a digital image.

FIG. 31 is a flow diagram illustrating one configuration of a method 3100 for determining a character from a digital image 406. The method 3100 may be performed by the electronic device 402 described in connection with FIG. 4. The electronic device 402 may obtain 3102 a digital image 406. This may be accomplished as described above in connection with one or more of FIGS. 1-2 and 4, for example.

The electronic device 402 may determine 3104 a gradient vector for each pixel in a region of interest of the digital image 406. This may be accomplished as described above in connection with one or more of FIGS. 1-2 and 4, for example.

For each pixel, the electronic device 402 may determine 3106 a first set of pixels including any pixel along a line that is collinear with or perpendicular to the gradient vector and that passes through the pixel location (and/or intersects an origin of the gradient vector). This may be accomplished as described above in connection with one or more of FIGS. 1-4, for example.

For each pixel, the electronic device 402 may increment 3108 a first set of values 114 in a transform space corresponding to any of the first set of pixels that are in a first direction of the line. This may be accomplished as described above in connection with one or more of FIGS. 1-4, for example. In some configurations, after initializing a transform matrix to zeroes, for each gradient vector in the input image region of interest, the electronic device 402 may increment and/or decrement the value of the cells in the transform matrix in line with and/or tangent to the gradient vector. FIG. 9 provides an example of the gradient direction transform (GDT). The lines may be determined as described above in connection with FIGS. 3A-C, for example.

The electronic device 402 may determine 3110 a character (e.g., a handwriting character) in the region of interest based on the transform (e.g., the GDT). For example, the electronic device 402 may use the transforms for the normal gradient direction and the tangent gradient direction to compute corresponding feature maps and construct a compact feature vector, called a Gradient Direction Descriptor (GDD), containing unique discriminant information. For example, the GDD me be used as an input (instead of the raw input image, for instance) to handwriting classifiers such as Deep Neural Networks (DNN) to achieve higher recognition accuracies with less computations and memory requirements.

Figure 32:
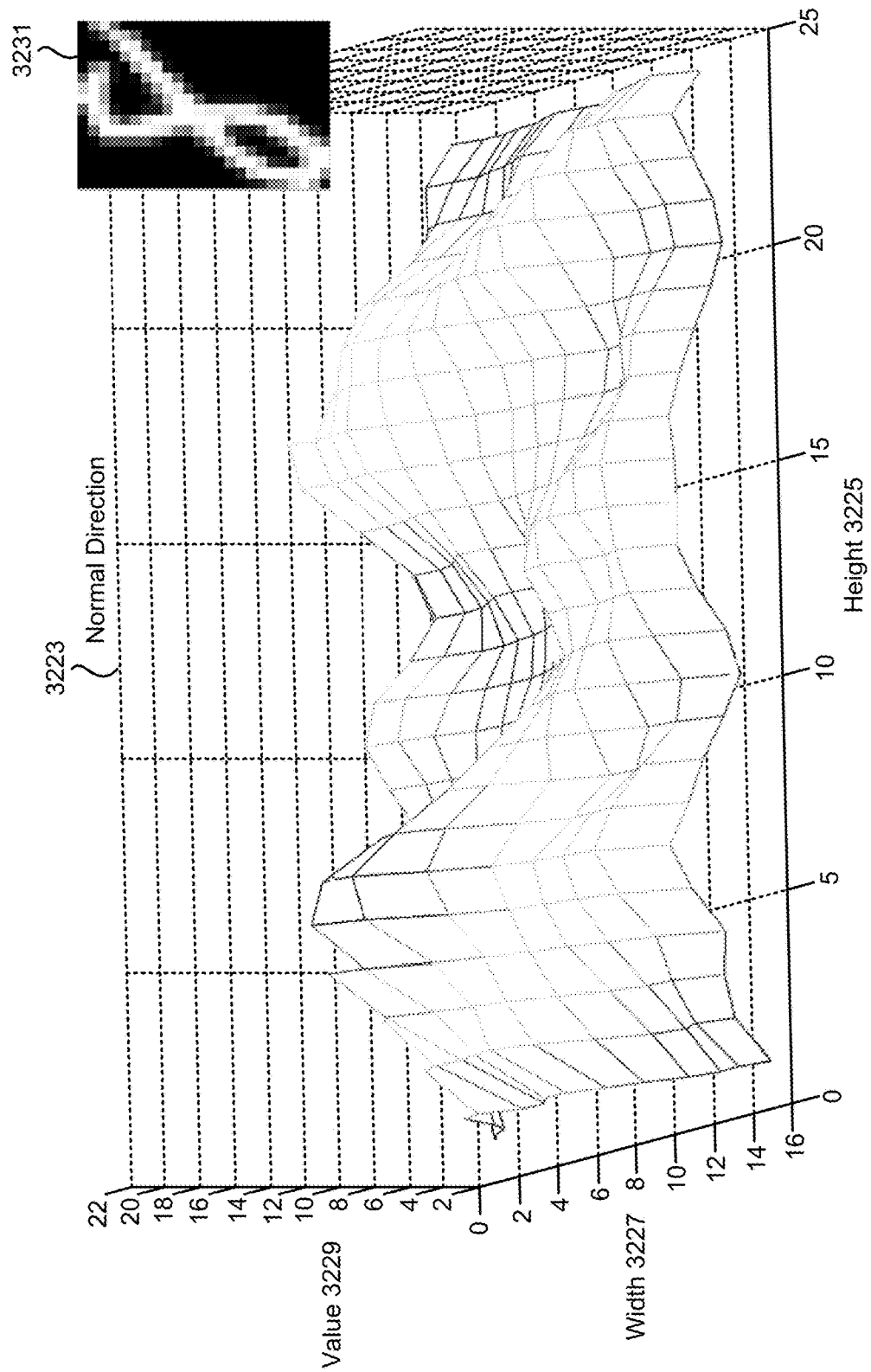
FIG. 32 illustrates an example of a transform space using a gradient normal direction for handwriting character recognition.

FIG. 32 illustrates an example (3-Dimensional) of a transform space 3223 using a gradient normal direction for handwriting character recognition. In particular, FIG. 32 illustrates one example of the GDT in the normal direction for handwriting corresponding to the image 3231 of the handwritten character "8." In this example, the transform space 3223 is illustrated in Value 3229 over Width 3227 (e.g., x position) and Height 3225 (e.g., y position). The Value 3229 axis represents a measure of the numerical value (e.g., score) at each point or position in the transform space 3223. In this example, the transform space 3223 corresponds to the transform where values are incremented along a line that is collinear with the gradient vector (e.g., the normal direction).

Figure 33:
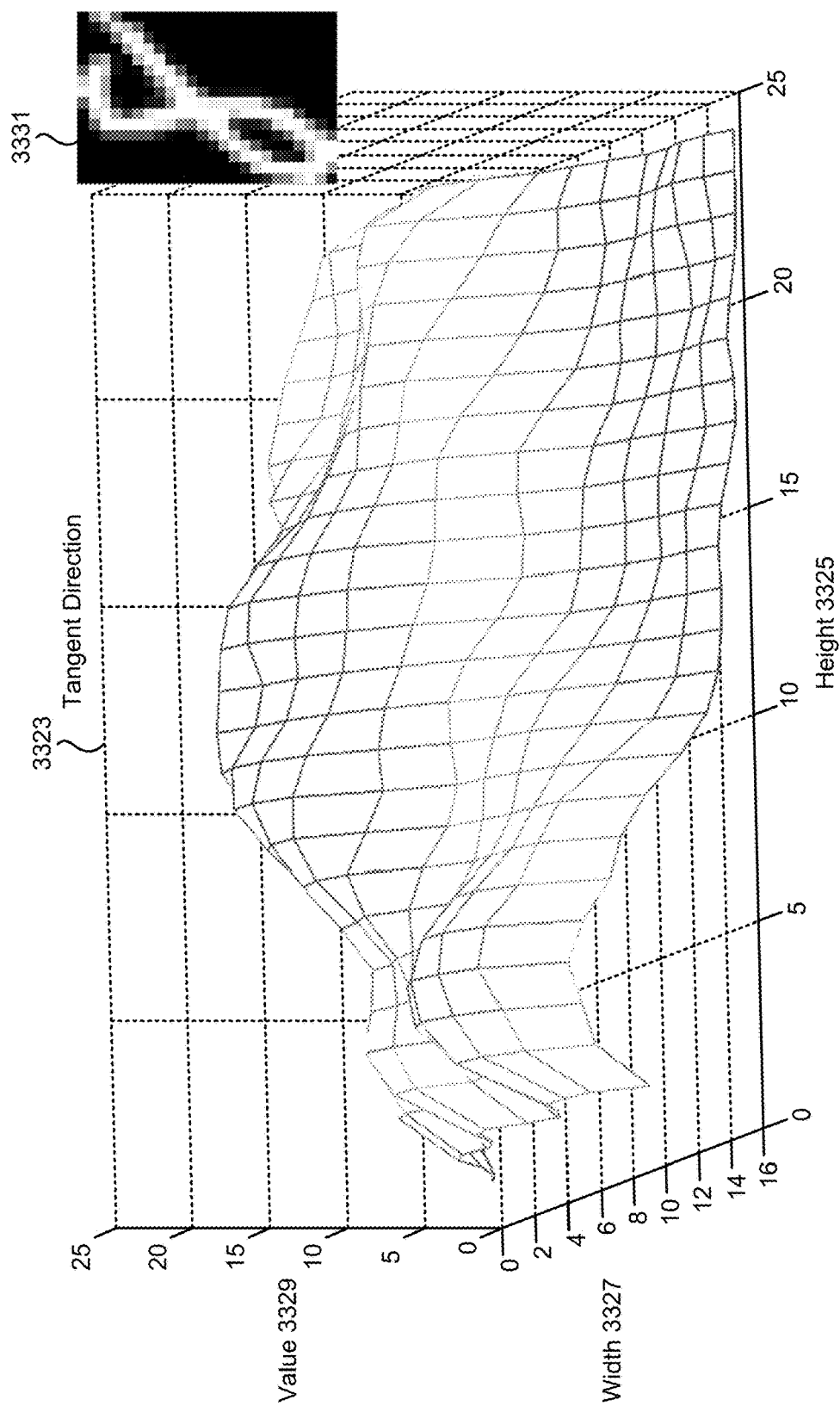
FIG. 33 illustrates an example of a transform space using a gradient tangent direction for handwriting character recognition.

FIG. 33 illustrates an example (3-Dimensional) of a transform space 3323 using a gradient tangent direction, for handwriting character recognition. In particular, FIG. 33 illustrates one example of the GDT in the tangent direction for handwriting corresponding to the image 3331 of the handwritten character "8." In this example, the transform space 3323 is illustrated in Value 3329 over Width 3327 (e.g., x position) and Height 3325 (e.g., y position). The Value 3329 axis represents a measure of the numerical value (e.g., score) at each point or position in the transform space 3323. In this example, the transform space 3323 corresponds to the transform where values are incremented along a line that is tangent to the gradient vector. As illustrated in FIGS. 32-33, two separate transform spaces may be generated: one for lines that are collinear with the gradient vectors, and one for lines that are tangent to the gradient vectors.

Figure 34:
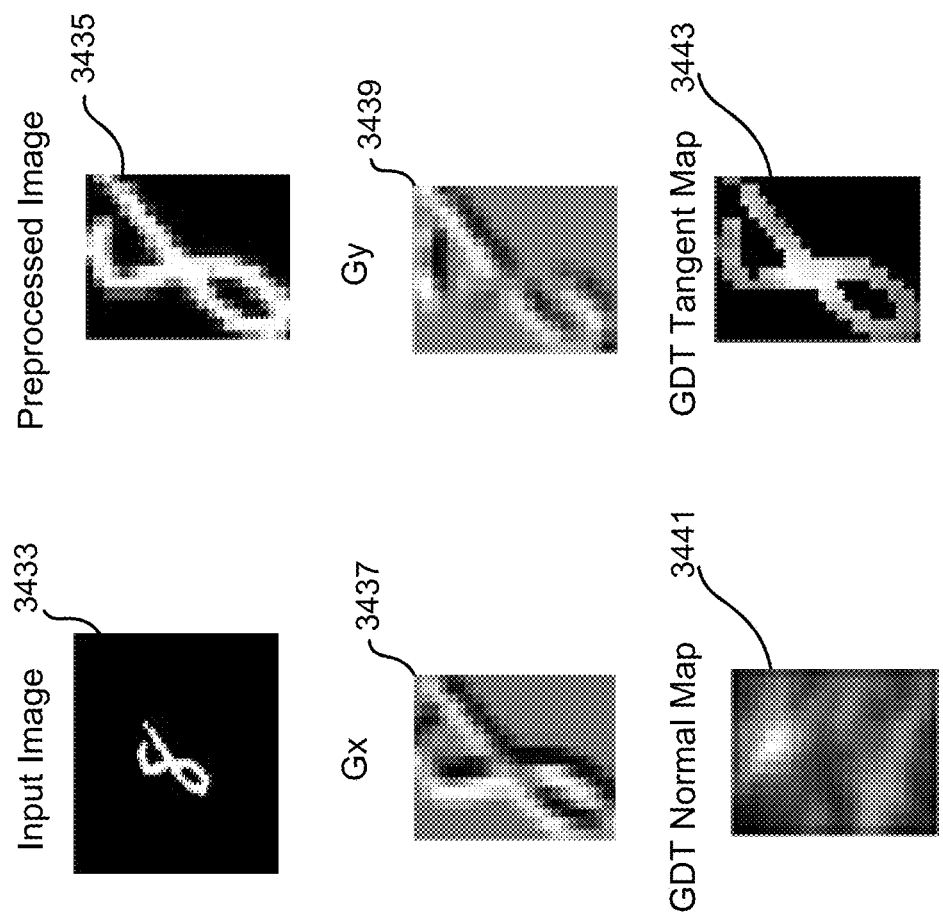
FIG. 34 illustrates an example of gradient direction descriptor (GDD) computations in accordance with the systems and methods disclosed herein.

FIG. 34 illustrates an example of Gradient Direction Descriptor (GDD) computations in accordance with the systems and methods disclosed herein. Automated handwriting recognition is known to be one of the most challenging problems in computer vision, due to the great variability in writing styles, and the large number of classes. It is significantly difficult and may be used to evaluate new recognition paradigms. A combination of techniques may be used to improve the recognition accuracy required for the target use case. The problem is further complicated by the fact that, for small footprint platforms, a recognition engine, containing multiple classifiers, dictionaries, and language models, has to be small enough to suit the small platform real time requirements.

Despite the fact that high recognition rates were reported in the literature using Deep Neural Networks (DNN) trained using raw images for isolated alphanumeric characters, a main concern is still the model size and risk of over fitting. These concerns may be addressed by designing a feature descriptor based on the transform disclosed herein (e.g., the GDT). Training and testing processes may be conducted to properly validate the performance and compare against existing approaches.

In some configurations, before generating features, the input image 3433 may be cropped and then normalized (to a fixed height h=24 pixels and width w=16 pixels, for example) to produce a pre-processed image 3435. For example, a pre-processing module included in an electronic device 402 may perform one or more of these operations. The gradient vector determination module 408 may determine gradient vectors 410 (e.g., a horizontal gradient vector image Gx 3437 and a vertical gradient vector image Gy 3439). For example, Sobel gradient operators of size (3×3) may be applied to the pre-processed image 3435 (e.g., a fixed size image) to produce the corresponding horizontal and vertical gradient images (Gx 3437, Gy 3439), respectively.

The transformation module 412 may determine (e.g., compute) the GDT normal and tangent components. In this example, the transformation module 412 may determine two transform spaces (e.g., two sets of values 414, two transform matrices, two transform maps, etc.). For example, the transformation module 412 may determine the GDT normal map 3441 based on Gx 3437 and Gy 3439 by incrementing one or more values in the transform space along a line (in one direction, for example) that is collinear with the gradient vectors. Additionally, the transformation module 412 may determine the GDT tangent map 3443 based on Gx 3437 and Gy 3439 by incrementing one or more values in the transform space along a line (in one direction, for example) that is tangent to the gradient vectors. The corresponding GDT normal map 3441 and tangent map 3443 are shown in the example of FIG. 34, where only the GDT tangent map 3443 is formed by weighting the GDT tangent component with the preprocessed image 3435 to highlight the existence of strokes and their intersections. The GDT normal map 3441, however, may not be weighted in some configurations, since its purpose may be to highlight the holes and curvatures. One example of the GDT normal map 3441 is given in FIG. 32. One example of the GDT tangent map 3443 is given in FIG. 33.

Figure 35:
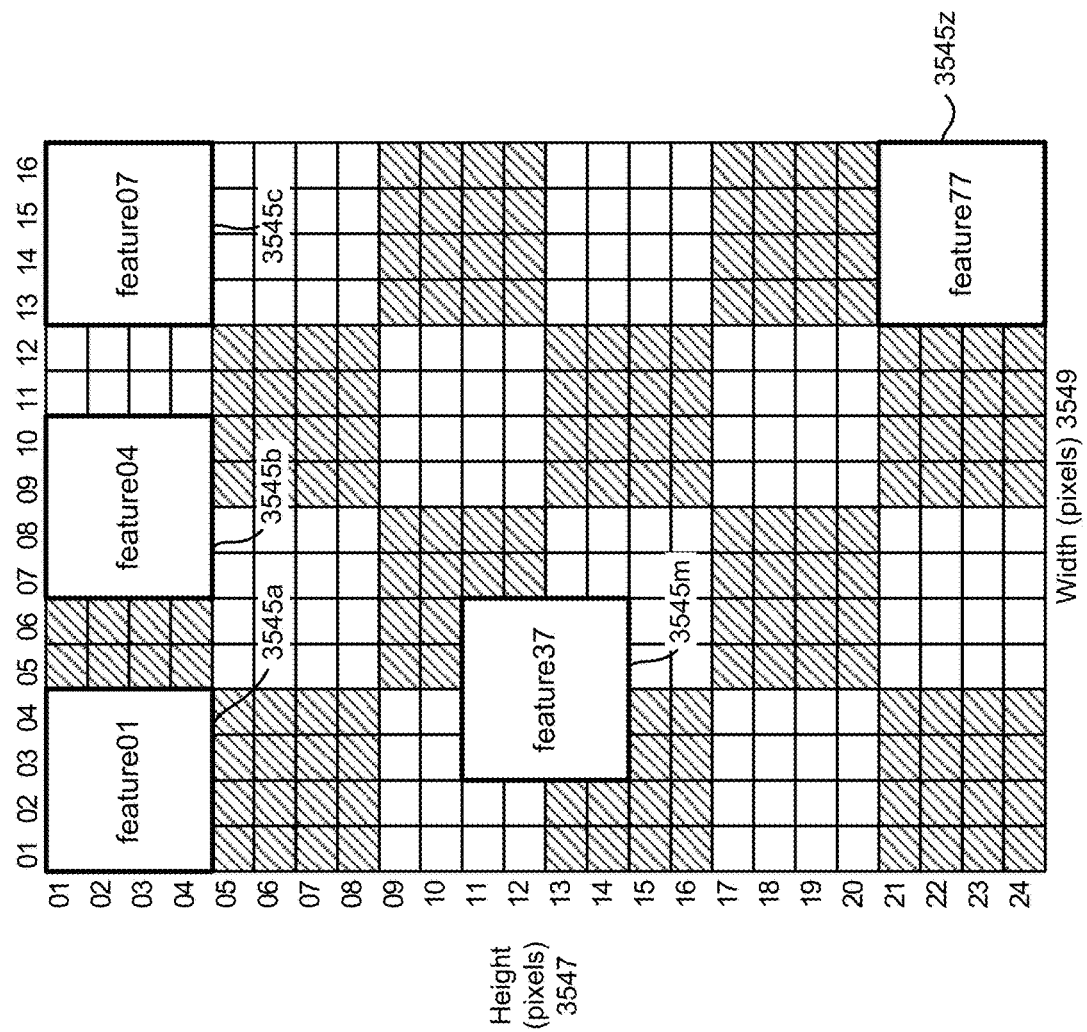
FIG. 35 is a diagram illustrating construction of a feature descriptor based on the transform described herein.

FIG. 35 is a diagram illustrating construction of a feature descriptor based on the transform described herein. An electronic device (e.g., electronic device 402) may construct the GDT-based feature descriptor (e.g., GDD). An example image grid is given in FIG. 35 in Width 3549 (in pixels, for example) and Height 3547 (in pixels, for example). Feature vectors may be computed from the resultant GDT image feature maps using overlapping zones. In other words, the Gradient Direction Descriptor (GDD) may be determined with overlapping zones. For example, seventy seven rectangular zones 3545a-z arranged in 11 rows and 7 columns may be used (where each zone of size (h/6 by w/4), e.g., of size (4×4) in this case, for example), where h and w are the height and width of the image, respectively. The upper left hand corners of the zones may be at positions $\{(r, c)|r=0, h/2, 2h/12, \ldots, 10h/12, \text{ and } c=0, w/8, 2w/8, \ldots, 6w/8\}$, where r denotes a row and c denotes a column, for example. The values in each zone 3545a-z in each feature image may be summed. The sums may be normalized between zero and one by dividing by the maximum possible sum in a zone. For example, the value of each feature is the sum of the GDT values in the zone, normalized by the maximum possible value. One set of features may be computed for each GDT feature map (e.g., normal and tangent).

Two additional values, aspect ratio and number of connected components may be appended, resulting in a feature vector of Size=2*77+2=156. In other words, two more features may be added, namely the aspect ratio and number of connected components. In this example, the GDT-based feature descriptor (e.g., GDD) may be of dimension 77*2+2=156, while the BAR-based feature descriptor may be of dimension 15*8=120. A BAR-based feature descriptor may be constructed as detailed in Paul Gader, Magdi Mohamed, and Jung-Hsien Jiang, "Comparison of Crisp and Fuzzy Character Neural Networks in Handwritten Word Recognition," IEEE Transactions on Fuzzy Systems, Vol. 3, No. 3, pp. 357-363, 1995.

A dataset containing digits for training and digits for testing was used to test the systems and methods disclosed herein. Some character sets contained a variable number of samples. Using a conventional K-means clustering algorithm, 1000 images were prepared for training and 1000 images were prepared for testing, per each upper case (UC) and lower case (LC) alphabet class, for conducting the experiments. To properly evaluate the feature vector representation, linear (no hidden layer) classifiers may be trained first, and second, nonlinear classifiers with two hidden layers may be trained with feed forward neural networks using a DNN learning technique when constructing the nonlinear classifiers. Several experiments were conducted with a RAW image (Size=28*28=784) feature descriptor, a BAR (Size=15*8=120) feature descriptor, and a GDD (Size=77*2+2=156) feature descriptor. The entries in Table D 3651 (illustrated in FIG. 36) and Table E 3753 (illustrated in FIG. 37) summarize the performance levels for each of the individual and combined BAR+GDT (Size=120+256=276) linear & nonlinear classifiers, respectively. Specifically, Table D 3651 in FIG. 36 summarizes some results for a handwriting recognition application for different feature descriptors (RAW, BAR, GDT and a combination or fusion of BAR and GDT (BAR+GDT)) with neural networks of 0 hidden layers. Furthermore, Table E 3753 in FIG. 37 summarizes some results for a handwriting recognition application for different feature descriptors (RAW, BAR, GDT and a combination or fusion of BAR and GDT (BAR+GDT)) with neural networks of 2 hidden layers. In Table D 3561 and Table E 3753, performance is illustrated corresponding to digits, upper case and lower case characters. It should be noted that MNIST stands for Mixed National Institute of Standards and Technology in FIGS. 36-37.

The GDT may evaluated by being applied to solve two different problems, for iris detection and handwriting recognition, as described above. The GDT image transform is efficient, reliable, and generic enough to handle other applications as well.

Applying the GDT for handwriting recognition, for example, may utilize both the gradient normal and tangent vector directions as described above. A dataset may contain binary images of isolated alphanumeric characters. After cropping and scaling to a fixed height of 24 pixels and width of 16 pixels, gray images may be obtained. The transforms may be generated and the feature vectors may be computed to construct their corresponding classifiers. For the GDT, the transform may be smoothed. In some configurations, only the tangent component may be weighted with the per-unit gray values of the input to produce the tangent feature map. The reduction in input size from 28×28=784 (for RAW descriptor) to 120+156=276 (for BAR+GDT) descriptors resulted in significant improvement of the recognition accuracies as demonstrated in Table D 3651 and Table E 3753 (in FIGS. 36-37), using linear and nonlinear classifiers, respectively. This shows that the new GDT based features provide improved performance, particularly for digit and lower case alphabets. It is worth noting that the number of nodes in the hidden layers may be optimized for the RAW feature set. Other configurations of the network architecture may further improve the resultant fused performance of the isolated alphanumeric character classifiers to be used for connected handwritten word recognition systems.

Figure 38:
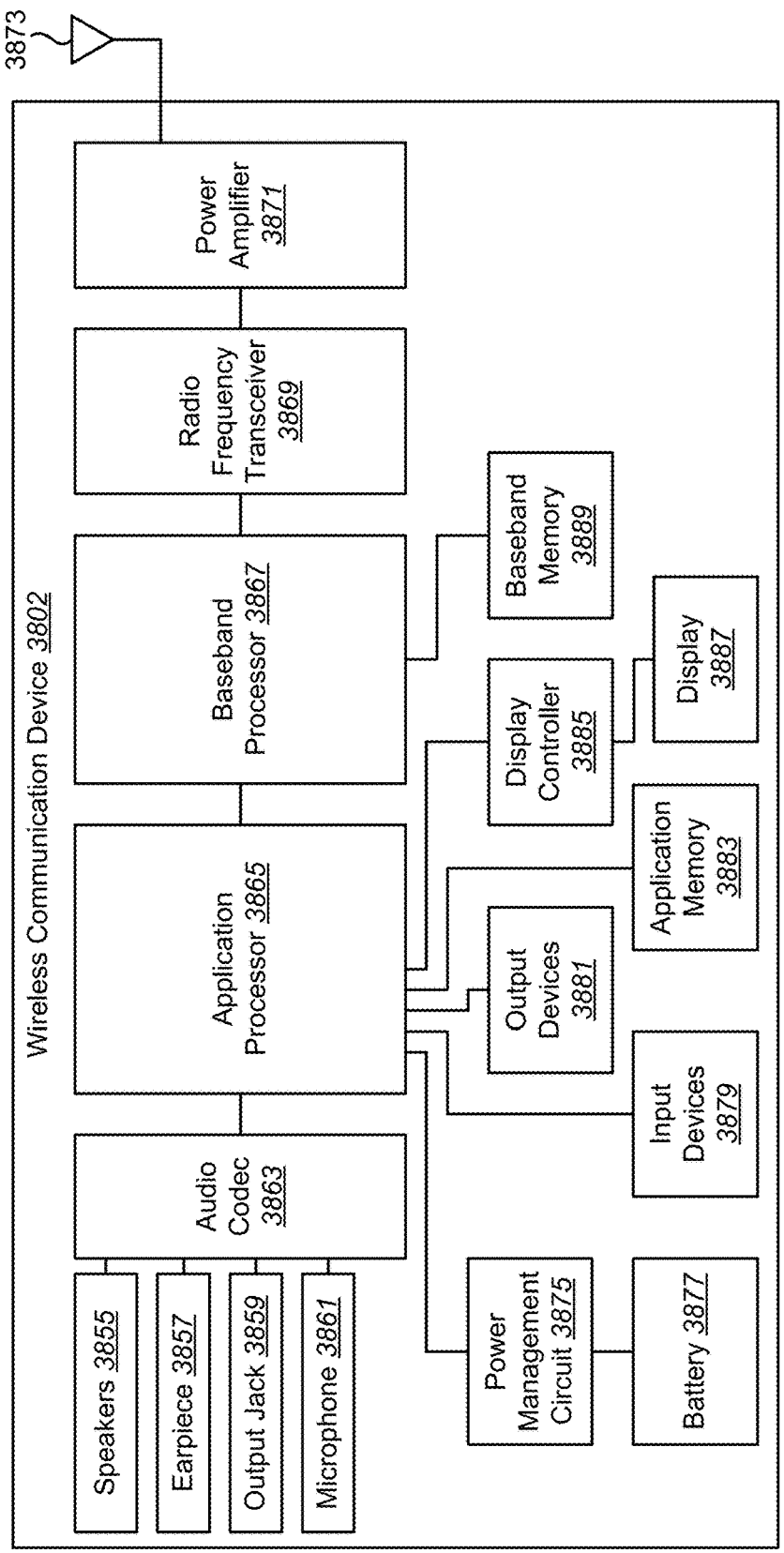
FIG. 38 is a block diagram illustrating one configuration of a wireless communication device in which systems and methods for obtaining structural information from a digital image may be implemented.

FIG. 38 is a block diagram illustrating one configuration of a wireless communication device 3802 in which systems and methods for obtaining structural information from a digital image may be implemented. The wireless communication device 3802 illustrated in FIG. 38 may be an example of one or more of the electronic devices described herein. The wireless communication device 3802 may include an application processor 3865. The application processor 3865 generally processes instructions (e.g., runs programs) to perform functions on the wireless communication device 3802. In some configurations, one or more of the functions (e.g., the transform) disclosed herein may be performed by the application processor 3865. For example, the application processor 3865 may determine gradient vectors, transform pixels and/or perform one or more operations based on the values of the transform space (e.g., iris detection, handwriting recognition, etc.). The application processor 3865 may be coupled to an audio coder/decoder (codec) 3863.

The audio codec 3863 may be used for coding and/or decoding audio signals. The audio codec 3863 may be coupled to at least one speaker 3855, an earpiece 3857, an output jack 3859 and/or at least one microphone 3861. The speakers 3855 may include one or more electro-acoustic transducers that convert electrical or electronic signals into acoustic signals. For example, the speakers 3855 may be used to play music or output a speakerphone conversation, etc. The earpiece 3857 may be another speaker or electro-acoustic transducer that can be used to output acoustic signals (e.g., speech signals) to a user. For example, the earpiece 3857 may be used such that only a user may reliably hear the acoustic signal. The output jack 3859 may be used for coupling other devices to the wireless communication device 3802 for outputting audio, such as headphones. The speakers 3855, earpiece 3857 and/or output jack 3859 may generally be used for outputting an audio signal from the audio codec 3863. The at least one microphone 3861 may be an acousto-electric transducer that converts an acoustic signal (such as a user's voice) into electrical or electronic signals that are provided to the audio codec 3863.

The application processor 3865 may also be coupled to a power management circuit 3875. One example of a power management circuit 3875 is a power management integrated circuit (PMIC), which may be used to manage the electrical power consumption of the wireless communication device 3802. The power management circuit 3875 may be coupled to a battery 3877. The battery 3877 may generally provide electrical power to the wireless communication device 3802. For example, the battery 3877 and/or the power management circuit 3875 may be coupled to at least one of the elements included in the wireless communication device 3802.

The application processor 3865 may be coupled to at least one input device 3879 for receiving input. Examples of input devices 3879 include infrared sensors, image sensors, accelerometers, touch sensors, keypads, etc. The input devices 3879 may allow user interaction with the wireless communication device 3802. The application processor 3865 may also be coupled to one or more output devices 3881. Examples of output devices 3881 include printers, projectors, screens, haptic devices, etc. The output devices 3881 may allow the wireless communication device 3802 to produce output that may be experienced by a user.

The application processor 3865 may be coupled to application memory 3883. The application memory 3883 may be any electronic device that is capable of storing electronic information. Examples of application memory 3883 include double data rate synchronous dynamic random access memory (DDRAM), synchronous dynamic random access memory (SDRAM), flash memory, etc. The application memory 3883 may provide storage for the application processor 3865. For instance, the application memory 3883 may store data and/or instructions for the functioning of programs that are run on the application processor 3865.

The application processor 3865 may be coupled to a display controller 3885, which in turn may be coupled to a display 3887. The display controller 3885 may be a hardware block that is used to generate images on the display 3887. For example, the display controller 3885 may translate instructions and/or data from the application processor 3865 into images that can be presented on the display 3887. Examples of the display 3887 include liquid crystal display (LCD) panels, light emitting diode (LED) panels, cathode ray tube (CRT) displays, plasma displays, etc.

The application processor 3865 may be coupled to a baseband processor 3867. The baseband processor 3867 generally processes communication signals. For example, the baseband processor 3867 may demodulate and/or decode received signals. Additionally or alternatively, the baseband processor 3867 may encode and/or modulate signals in preparation for transmission.

The baseband processor 3867 may be coupled to baseband memory 3889. The baseband memory 3889 may be any electronic device capable of storing electronic information, such as SDRAM, DDRAM, flash memory, etc. The baseband processor 3867 may read information (e.g., instructions and/or data) from and/or write information to the baseband memory 3889. Additionally or alternatively, the baseband processor 3867 may use instructions and/or data stored in the baseband memory 3889 to perform communication operations.

The baseband processor 3867 may be coupled to a radio frequency (RF) transceiver 3869. The RF transceiver 3869 may be coupled to a power amplifier 3871 and one or more antennas 3873. The RF transceiver 3869 may transmit and/or receive radio frequency signals. For example, the RF transceiver 3869 may transmit an RF signal using a power amplifier 3871 and at least one antenna 3873. The RF transceiver 3869 may also receive RF signals using the one or more antennas 3873.

Figure 39:
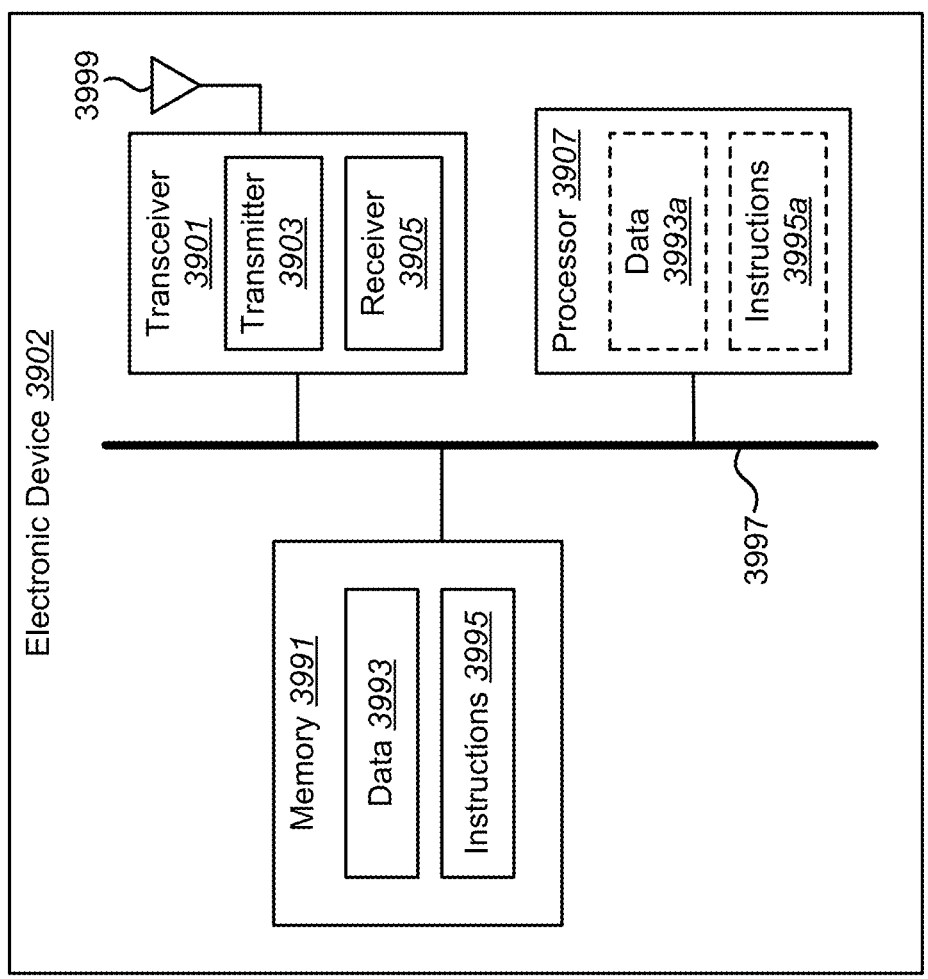
FIG. 39 illustrates certain components that may be included within an electronic device.

FIG. 39 illustrates certain components that may be included within an electronic device 3902. The electronic device 3902 described in connection with FIG. 39 may be an example of and/or may be implemented in accordance with one or more of the electronic devices described herein.

The electronic device 3902 includes a processor 3907. The processor 3907 may be a general purpose single- or multi-chip microprocessor (e.g., an ARM), a special purpose microprocessor (e.g., a digital signal processor (DSP)), a microcontroller, a programmable gate array, etc. The processor 3907 may be referred to as a central processing unit (CPU). Although just a single processor 3907 is shown in the electronic device 3902 of FIG. 39, in an alternative configuration, a combination of processors (e.g., an ARM and DSP) could be used.

The electronic device 3902 also includes memory 3991 in electronic communication with the processor 3907 (i.e., the processor 3907 can read information from and/or write information to the memory 3991). The memory 3991 may be any electronic component capable of storing electronic information. The memory 3991 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 3993 and instructions 3995 may be stored in the memory 3991. The instructions 3995 may include one or more programs, routines, sub-routines, functions, procedures, code, etc. The instructions 3995 may include a single computer-readable statement or many computer-readable statements. The instructions 3995 may be executable by the processor 3907 to implement one or more of the methods described above. Executing the instructions 3995 may involve the use of the data 3993 that is stored in the memory 3991. FIG. 39 shows some instructions 3995a and data 3993a being loaded into the processor 3907.

The electronic device 3902 may also include a transmitter 3903 and a receiver 3905 to allow transmission and reception of signals between the electronic device 3902 and a remote location (e.g., a base station). The transmitter 3903 and receiver 3905 may be collectively referred to as a transceiver 3901. An antenna 3999 may be electrically coupled to the transceiver 3901. The electronic device 3902 may also include (not shown) multiple transmitters, multiple receivers, multiple transceivers and/or multiple antenna.

The various components of the electronic device 3902 may be coupled together by one or more buses, which may include a power bus, a control signal bus, a status signal bus, a data bus, etc. For simplicity, the various buses are illustrated in FIG. 39 as a bus system 3997.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for obtaining structural information from a digital image by an electronic device, comprising:

obtaining a digital image;
determining a region of interest from the digital image, wherein the region of interest comprises a contiguous subset of the digital image;
determining a corresponding gradient vector for each pixel in the region of interest;
transforming each pixel in the region of interest in accordance with a transform, comprising:
determining, for each pixel in the region of interest, a first set of pixels, wherein the first set of pixels includes all pixels along a line that is collinear with the corresponding gradient vector, wherein the line extends to two edges of the region of interest, and
incrementing, for each pixel in the region of interest, all values in a transform space corresponding to pixels in the first set of pixels that are in the same direction as the corresponding gradient vector; and
detecting at least one curved item in the digital image based on the transform space.

2. The method of claim 1, wherein arithmetic operations of the transform only include one or more of a group of integer multiplication, integer addition and integer subtraction.

3. The method of claim 2, wherein the integer multiplication is implemented as a bit shift.

4. The method of claim 1, further comprising decrementing, for each pixel in the region of interest, all values in the transform space corresponding to pixels in the first set of pixels that are in the opposite direction from the corresponding gradient vector.

5. The method of claim 1, wherein determining the first set of pixels comprises multiplying an error value by 2.

6. The method of claim 1, wherein numbers utilized by the transform only include integer values, wherein the integer values are not represented as floating point numbers.

7. The method of claim 1, wherein each element of the transform space is represented as a first dimension position, a second dimension position and a value.

8. The method of claim 7, wherein the value indicates a number of lines intersecting a pixel corresponding to an element in the transform space.

9. The method of claim 1, wherein transforming each pixel in the region of interest has a computing complexity of a longest dimension of the region of interest squared times another dimension of the region of interest times a constant.

10. The method of claim 1, further comprising determining a character in the region of interest based on the transform.

11. An electronic device for obtaining structural information from a digital image, comprising:
a processor;
memory in electronic communication with the processor; and
instructions stored in the memory, the instructions being executable by the processor to:
obtain a digital image;
determine a region of interest from the digital image, wherein the region of interest comprises a contiguous subset of the digital image;
determine a corresponding gradient vector for each pixel in the region of interest;
transform each pixel in the region of interest in accordance with a transform, comprising:
determining, for each pixel in the region of interest, a first set of pixels, wherein the first set of pixels includes all pixels along a line that is collinear with the corresponding gradient vector, wherein the line extends to two edges of the region of interest, and
incrementing, for each pixel in the region of interest, all values in a transform space corresponding to pixels in the first set of pixels that are in the same direction as the corresponding gradient vector; and
detect at least one curved item in the digital image based on the transform space.

12. The electronic device of claim 11, wherein arithmetic operations of the transform only include one or more of a group of integer multiplication, integer addition and integer subtraction.

13. The electronic device of claim 12, wherein the integer multiplication is implemented as a bit shift.

14. The electronic device of claim 11, wherein the instructions are further executable to decrement, for each pixel in the region of interest, all values in the transform space corresponding to pixels in the first set of pixels that are in the opposite direction from the corresponding gradient vector.

15. The electronic device of claim 11, wherein determining the first set of pixels comprises multiplying an error value by 2.

16. The electronic device of claim 11, wherein numbers utilized by the transform only include integer values, wherein the integer values are not represented as floating point numbers.

17. The electronic device of claim 11, wherein each element of the transform space is represented as a first dimension position, a second dimension position and a value.

18. The electronic device of claim 17, wherein the value indicates a number of lines intersecting a pixel corresponding to an element in the transform space.

19. The electronic device of claim 11, wherein transforming each pixel in the region of interest has a computing complexity of a longest dimension of the region of interest squared times another dimension of the region of interest times a constant.

20. The electronic device of claim 11, wherein instructions are further executable to determine a character in the region of interest based on the transform.

21. A computer-program product for obtaining structural information from a digital image, comprising a non-transitory tangible computer-readable medium having instructions thereon, the instructions comprising:
code for causing an electronic device to obtain a digital image;
code for causing the electronic device to determine a region of interest from the digital image, wherein the region of interest comprises a contiguous subset of the digital image;
code for causing the electronic device to determine a corresponding gradient vector for each pixel in the region of interest;
code for causing the electronic device to transform each pixel in the region of interest in accordance with a transform, comprising:
code for causing the electronic device to determine, for each pixel in the region of interest, a first set of pixels, wherein the first set of pixels includes all pixels along a line that is collinear with the corresponding gradient vector, wherein the line extends to two edges of the region of interest, and
code for causing the electronic device to increment, for each pixel in the region of interest, all values in a transform space corresponding to pixels in the first set of pixels that are in the same direction as the corresponding gradient vector; and code for causing the electronic device to detect at least one curved item in the digital image based on the transform space.

22. The computer-program product of claim 21, wherein arithmetic operations of the transform only include one or more of a group of integer multiplication, integer addition and integer subtraction.

23. The computer-program product of claim 21, wherein determining the first set of pixels comprises multiplying an error value by 2.

24. The computer-program product of claim 21, wherein numbers utilized by the transform only include integer values, wherein the integer values are not represented as floating point numbers.

25. The computer-program product of claim 21, further comprising code for causing the electronic device to determine a character in the region of interest based on the transform.

26. An apparatus for obtaining structural information from a digital image, comprising:
   means for obtaining a digital image;
   means for determining a region of interest from a digital image, wherein the region of interest comprises a contiguous subset of the digital image;
   means for determining a corresponding gradient vector for each pixel in the region of interest;
   means for transforming each pixel in the region of interest in accordance with a transform, comprising:
      means for determining, for each pixel in the region of interest, a first set of pixels, wherein the first set of pixels includes all pixels along a line that is collinear with the corresponding gradient vector, wherein the line extends to two edges of the region of interest, and
      means for incrementing, for each pixel in the region of interest, all values in a transform space corresponding to pixels in the first set of pixels that are in the same direction as the corresponding gradient vector; and
   means for detecting at least one curved item in the digital image based on the transform space.

27. The apparatus of claim 26, wherein arithmetic operations of the transform only include one or more of a group of integer multiplication, integer addition and integer subtraction.

28. The apparatus of claim 26, wherein determining the first set of pixels comprises multiplying an error value by 2.

29. The apparatus of claim 26, wherein numbers utilized by the transform only include integer values, wherein the integer values are not represented as floating point numbers.

30. The apparatus of claim 26, further comprising means for determining a character in the region of interest based on the transform.

* * * * *